United States Patent [19]
Yanagisawa et al.

[11] Patent Number: 5,519,686
[45] Date of Patent: May 21, 1996

[54] ENCODER FOR CONTROLLING MEASUREMENTS IN THE RANGE OF A FEW ANGSTROMS

[75] Inventors: Yoshihiro Yanagisawa, Atsugi; Yuko Morikawa, Kawasaki; Hiroshi Matsuda, Isehara; Haruki Kawada, Yokohama; Kunihiro Sakai, Isehara; Hisaaki Kawade, Atsugi; Ken Eguchi, Yokohama; Eigo Kawakami, Ebina; Toshimitsu Kawasa, Atsugi; Minoru Yoshii, Tokyo; Kenji Saitoh; Akihiko Yamano, both of Yokohama; Hiroyasu Nose, Zama, all of Japan

[73] Assignee: Canon Kabushiki Kaisha, Tokyo, Japan

[21] Appl. No.: 438,079

[22] Filed: May 8, 1995

Related U.S. Application Data

[63] Continuation of Ser. No. 232,331, Apr. 13, 1994, abandoned, which is a continuation of Ser. No. 860,194, Mar. 26, 1992, abandoned, which is a continuation of Ser. No. 235,552, Aug. 24, 1988, abandoned.

[30] Foreign Application Priority Data

| Aug. 25, 1987 | [JP] | Japan | 62-212153 |
| Aug. 25, 1987 | [JP] | Japan | 62-212154 |
| Dec. 4, 1987 | [JP] | Japan | 62-305747 |
| Dec. 4, 1987 | [JP] | Japan | 62-305748 |
| Dec. 9, 1987 | [JP] | Japan | 62-309421 |
| Aug. 12, 1988 | [JP] | Japan | 63-201306 |
| Aug. 12, 1988 | [JP] | Japan | 63-201307 |
| Aug. 12, 1988 | [JP] | Japan | 63-201308 |

[51] Int. Cl.⁶ ................................................ G11B 7/00
[52] U.S. Cl. ...................... 369/126; 369/47; 250/306; 250/307
[58] Field of Search .................. 309/126; 250/306, 250/307, 311, 252.1 R; 365/118, 157, 174, 151, 114; 369/101, 173, 47, 48, 54, 58

[56] References Cited

U.S. PATENT DOCUMENTS

| 2,715,830 | 8/1955 | Lewis et al. |
| 4,343,993 | 8/1982 | Binning et al. ........................ 250/306 |
| 4,560,924 | 12/1985 | Nordberg . |

(List continued on next page.)

FOREIGN PATENT DOCUMENTS

| 0247219 | 12/1987 | European Pat. Off. . |
| 0403766 | 12/1990 | European Pat. Off. . |
| 62-209302 | 9/1987 | Japan . |

OTHER PUBLICATIONS

Patent Abstracts of Japan, vol. 12, No. 68, p. 672, Mar. 3, 1988.
IBM Journal of Research and Development, vol. 30, No. 5, Sep. 1986, pp. 460–465, "Mono–atomic tips for scanning tunneling microscopy", by Hans–Werner Fink.

Primary Examiner—Georgia Y. Epps
Assistant Examiner—Muhammad N. Edon
Attorney, Agent, or Firm—Fitzpatrick, Cella, Harper & Scinto

[57] ABSTRACT

An encoder includes an electrically conductive reference scale having surface steps formed at predetermined positions; an electrically conductive probe having a tip disposed opposed to the reference scale; wherein the reference scale and the probe are relatively movable in a direction different from the opposing direction of the tip of the probe and the reference scale; a portion for applying an electrical voltage to between the reference scale and the probe; a portion for detecting a change in a tunnel current between the reference scale and the probe, to between which the electric voltage is applied by the voltage applying portion at the time of the relative movement between the scale and the probe, the detecting portion detecting the change in the tunnel current when the probe passes a position opposed to a surface step of the reference scale; and portion for detecting the amount of the relative movement between the scale and probe, on the basis of the detection by the change detecting portion.

34 Claims, 48 Drawing Sheets

U.S. PATENT DOCUMENTS

| | | | |
|---|---|---|---|
| 4,575,822 | 3/1986 | Quate | 365/114 X |
| 4,618,767 | 8/1986 | Smith et al. | 250/306 X |
| 4,677,296 | 6/1987 | Lischke et al. | 250/307 X |
| 4,724,318 | 2/1988 | Binnig | 250/307 |
| 4,814,622 | 3/1989 | Gregory et al. | 250/360 X |
| 4,831,614 | 5/1989 | Duerig et al. | 365/174 X |
| 4,866,271 | 9/1989 | Ono et al. | 250/306 X |
| 4,877,957 | 10/1989 | Okada et al. | 250/306 X |
| 4,883,959 | 11/1989 | Hosoki et al. | 250/306 |
| 4,907,195 | 3/1990 | Kazan et al. | 280/306 |
| 4,916,688 | 4/1990 | Foster et al. | 365/151 X |
| 4,987,303 | 1/1991 | Takase et al. | 250/306 X |

(a) TUNNEL CURRENT (b) MOVING-AMOUNT PULSE SIGNAL (c) DIRECTION OF RELATIVE DISPL.

(d) LATERAL RELATIVE DISPLACEMENT (e) LATERAL RELATIVE DISPLACEMENT

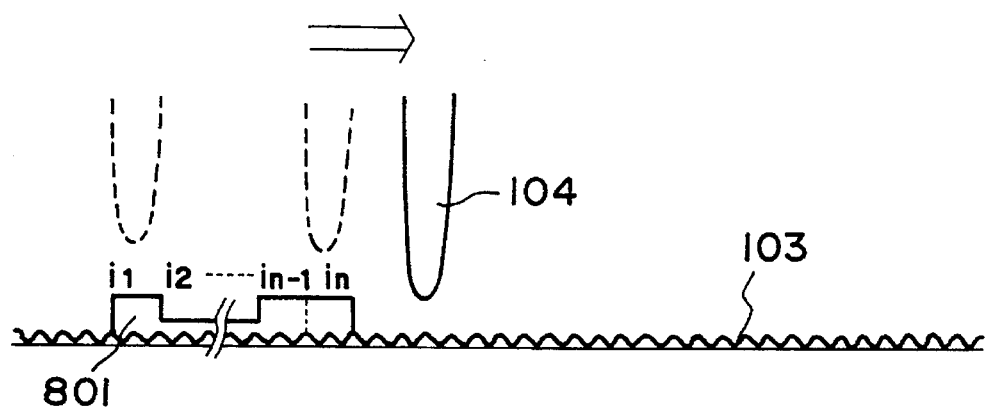
F I G. 9A
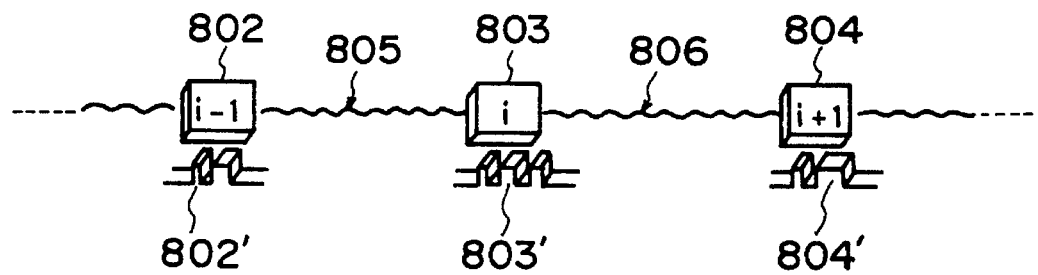
F I G. 9B
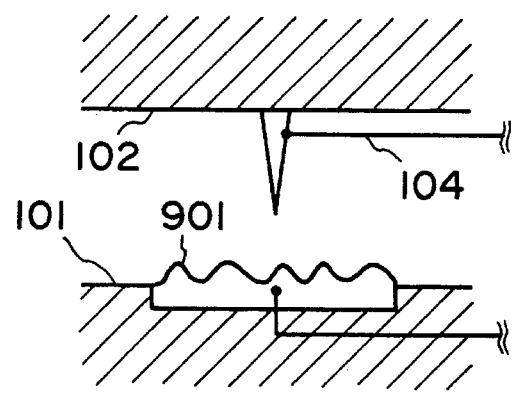
F I G. 10

DIREC. OF RELATIVE DISPL. BETWEEN PROBE & REF. SCALE

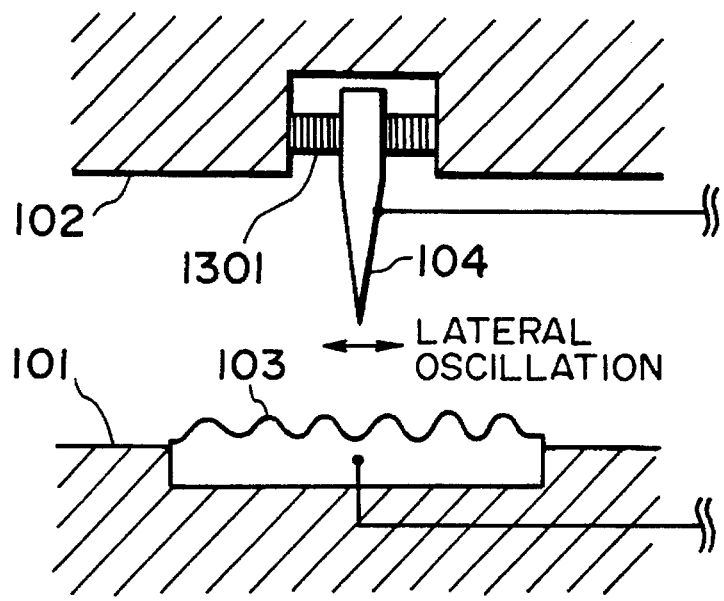
F I G. 14
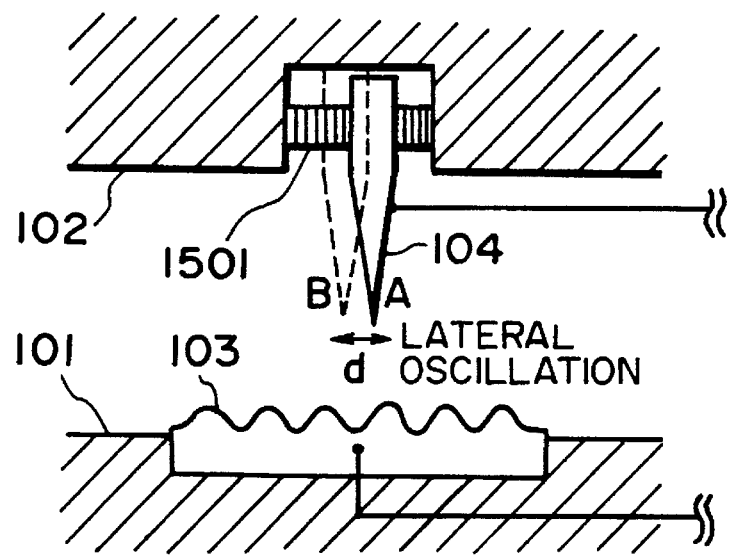
F I G. 16

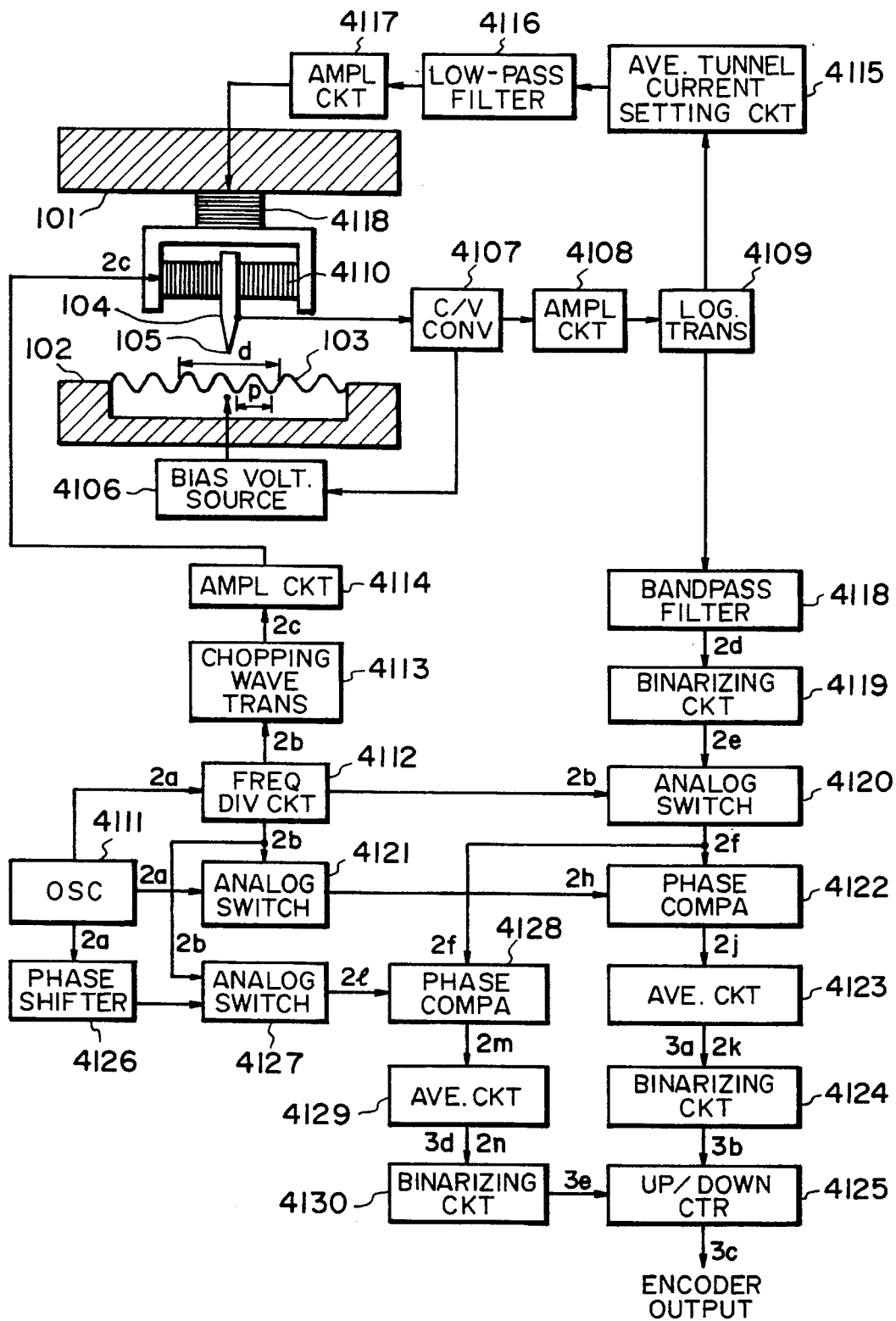
F I G. 31

| POSITIONAL INFORMATION | | |
|---|---|---|
| ⊕ A | | + A' |
| + B | | |
| + C | | + C' |
| + D | | |
| + E | | + E' |
| + F | | |
| + G | | + G' |
| + H | | |
| + I | | + I' |
| COORDINATE AXIS | | RECORDING POSITION |

5,519,686

ENCODER FOR CONTROLLING MEASUREMENTS IN THE RANGE OF A FEW ANGSTROMS

This application is a continuation of application Ser. No. 08/232,331 filed Apr. 13, 1994, now abandoned, which is a continuation of Ser. No. 07/860,194, filed Mar. 26, 1992, now abandoned, which is a continuation of application Ser. No. 07/235,552 filed Aug. 24, 1988, now abandoned.

FIELD OF THE INVENTION AND RELATED ART

This invention relates to an encoder for use in the detection of positional information upon fine positioning, dimension measurement, distance measurement, velocity measurement or otherwise. More particularly, it is concerned with an encoder for use in the measurement control for which resolution of an order of atoms (a few angstroms) is required.

Usually, encoders of the type described comprises a reference scale, which bears information related to the position or angle, and detecting means movable relative to the reference scale, for detecting the information related to the position or angle. With respect to the reference scale and the detecting means used, the encoders may be classified into different types, e.g., optical encoders, magnetic encoders, electrostatic capacitance type encoders, etc.

Of these encoders, those that assure highest resolution are optical encoders which use, for example, the principle of grating interference. FIG. 1 shows the structure of a known type optical encoder. In this example, light source 3001 emits a monochromatic light 3002 which is projected upon diffraction grating 3003 that functions as a reference scale. Of the light diffracted by the grating, positive and negative first-order diffraction light components 3004 and 3005 are directed by reflection mirrors 3006 to enter into a half mirror 3007. By this half mirror 3007, the diffraction light components are combined and, thus, there occurs interference. The interference fringe caused thereby is detected and photo-electrically converted by photodetector 3008. In this manner, the relative displacement between the optical system and the reference scale is detected on the basis of the interference fringe.

In grating interference type optical encoders, having the highest resolution as compared with those of the other encoders described above, the performance (resolution) is determined chiefly by the pitch of the grating. Thus, how to precisely fabricate a grating with minute pitch and how to precisely detect it are important factors. Current fine machining technique (for example, electron beam pattern drawing technique or ion beam technique) can at the best assure precision of 0.01 micron (100 angstroms). Also, in the detecting technique (for example, the optical heterodyne method), the resolution is limited to 0.01 micron. Therefore, it is difficult to satisfy the requirement of a higher resolution encoder, particularly for use in a semiconductor microcircuit manufacturing apparatus.

SUMMARY OF THE INVENTION

It is accordingly a primary object of the present invention to provide an encoder having high resolution of an order of interatomic distance.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 9A and 9B are a schematic section and a schematic perspective view, respectively, showing examples in each of which use is made of a compound scale wherein absolute positional information is recorded on or adjacent to a reference origin provided on a reference scale.

FIG. 10 is a schematic section showing an example wherein non-periodic graduations are used as a reference scale.

FIGS. 13A and 13B are schematic views showing a plane (1,1,1) of a face-centered cubic lattice, which is a specific example of an asymmetric reference scale, wherein FIG. 13A is a top plan view and FIG. 13B is a sectional view.

FIG. 14 is a schematic section showing an embodiment wherein a probe is oscillated laterally for the detection of a direction.

FIG. 16 is a schematic section showing an embodiment wherein a probe is oscillated laterally for the detection of a direction.

FIG. 31 is a schematic and diagrammatic view of an encoder according to one embodiment of the present invention, wherein a tunnel current is detected.

DESCRIPTION OF THE PREFERRED EMBODIMENTS

Figure 1:
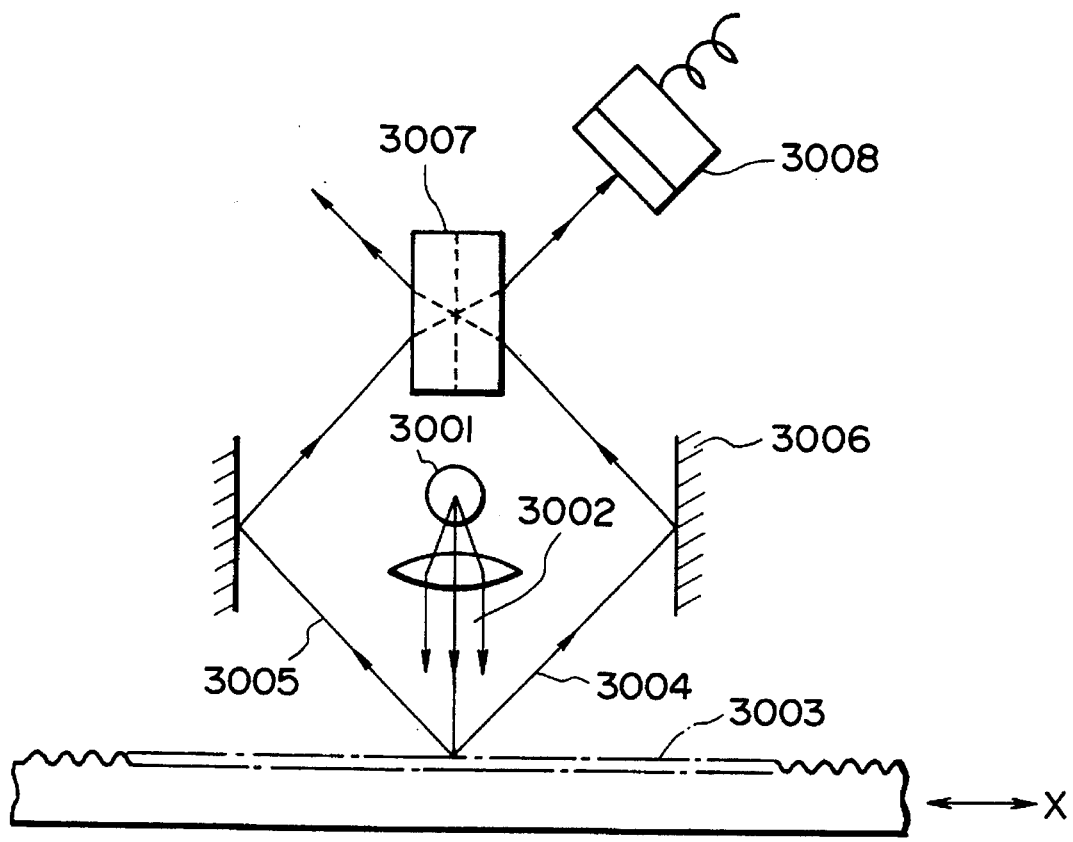
FIG. 1 is a schematic view showing the structure of a known type optical encoder which uses the principle of grating interference.

Briefly, in accordance with one aspect of the present invention, an electric voltage is applied between an electrically conductive reference scale, which functions as a reference with respect to length, and an electrically conductive probe having a tip disposed close to the surface of the reference scale. The electrical current (tunnel current) which flows between the reference scale and the probe is detected to obtain a tunnel current signal which, in turn, is subjected to waveform processing. From the signal having been processed, the amount and direction of the relative movement between the reference scale and the probe in a lateral direction, namely, a direction along the scale surface, is detected to obtain electrical signals representing the lateral relative moving amount and the relative moving direction. Then, from these signals, the lateral relative displacement (quantity of deviation) between the reference scale and the probe is measured and, finally, the quantity of lateral relative movement between the probe and the reference scale is detected.

The invention will be described below in greater detail.

The present invention utilizes the phenomenon that a flow of tunnel current occurs when an electrical voltage is applied between an electrically conductive material and an electrically conductive probe and when they come close to each other to a clearance of about 1 nm ("Solid State Physics" Vol. 22, No. 3, 1987, pp. 176–186). The tunnel current depends on the distance between the electrically conductive material and the electrically conductive probe as well as a work function upon the surface. Therefore, it is possible to read out the information related to various surface shape states.

Where an electrical voltage V which is lower than the work function $\phi$ ($\phi$>eV wherein e is the electric charge of electron) is applied between an electrically conductive probe and an electrically conductive reference atomic arrangement which are spaced by a distance Z, electrons tunnel through a potential barrier between the electrically conductive probe and the electrically conductive reference electron arrangement. Tunnel current density $J_T$ may be determined by free electron approximation and can be expressed as follows:

$$J_T = (\beta V/2\pi\lambda Z)\exp(-2Z/\lambda) \quad (1)$$

on condition that:

$$\lambda = \hbar/\sqrt{2m\phi} \text{ and}$$

$$\beta = e^2/\hbar$$

wherein $\lambda$ is the decay distance of the wave function in a vacuum or an atmosphere outside the metal ($\phi$ is in the range of 1–5 eV and $\lambda$ is in the range of 1–2 angstroms);

n is equal to $h/2\pi$ (h is a Planck's constant); and m is mass of electron.

In equation (1), the tunnel current density $J_T$ changes with the distance Z. Namely, if there occurs relative positional deviation between the probe and the reference atomic arrangement on condition that the average interval between the probe and the reference atomic arrangement is maintained constant, the tunnel current changes periodically in accordance with the reference atomic arrangement. Thus, from that change in the tunnel current, the amount of positional deviation can be determined.

Also, in equation (1), if control is made with regard to the position of the probe in the direction of a normal to the reference atomic arrangement so as to maintain the tunnel current $J_T$ constant, namely, to maintain the distance Z constant, then the probe position controlling signal (controlling the probe position in the direction of the normal) changes periodically in accordance with the reference atomic arrangement. Thus, from that change in the position controlling signal, the quantity of positional deviation can be determined.

The resolution $\delta$ in the scale surface can be higher with a finer tip end of the probe and, according to model calculation, it can be expressed as follows:

$$\delta = [2\lambda(R+Z)]^{1/2}$$

wherein, R is the radius of curvature of the metal probe tip.

Where the probe tip is provided by one atom, R=1 angstrom, and thus, the resolution $\delta$ in the plane is of an order of 3 angstroms. The above-described method, using the tunnel current, is operable not only in the atmosphere but also in a liquid, and provides various advantageous features such as, for example, high resolution.

The present invention utilizes the above-described principle and provides in one aspect thereof an encoder wherein a periodic surface structure provided by a regular atomic arrangement on the surface of a material is used as a reference and wherein use is made of a tunnel current which flows between the reference surface and an electrically conductive probe. Thus, the present invention can assure a highest resolution of the order of an atom (a few angstroms) which is far higher than the maximum resolution of the conventional encoders.

Referring to the drawings, embodiments of the present invention will be described.

Figure 2:
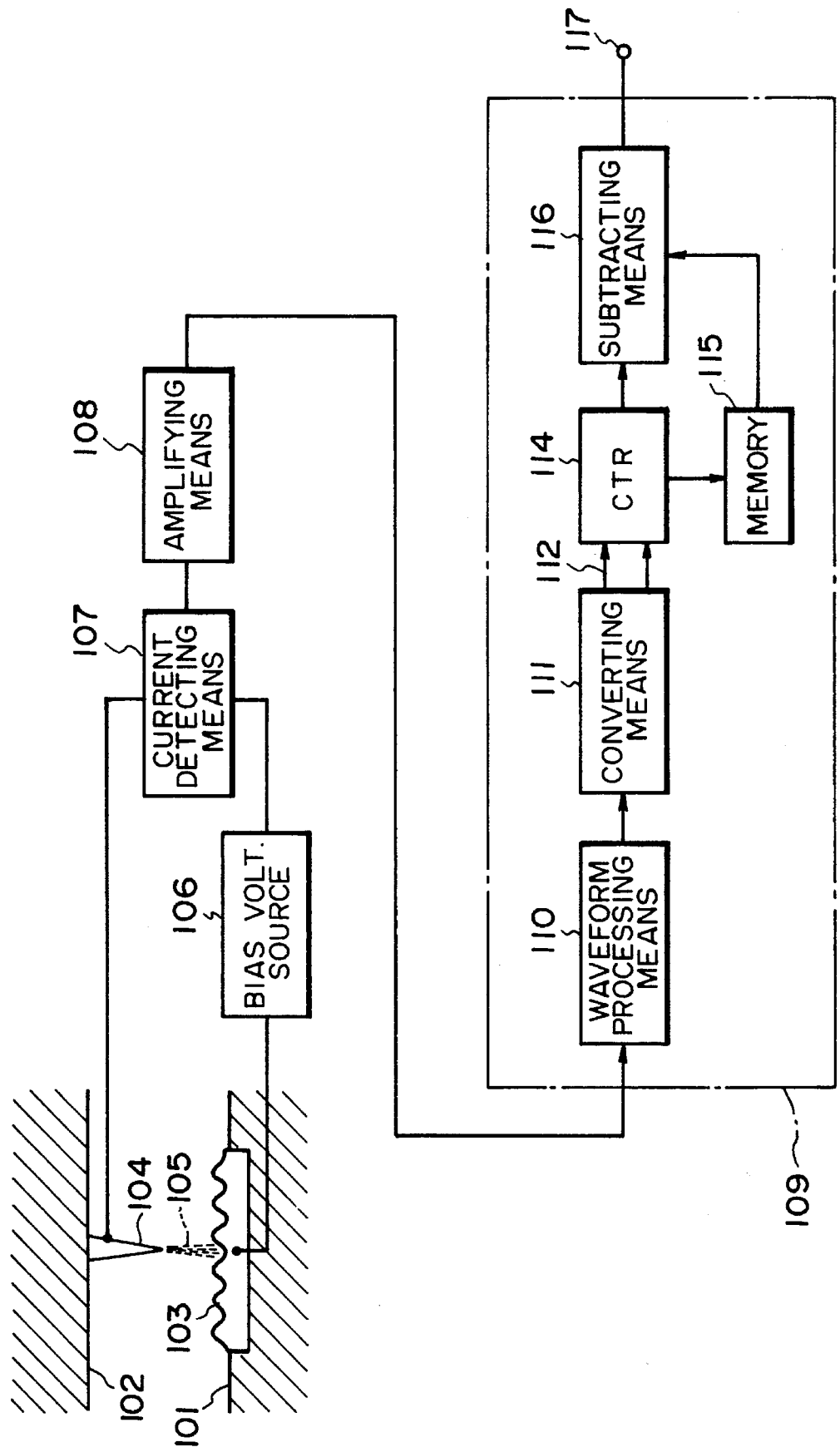
FIG. 2 is a schematic and diagrammatic view showing the structure of an encoder according to one embodiment of the present invention, wherein the detection of tunnel current is used.
Figure 3:
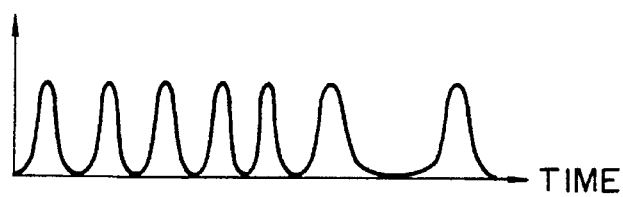
FIG. 3 is a waveform diagram showing signals obtained at different constituent portions of the encoder shown in FIG. 2.
Figure 3:
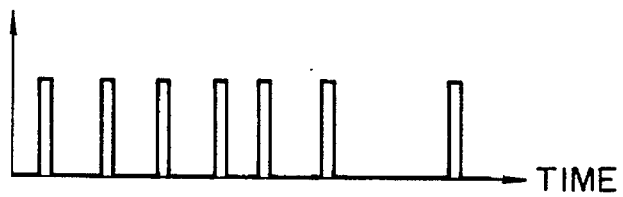
Figure 3:
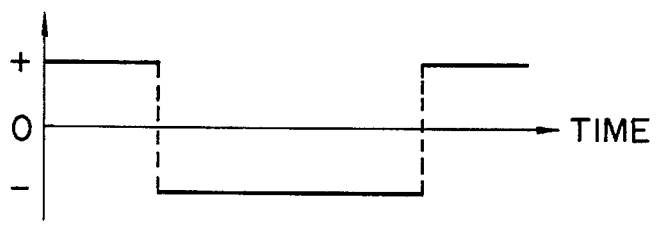
Figure 3:
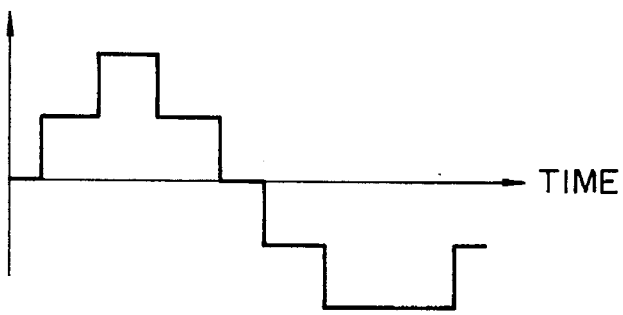
Figure 3:
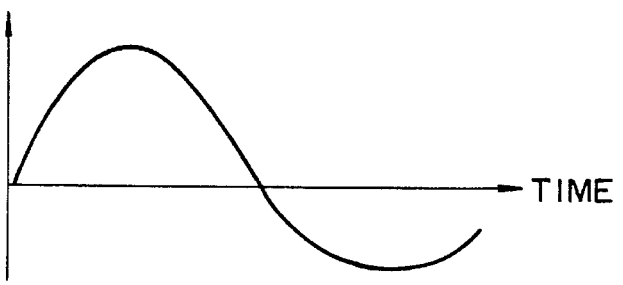

FIG. 2 shows the structure of an encoder according to one embodiment of the present invention. FIG. 3 shows signals which are obtainable at various constituent portions of the present embodiment.

In FIG. 2, an object 101 and another object 102 are made relatively movable only in a lateral direction (horizontal direction in the sheet of the drawing). The object 101 is provided with an electrically conductive reference scale 103, and the object 102 is provided with an electrically conductive probe 104. Between the probe 104 and the reference scale 103, a bias voltage is applied by means of a bias voltage source 106. The tip of the probe 104 and the reference scale 103 are disposed so close to each other that a tunnel current schematically illustrated at 105 flows therebetween. The tunnel current 105 may be detected by a current detecting means 107 and may be amplified by a current amplifying means 108.

After the amplification, the tunnel current signal 118 (its waveform being illustrated in FIG. 3, (a)) is applied to a waveform processing means 110, wherein it is subjected to binary-coding by the slicing with a certain threshold level, waveform processing by detecting edges of the resultant binary-coded signal for pulse formation, as well as direction detection which will be described later with reference to a specific means that is provided for the detection of the direction of the lateral relative displacement. Thereafter, the signal is transformed into a moving amount signal 112 (FIG. 3, (b)) and a moving direction signal 113 (FIG. 3, (c)), this being made by a converting means 111. These signals are applied to a counter 114. In this counter 114, the moving amount signal 114 and the direction signal 113 applied thereto are transformed into a lateral relative displacement. Further, by using initial position data having been preparatorily stored in a memory 115, subtracting means 116 operates to calculate the lateral relative displacement, at signal 117 (FIG. 3, (d)), from the initial position, between the objects 101 and 102. The resolution of the encoder of the present embodiment can be of an order of the pitch of the reference scale 103 (a few angstroms where a periodic arrangement of atoms on the surface of the electrically conductive material is used as the reference scale). However, a further improved resolution less than 1 angstrom is attainable where a detected position signal is divided (FIG. 3, (e)).

Next, a description will be provided of materials usable for the probe in the present invention. Those materials having electric conductivity may be used as the probe material. Examples are a metal such as Au, Pt, Ag, Pd, Al, In, Sn, Pb, W or otherwise; and an alloy of appropriate ones of these materials. Further, graphite, silicide or an electrically conductive oxide material such as, for example, ITO (In-Sn oxide), may be used.

In order to assure high resolution of the encoder, it is necessary that the tip of the probe is pointed as sharp as possible to an order of the size of an atom.

The present embodiment uses a probe 104 which has been formed by mechanically grinding a tungsten wire of a diameter ø=1 mm to a diameter of about 0.2 mm and thereafter by sharpening the tip by means of electropolishing. However, the manner of treatment is not limited thereto.

Figure 4:
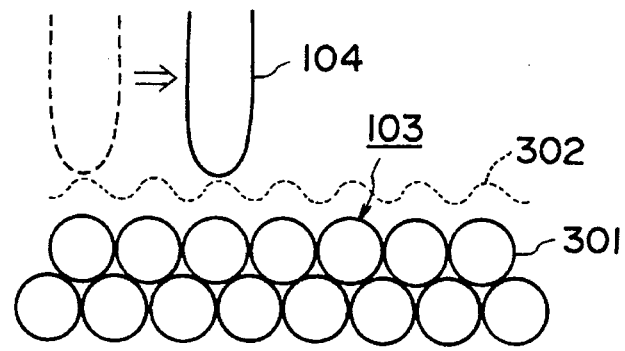
FIG. 4 is a schematic view showing an example wherein a periodic atomic or molecular arrangement on the surface of an electrically conductive material is used as a reference scale.
Figure 5A:
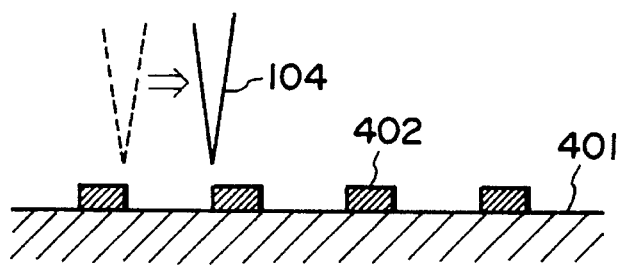
FIG. 5A is a schematic section showing an example wherein graduations fabricated on the surface of an electrically conductive material by means of converged ion beam treatment or electron beam treatment, are used as a reference scale.
Figure 5B:
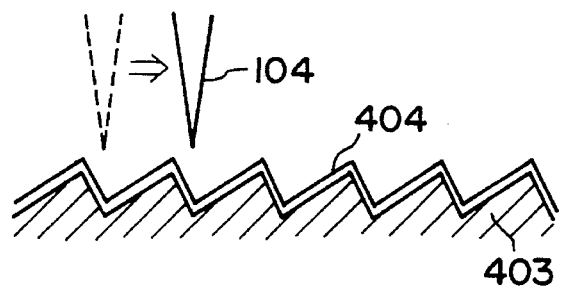
FIG. 5B is a schematic section showing an example wherein the surface of a material having a shape like a diffraction grating and coated with an electrically conductive material is used as a reference scale.

Next, the reference scale will be explained. FIG. 4 is a schematic view showing a probe 104 and an electrically conductive reference scale 103 used in the present embodiment. Shown in FIG. 4 is an example wherein a periodic atomic or molecular arrangement 301 on the surface of an electrically conductive material (whose lattice spacing is predetected) is used as the reference scale. By using the periodic arrangement of a minute structure of atoms or molecules as a reference scale 103, as described, it is possible to provide an encoder having a resolution of an order of interatomic distance, namely, of an order of an angstrom. Examples of such an electrically conductive material usable in the present invention are a metal such as Au, Pt, $TaS_2$ or otherwise; an alloy such as CuAu, PtIr or otherwise; a submetal such as graphite; a semiconductor such as Si, $MoS_2$, GaAs, SiC or otherwise; an electrically conductive LB film (Langmuir Blodgett film); and an electrically conductive organic material such as TTF-TCNQ (tetrathiafluvalene-tetracyanoquinodimethane). In place of the atomic or molecular arrangement of the above-described materials, a scale such as shown in FIG. 5A in which graduations 402 are formed on the surface 401 of an electrically conductive material by means of a focused ion beam process or an electron beam process; or alternatively a scale such is shown in FIG. 5B in which the surface 403 of an article having a shape like a diffraction grating is coated with a film 404 of an electrically conductive material, may be used as a reference scale.

Next, a description will be provided of examples wherein a periodic arrangement of atoms, molecules or otherwise is used in combination with one or more fabricated graduations to provide a reference scale (hereinafter such scale will be referred to as a "compound scale").

Figure 6:
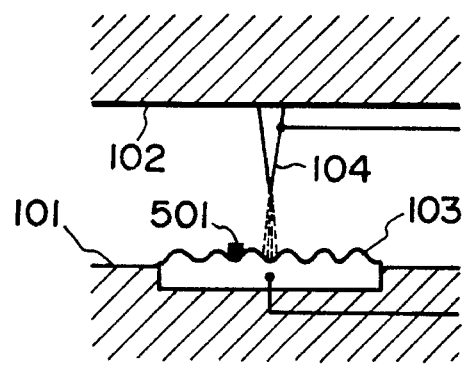
FIG. 6 is a schematic section showing an example of a compound scale wherein one reference origin is provided on a reference scale.

FIG. 6 is a sectional view showing an embodiment of a compound scale. As shown in this figure, a reference origin 501 is formed on a reference scale 103. The moment at which a probe 104 comes to the position of this origin 501 may be treated as the initial setting point. By doing so, it is always possible to determine the amount of movement of the probe from this reference origin 501. Therefore, it is possible to detect the absolute moving amount of the object 102 with respect to the object 101. Except for this, the present embodiment can be handled essentially in the same way as having been described with reference to the detection of the relative moving amount.

Figure 7A:
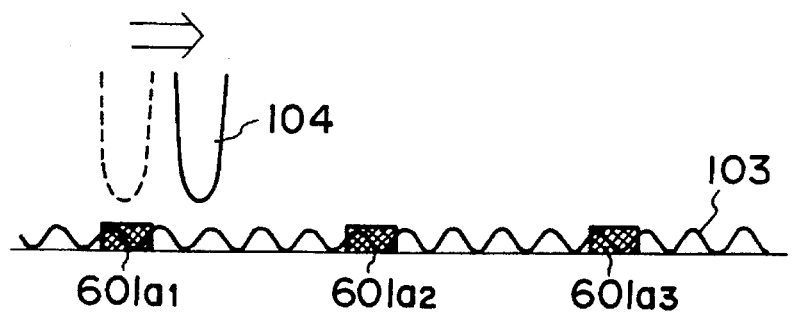
FIGS. 7A–7C are schematic sections, respectively, showing examples of a compound scale, in each of which plural reference origins are provided on a reference scale.
Figure 7B:
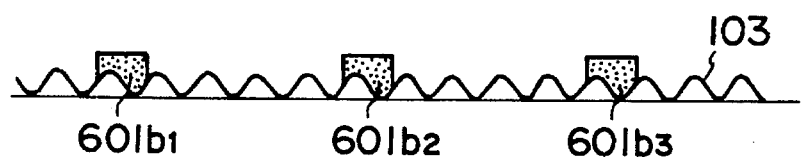
Figure 7C:
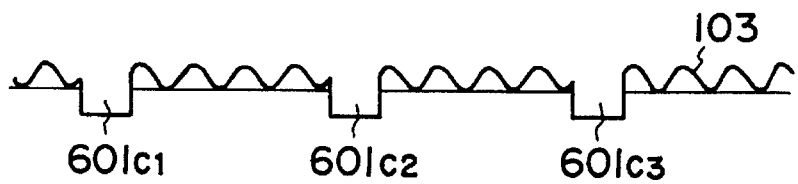

FIGS. 7A–7C are sectional views, respectively, showing further embodiments of the compound scale. Of these drawings, FIG. 7A shows an example wherein portions of the surface of an atomic arrangement of a reference scale 103 are substituted by a different material to provide reference origins $601a_1$–$601a_3$. FIG. 7B shows an example wherein a different material is adhered to portions of the surface of an atomic arrangement of a reference scale 103, to provide reference origins $601b_1$–$601b_3$. FIG. 7C shows an example wherein portions in the neighborhood of the surface of an atomic arrangement of a reference scale 103 are removed by etching to provide reference origins $601c_1$–$601c_3$.

In these examples, as illustrated, a plurality of reference origins (three in the illustrated examples) are provided. Referring particularly to FIG. 7A for explanation of the operation, each time a probe 104 passes a reference origin $601a_i$(i=1–m), a rough-pitch signal is outputted. During a time period during which the probe travels from the reference origin $601a_i$ to the next reference origin $601a_{i+1}$, fine-pitch signals are outputted. Essentially the same operation is made in each of the compound scales of the FIG. 7A and FIG. 7B examples. Where the amount of relative movement between the objects 101 and 102 is large, the detecting process and the detecting time can be simplified and reduced by selectively extracting such rough-pitch signals.

Figure 8:
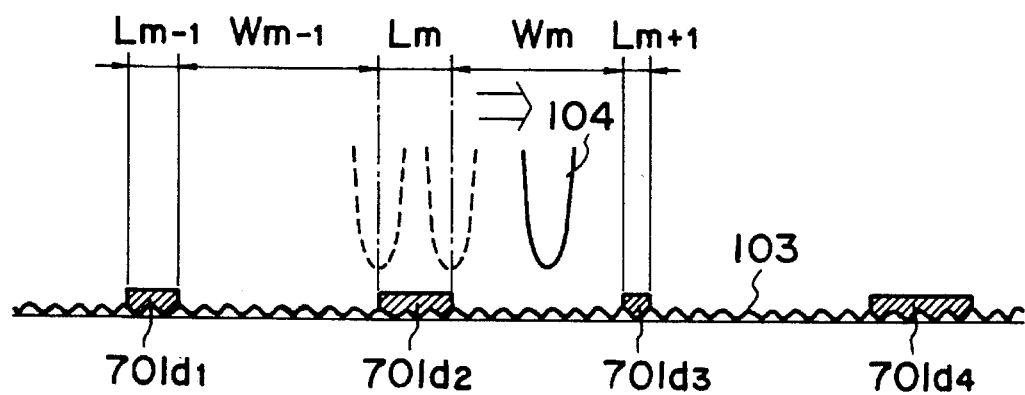
FIG. 8 is a schematic section showing an example wherein use is made of a compound scale in which plural reference origins having predetected widths and intervals are provided on a reference scale.

FIG. 8 is a section showing another embodiment of a compound scale. Reference origins $701d_1$–$701d_4$ as illustrated in this figure are different in respect to the width of origin and the interval between the origins. However, such widths and intervals are predetected by preparatory measurement, the predetected values being stored in a memory 115 (FIG. 2). In the FIG. 8 example, the widths of the reference origins $701d_1$–$701d_3$ are denoted, respectively, by $L_{m-1}$, $L_m$ and $L_{m+1}$ while the intervals between the origins $701d_1$ and $701d_2$ and between the origins $701d_2$ and $702d_3$ are denoted, respectively, by $W_{m-1}$ and $W_m$. These values are preparatorily stored into the memory 115 (FIG. 2). Each time a probe 104 passes a reference origin, a corresponding width and/or interval, being memorized, are counted. In other words, each time a reference origin is passed, a rough-pitch signal (representing the interval $W_{m-1}$ or $W_m$ between corresponding reference origins) is outputted while, on the other hand, a signal representing the width $L_{m-1}$, $L_m$ or $L_{m+1}$ of that reference origin is outputted. By doing so, the detecting process and the detecting time can be simplified and reduced, similar to the embodiments shown in FIGS. 7A–7C.

FIGS. 9A and 9B are sectional view, respectively, schematically showing yet further embodiments of compound scales. In the FIG. 9A example, there is a reference origin 801. Absolute position information of bits n ($i_1$–$i_n$), concerning this reference origin, has been recorded on the reference origin 801. When a probe 104 passes this reference origin 801, the absolute position information related to this reference origin is picked up, in a manner similar to the case of the fine-pitch signal. Therefore, it is possible to discriminate such reference origin as just having been passed by the probe. Accordingly, it is possible to obtain positional information in a reduced time.

Similarly, in the FIG. 9B example, reference origins 802, 803 and 804 have recorded thereon respective absolute position information. Grooved structures (surface steps) of shapes such as depicted at 802', 803' and 804' are formed as the reference origins 802, 803 and 804, respectively. Each grooved structure itself bears the absolute position information. Thus, each reference origin can be identified. Namely, on these grooved structures 802', 803' and 804', there are recorded the addresses i−1, i and i+1 of respective reference origins. The position of each reference origin may be predetermined. For example, the position of the leftmost side surface of each protrusion (grooved structure) may be treated as the position of a corresponding origin. Denoted at 805 and 806 are atom graduations.

In this embodiment, the bits of the absolute position information are arrayed in the advancing direction of the probe 104. However, they may be arrayed in the neighborhood of the reference origin. As a further alternative, the objects 101 and 102 may be made relatively movable also in a direction perpendicular to the above-described relatively moving direction (horizontal in the sheet of the drawing) and these bits may be arrayed in that perpendicular direction. In this case, the objects 101 and 102 are moved relative to each other in that perpendicular direction to allow read-out of the absolute position information.

FIG. 10 is a sectional view showing an embodiment wherein non-periodic graduations are used as a reference scale. In this example, the intervals of the non-periodic graduations 901 are preparatorily measured by use of a known-type scale, the obtained interval information being memorized in a memory 115 (FIG. 2). The amount of relative movement between two objects 101 and 102 is detected by use of (i) those signals which are obtainable as a result of the scan of the non-periodic graduations by a probe 104 caused by the relative movement between the objects 101 and 102 and (ii) the interval information having been stored in the memory 115.

Referring now to FIGS. 11–19, a description will be provided of means for detecting the direction of the lateral relative displacement between objects 101 and 102.

Figure 11:
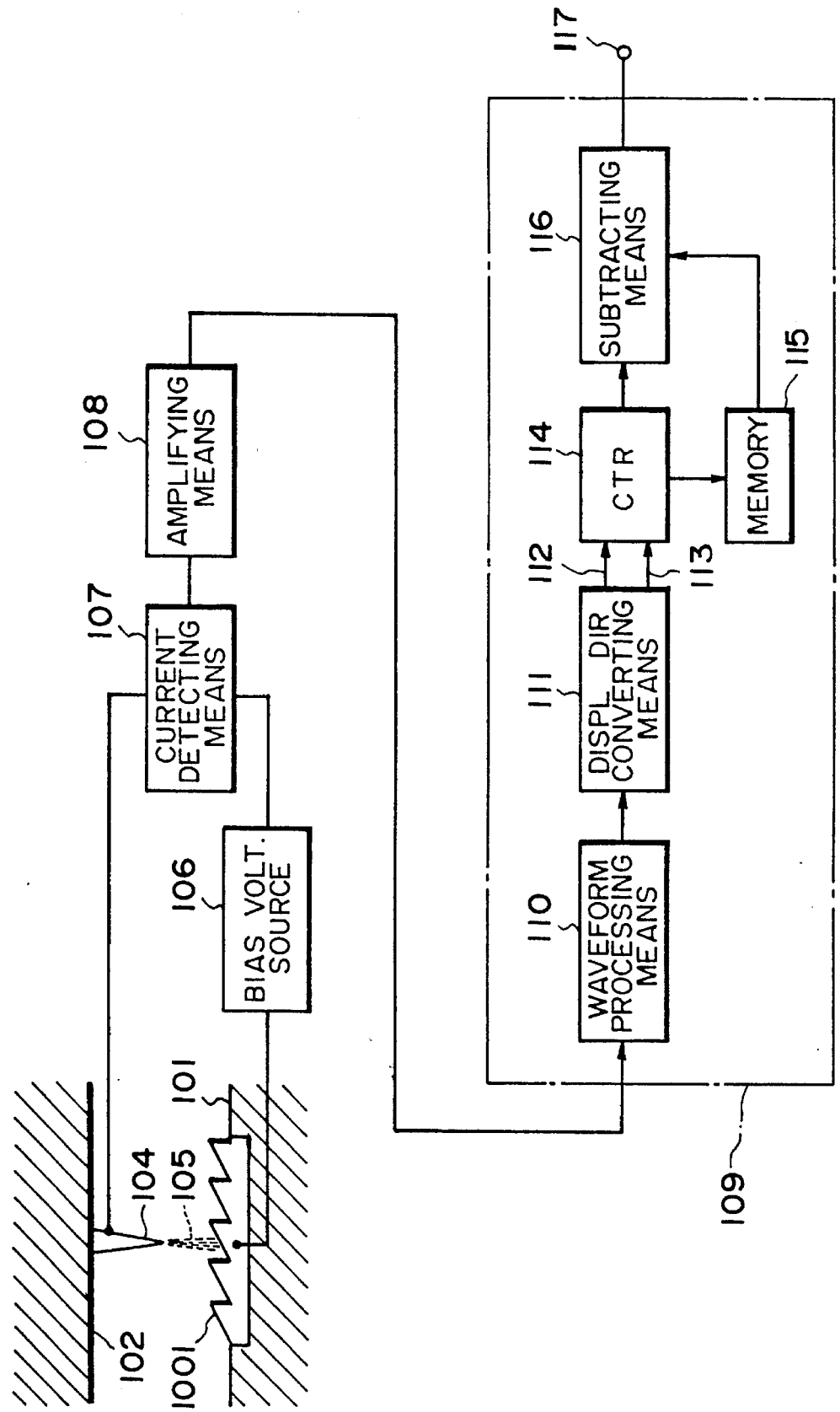
FIG. 11 is a schematic and diagrammatic view showing the structure of an encoder wherein an asymmetric-shape reference scale is used as a reference scale.

FIG. 11 shows an embodiment which uses a reference scale 1001 having an asymmetric shape (of an electron cloud distribution) in the direction of the relative displacement.

Figure 12:
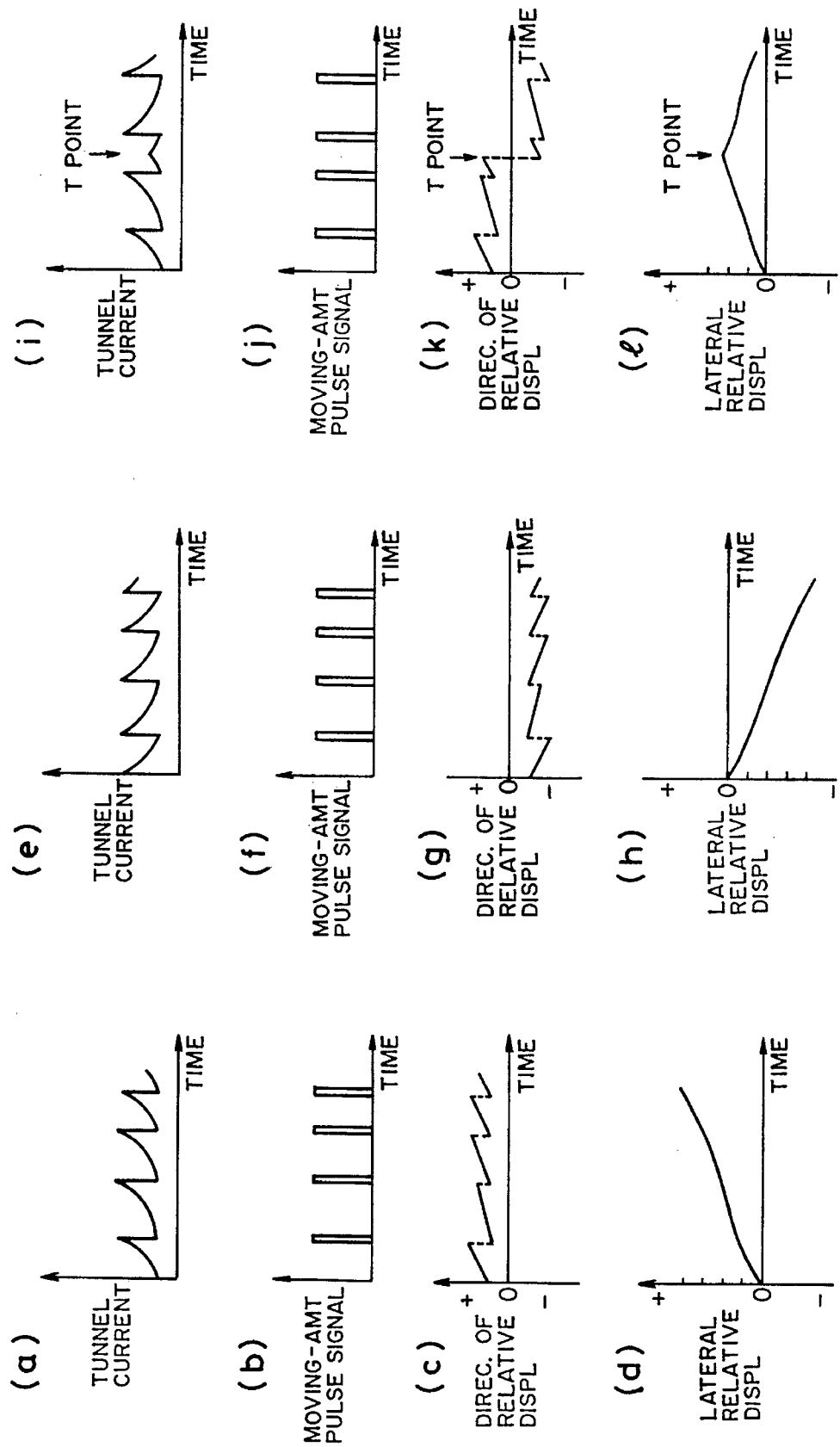
FIG. 12 is a waveform view showing signals which are obtainable in the embodiment of FIG. 11.

It is now assumed that, with the relative displacement between the objects 101 and 102, a tunnel current signal 118 changes as shown in FIG. 12, (a). In such case, within a lateral relative position information extracting means 109, there are produced a moving amount signal (edge detection pulse signal) 112 and a direction signal (differentiated signal) 113 whose waveforms are such as shown in FIG. 12, (b) and (c). By adding or subtracting the pulse number of the moving amount signal 112, in accordance with the sign (positiveness or negativeness) of the direction signal 113, there can be detected a lateral relative displacement such as shown in FIG. 12, (d) in terms of pulse count. Accordingly, in this example, it is detected that the object 102 has been displaced with respect to the object 101, rightwardly in the sheet of the drawing and by an amount as depicted in FIG. 12, (d).

Similarly, where the tunnel current changes with the relative displacement, in a manner such as shown in FIG. 12, (e), there are produced after the subsequent signal waveform processing a moving amount signal 112 and a direction signal 113 which are such as shown in FIG. 12, (f) and (g). From this, it is discriminated that the object 101 has been displaced with reference to the object 101, leftwardly in the sheet of the drawing and by an amount as depicted in FIG. 12, (h).

Also, where the tunnel current shows changes such as shown in FIG. 12, (i), it is discriminated that the direction of the relative displacement of the object 102 with respect to the object 101 has been changed at point T, from right to left in the plane of the drawing.

Figure 13A:
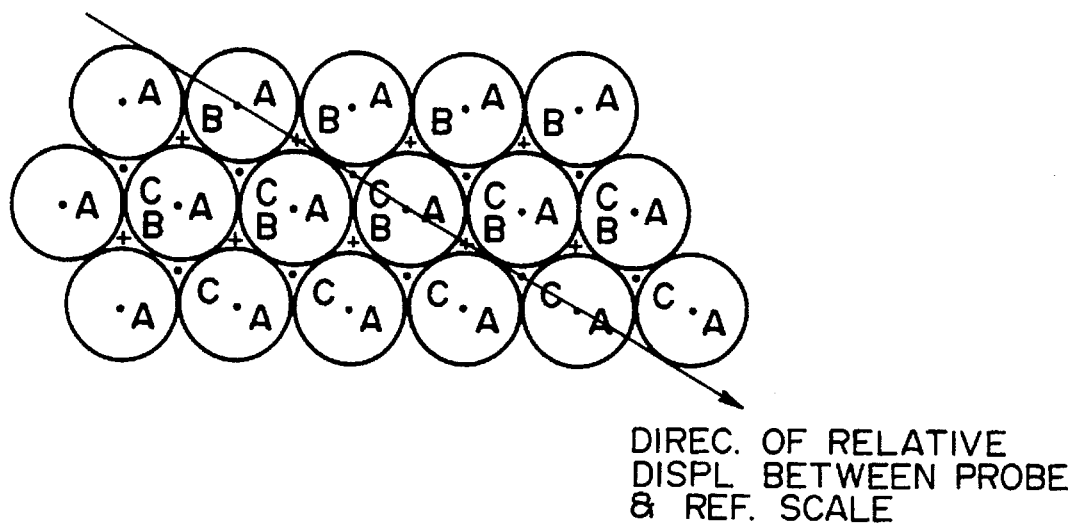
Figure 13B:
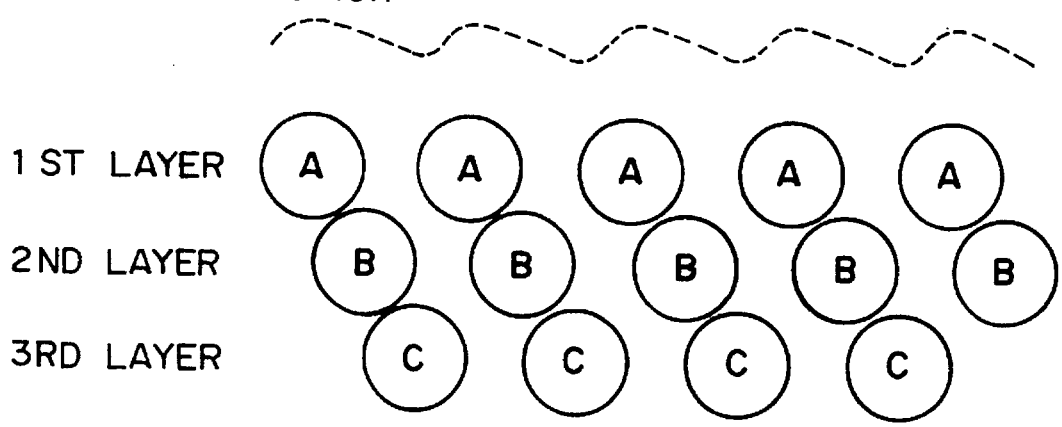

As for examples of reference scale having such an asymmetric shape (of an electron cloud distribution), there are a plane (111) of a face-centered cubic lattice as shown in FIGS. 13A and 13B (wherein FIG. 13A is a top plan view while FIG. 13B is a sectional view), an electrically conductive LB film in which asymmetry occurs in the pull-up direction, and so on.

FIG. 14 shows another embodiment wherein the direction of lateral relative displacement between objects 101 and 102 is detected. In the FIG. 14 example, laterally oscillating means 1301 is used to minutely oscillate a probe 104 in the direction of the relative displacement. By oscillating the probe 104 sufficiently quickly as compared with the speed of the relative movement between the objects 101 and 102, there can be obtained a position differentiation coefficient for the tunnel current signal, with respect to the lateral relative displacement and, from which, the direction of lateral relative displacement is detectable.

Figure 15:
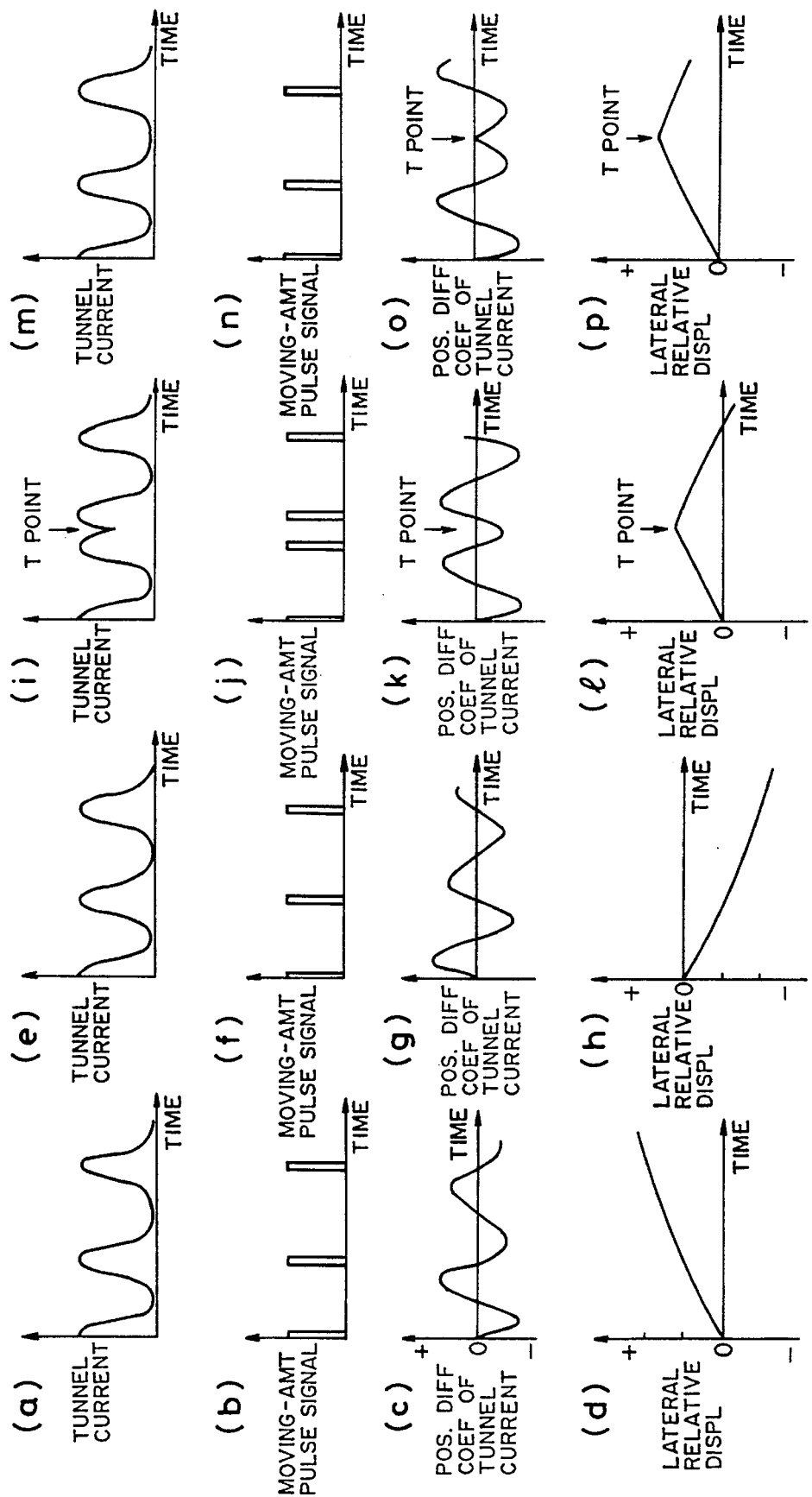
FIG. 15 is a waveform view showing signals which are obtainable in the embodiment of FIG. 14.

This will be explained. Where the probe is oscillated in the direction of the relative displacement, the produced signal has such shape that a minute oscillation signal frequency resulting from the oscillation of the probe is superposed upon a tunnel current signal which corresponds to the position on the scale, the minute oscillation signal frequency having a smaller amplitude and a higher frequency as compared with those of the tunnel current signal. The resultant signal is divided and the split portions are applied to a low-pass filter and a high-pass filter, respectively. The output of the low-pass filter is a substantially pure tunnel current signal (FIG. 15, (a), (e), (i) and (m)) which corresponds to the scale position and in which the minute oscillation signal component is excluded. Therefore, it is used for the measurement of the relative displacement. On the other hand, the output of the high-pass filter corresponds only to the minute oscillation signal (caused by the probe oscillation) in which the tunnel current signal component is excluded. The minute oscillation signal is such that, where the motion of the probe in one direction is denoted by "positive" while the motion of the probe in the opposite direction is denoted by "negative" and when the probe moves in the positive direction relative to the scale: in the case where the tunnel current signal increases, there occurs a minute oscillation signal of the same phase as the oscillation of the probe and of such amplitude that corresponds to the quantity of the increase; whereas in the case where the tunnel signal decreases, there occurs a minute oscillation signal of the opposite phase as the oscillation of the probe and of such amplitude that corresponds to the quantity of the decrease. Therefore, by applying the thus obtained signals to a lock-in amplifier while using the probe oscillation signal as a reference signal, and on the basis of the amplitude and phase obtained thereby, it is possible to obtain such a signal that corresponds to the position differentiation coefficient for the tunnel current with respect to the positive-direction relative displacement, namely such a signal as shown in FIG. 15, (c). Where the probe moves in the negative direction relative to the scale, there is produced a minute oscillation signal having the opposite phase as the probe oscillation (where the tunnel current signal increases) or a minute oscillation signal having the same phase as the probe oscillation (where the tunnel current signal decreases). Similarly, these signals are applied to the lock-in amplifier to obtain a signal which is one that corresponds to the position differentiation coefficient for the tunnel current with respect to the negative-direction relative displacement, namely, such a signal as shown in FIG. 15, (g). As described, the position differentiation coefficient signals related to the relative displacement and obtainable with respect to the same tunnel current signal may have surely the opposite phases in accordance with the difference in the advancing direction. Therefore, by detecting the phase, it is possible to detect the direction of advancement.

For example, where the tunnel current signal and the position differentiation coefficient therefor, caused with the lateral relative displacement between the objects 101 and 102, show changes such as shown in FIG. 15, (a) and (c), wherein the wave (c) goes ahead of the wave (a) by a quarter wave, it is discriminated that in the FIG. 14 example the object 102 has been displaced with respect to the object 101, rightwardly in the sheet of the drawing and by an amount as depicted in FIG. 15, (d).

Similarly, when the tunnel current changes with the relative displacement in the manner as shown in FIG. 15, (e), wherein the wave (g) has a delay by a quarter wave as compared with the wave (e), after the execution of the signal waveform processing shown in FIG. 15, (f) and (g), it is discriminated that the object 101 has been displaced with respect to the object 102, leftwardly in the sheet of the drawing and by an amount as depicted in FIG. 15, (h). Further, where the tunnel current shows changes such as, for example, shown in FIG. 15, (i) and (m), it is discriminated that the direction of the relative displacement of the object 102 with respect to the object 101 has changed at point T, from rightwardly to leftwardly.

FIG. 16 shows a yet another embodiment wherein the direction of lateral relative displacement between objects 101 and 102 is detected. In the FIG. 16 example, laterally oscillating means 1501 is effective to oscillate a probe 104 in the direction of the relative displacement of the objects. At different two points A and B, tunnel current signals A and B are detected. In the present embodiment, it is necessary that the probe 104 is oscillated sufficiently quickly as compared with the speed of the relative movement between the objects 101 and 102. Where the range of oscillation of the probe 104 is denoted by d, the method of the present embodiment is equivalent to such method in which two probes spaced by an interval d are used to detect the direction from two tunnel current signals having a phase difference with respect to the same reference scale 103.

Here, as an example, the pitch of the reference scale 103 is denoted by p and the range d of the oscillation of the probe 104 is determined so as to satisfy the following relation:

$$d = p/4 + N \cdot (p/2)$$

wherein N=0, 1, 2 . . .

Figure 17:
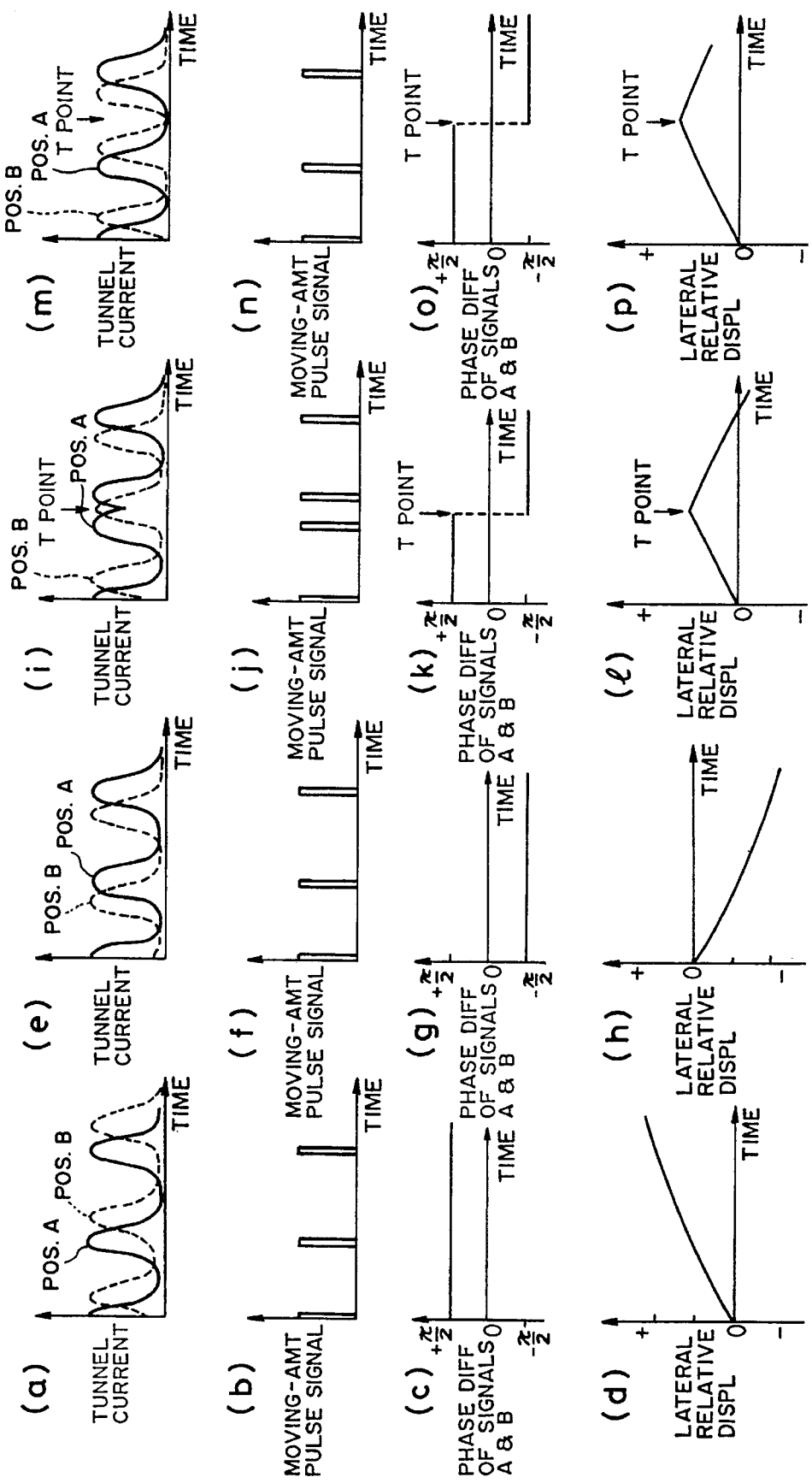
FIG. 17 is a waveform view showing signals which are obtainable in the embodiment of FIG. 16.

In this case, and where the tunnel current changes with the lateral relative displacement between the objects 101 and 102, in such manner as shown in FIG. 17, (a), it is discriminated that in the FIG. 16 embodiment the object 102 has been displaced with respect to the object 101, rightwardly in the sheet of the drawing. On the other hand, the tunnel current changes such as shown in FIG. 17, (e), it is discriminated that the object 102 has been relative displaced leftwardly. Further, the change in the tunnel current such as shown in FIG. 17, (i) or (m) represents that, at point T, the direction of relative displacement of the object 102 with respect to the object 101 has changed from rightwardly to leftwardly.

Figure 18:
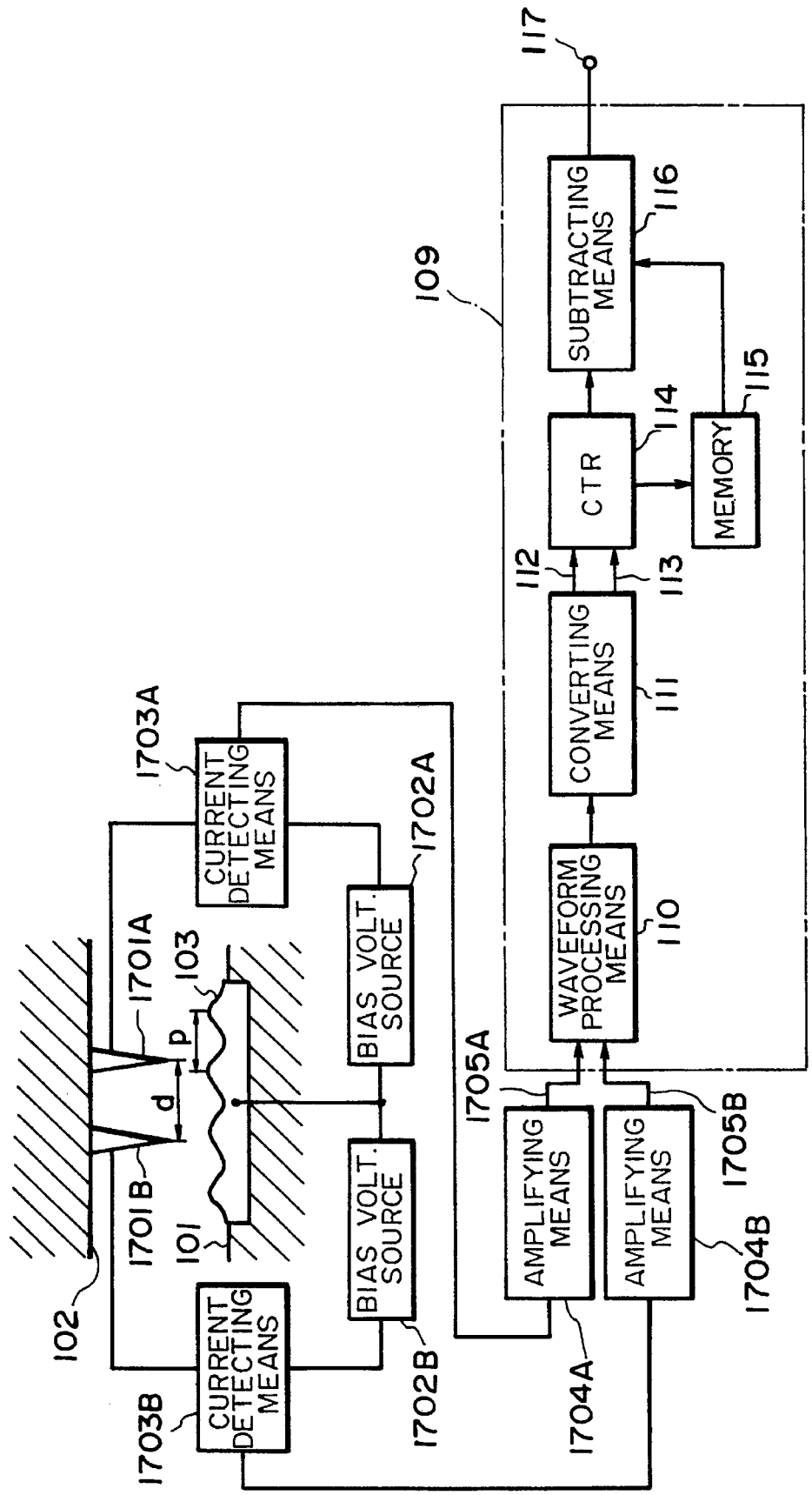
FIG. 18 is a schematic and diagrammatic view showing the structure of an embodiment wherein plural probes are used to allow detection of a direction.

FIG. 18 shows yet another embodiment wherein the direction of lateral relative displacement between objects 101 and 102 is detected. The FIG. 18 embodiment is an example wherein two probes are used. Probes 1701A and 1701B are spaced by an interval d. By detecting tunnel current signals 1705A and 1705B at the two probes, respectively, it is possible to detect the direction of the lateral relative displacement. For example, where the pitch of a reference scale 103 is denoted by p, the interval d between the probes 1701A and 1701B may be so determined as to satisfy the following equation:

$$d = p/4 + N \cdot (p/2)$$

wherein N=0, 1, 2 . . .

Figure 19:
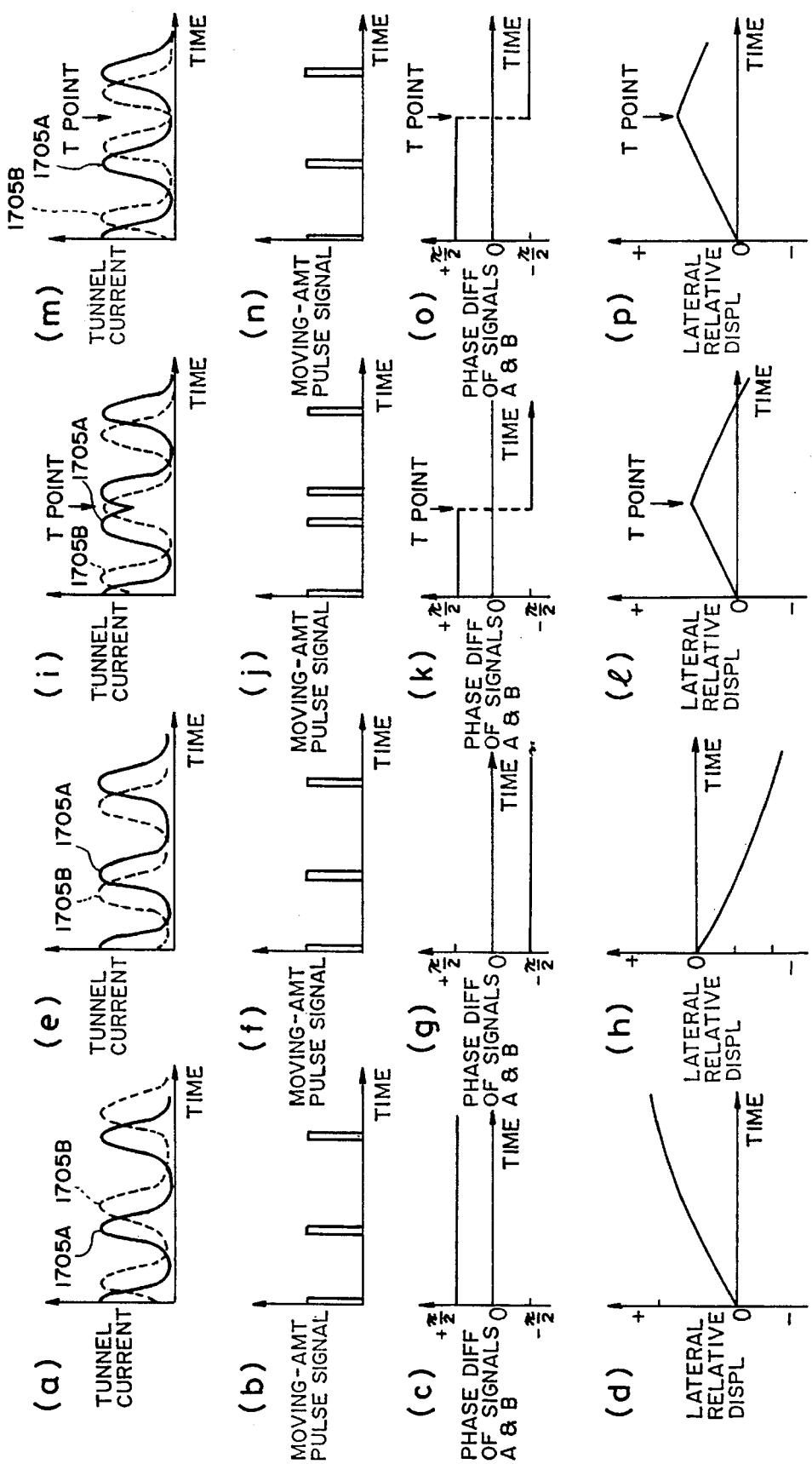
FIG. 19 is a waveform view showing signals which are obtainable in the embodiment of FIG. 18.

In this case and where the tunnel currents 1705A and 1705B at the two probes 1701A and 1701B changes with the lateral relative displacement between the objects 101 and 102, in such manner as shown in FIG. 19, (a), it is discriminated that in the FIG. 18 embodiment the object 102 has been displaced with respect to the object 101, rightwardly in the sheet of the drawing. On the other hand, where the tunnel current changes such as shown in FIG. 19, (e), it is discriminated that the object has been displaced rightwardly.

Further, where the tunnel current changes such as shown in FIG. 19, (i) or (m), it is discriminated that at point T, the direction of the relative displacement of the object 101 with respect to the object 102 has changed, from rightwardly to leftwardly.

Next, a description will be provided of embodiments in which the vertical position of a probe is controlled by use of a probe vertical position controlling means so as to maintain the tunnel current at a predetermined level and in which, while doing so, the amount of lateral relative movement is calculated.

Figure 20:
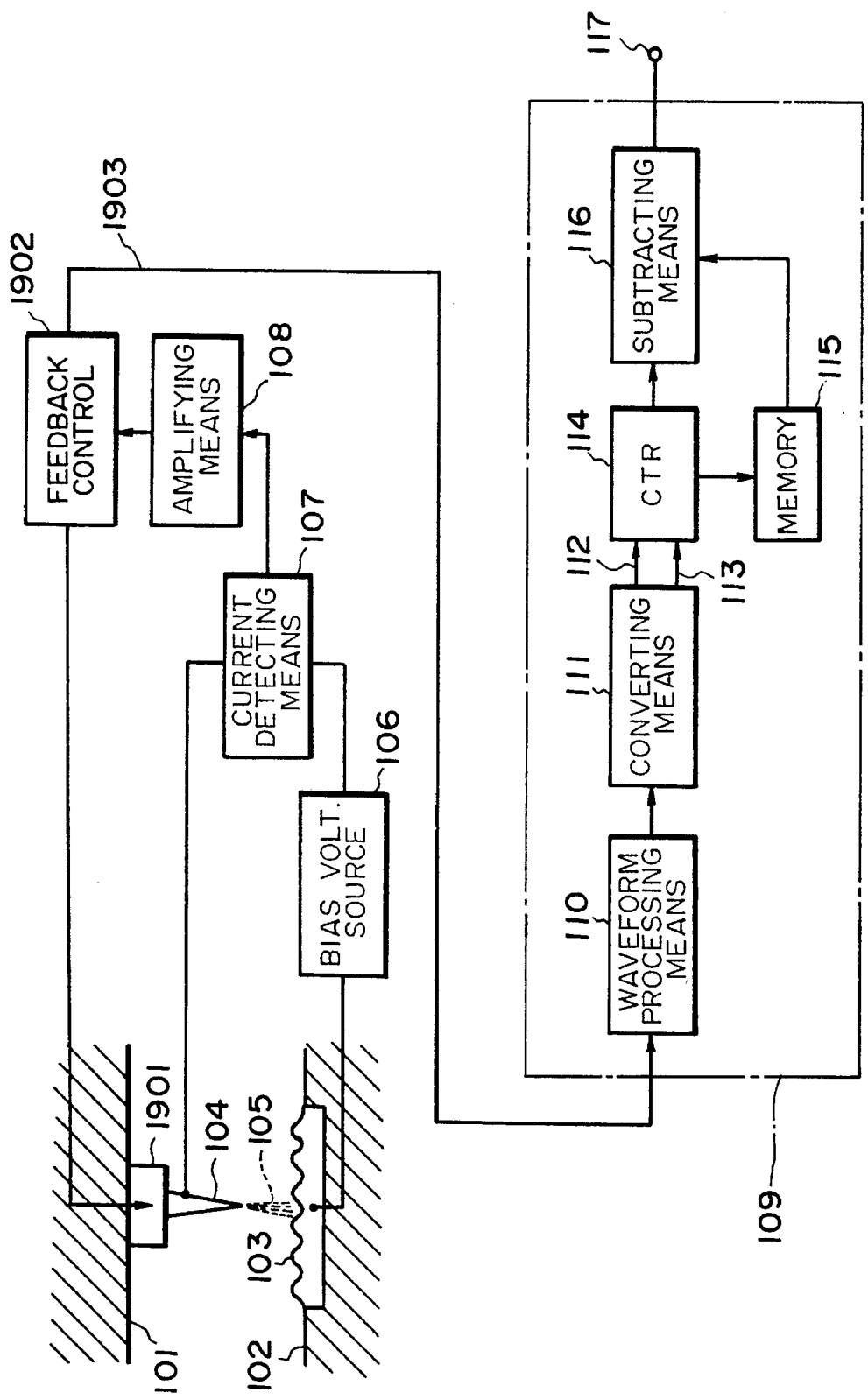
FIG. 20 is a schematic and diagrammatic view showing the structure of an encoder in which the vertical position of a probe is detected.
Figure 21:
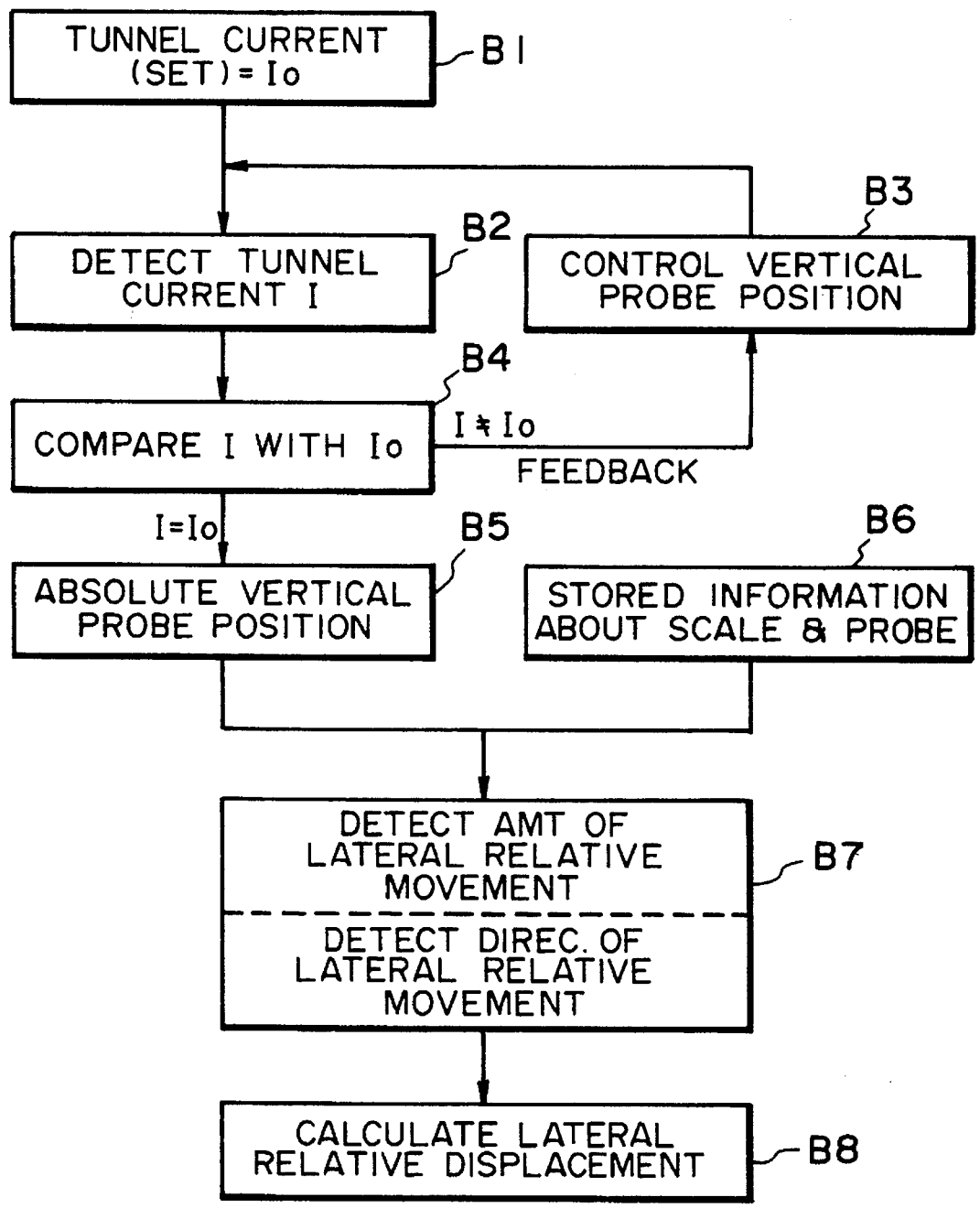
FIG. 21 is a black diagram showing the sequence of operations for the detection of lateral relative displacement based on the detection of probe vertical position, under a condition of a constant tunnel current.

FIG. 20 shows the structure of an encoder according to a further embodiment of the present invention. FIG. 21 is a block diagram for explicating the operation of the present embodiment.

In FIG. 20, for the detection of the lateral relative displacement between objects 101 and 102, first a set tunnel current level $I_0$ is determined (step B1 in FIG. 21). The vertical position of a probe 104 is controlled by use of a probe vertical position controlling means 1901. For this control, first a tunnel current level I is detected (step B2) and then the detected current I is compared with the set tunnel current level $I_0$ (step B4). If $I \neq I_0$, feedback control is made from a feedback control means 1902 to the probe vertical position controlling means 1901 (step B3). When the detected current I becomes equal to the set current $I_0$ (step B4), an absolute vertical position signal representing the absolute vertical position of the probe 104 is outputted to a lateral relative position information extracting means 109 (step B5). After this and during the subsequent lateral relative displacement between the objects 101 and 102, the probe vertical position controlling means 1901 and the feedback control means 1902 are used to execute the feedback control of the vertical position of the probe 104 so that the detected current I is constantly maintained to be equal to the set current level $I_0$, the absolute vertical position signal concerning the probe 104 being successively outputted to the lateral relative position information extracting means 109. In this case, the time required for the above-described feedback control is sufficiently short as compared with the time necessary for the objects 101 and 102 to laterally and relative displace by an amount corresponding to one pitch of the reference scale 103.

Within the lateral relative position information extracting means 109, the amount and direction of the lateral relative movement are detected (step B7), this being made on the basis of the supplied absolute vertical position signal 1903 of the probe 104 and the information which concerns the reference scale 103 and the probe 104 (step B6). More specifically, the absolute vertical position signal 1903

Figure 22:
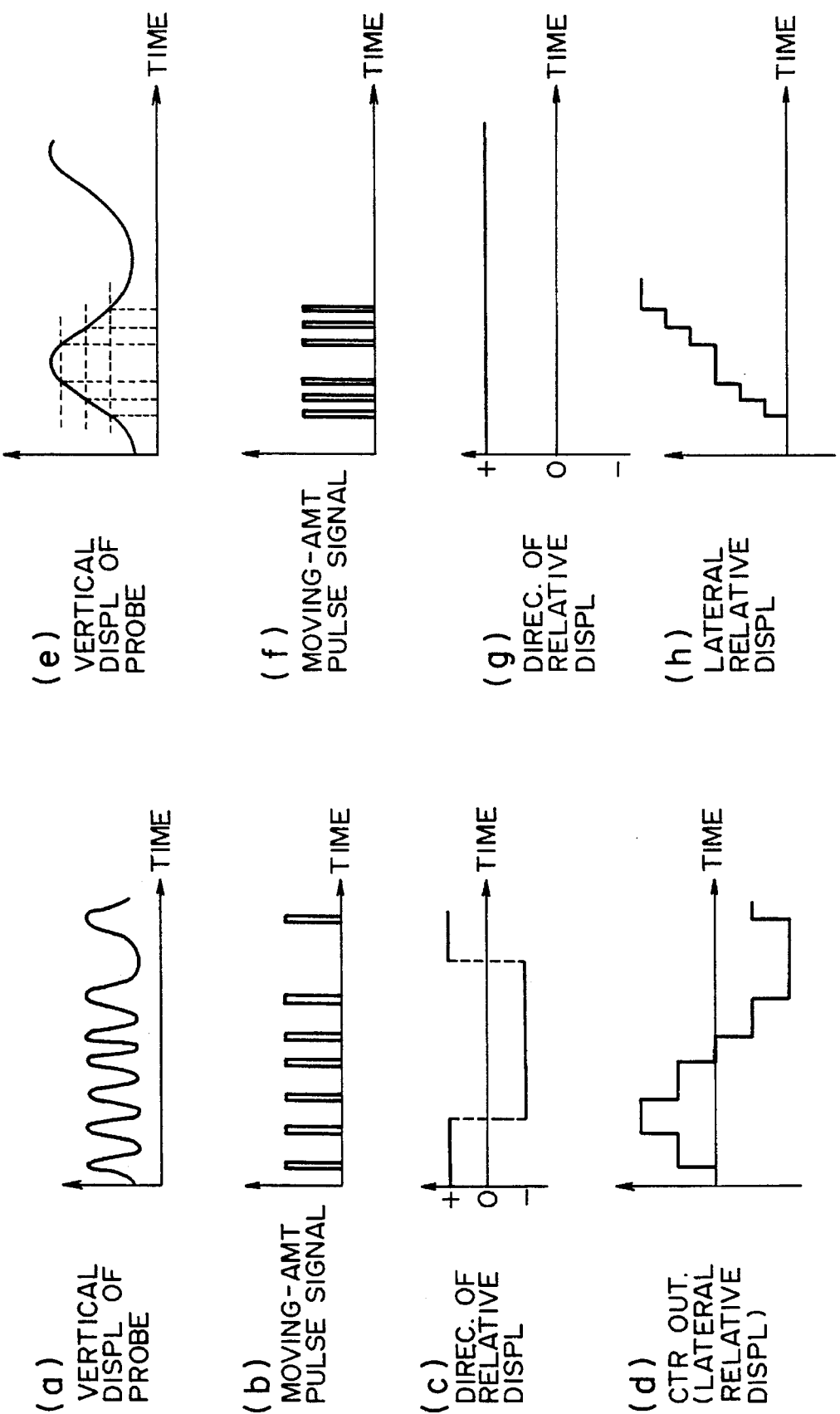
FIG. 22 is a waveform diagram showing signals which are obtainable at different constituent portions of the embodiment of FIG. 20.

(whose waveform is shown in FIG. 22, (a)) is subjected to waveform processing by a waveform processing means 110 and, thereafter, it is transformed by a converting means 111 into a moving amount signal 112 (FIG. 22, (b)) and a direction signal 113 (FIG. 22, (c)), these signals being applied to a counter 114. In this counter 114, the moving amount signal 112 and the direction signal 113 applied thereto are transformed into a lateral relative displacement. Further, by using an initial position data having been preparatorily stored in a memory 115, a subtracting means 116 operates to determine the lateral relative displacement, at signal 117 (FIG. 22, (d)), between the objects 101 and 102 (step B8).

The resolution of the encoder of the present embodiment may be of an order of the pitch of the reference scale 103 (a few angstroms where a periodic arrangement of atoms on the surface of an electrically conductive material is used as the reference scale). However, a plurality of thresholds (FIG. 22, (e)) may be used upon formation of the moving amount pulse signal from the probe vertical displacement signal, so that a multi-coded pulse signal such as shown in FIG. 22, (f), is produced. By using this in combination with the relative displacement direction signal shown in FIG. 22, (g), it is possible to obtain those signals corresponding to the divided portions of the position detection signal and, therefore, to ensure the resolution less than 1 angstrom (FIG. 22, (h)). With regard to the vertical position control, the reference scale may be moved vertically with the detection of the vertical position thereof. This is also the case with the other embodiments which will be described later.

Next, referring to FIGS. 23–30, a description will be provided of means for detecting the direction of the lateral relative displacement between the objects 101 and 102, which means is provided in an embodiment similar to the foregoing embodiment wherein the probe vertical position is detected.

Figure 23:
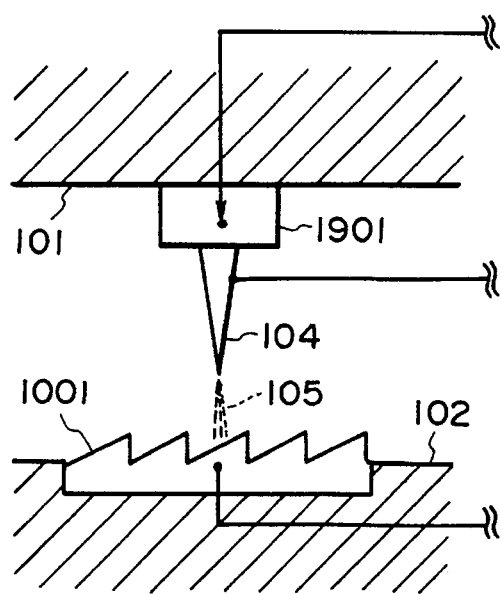
FIG. 23 is a schematic section showing an example of the FIG. 20 embodiment but, in this example, an asymmetric-shape scale is used as a reference scale.
Figure 24:
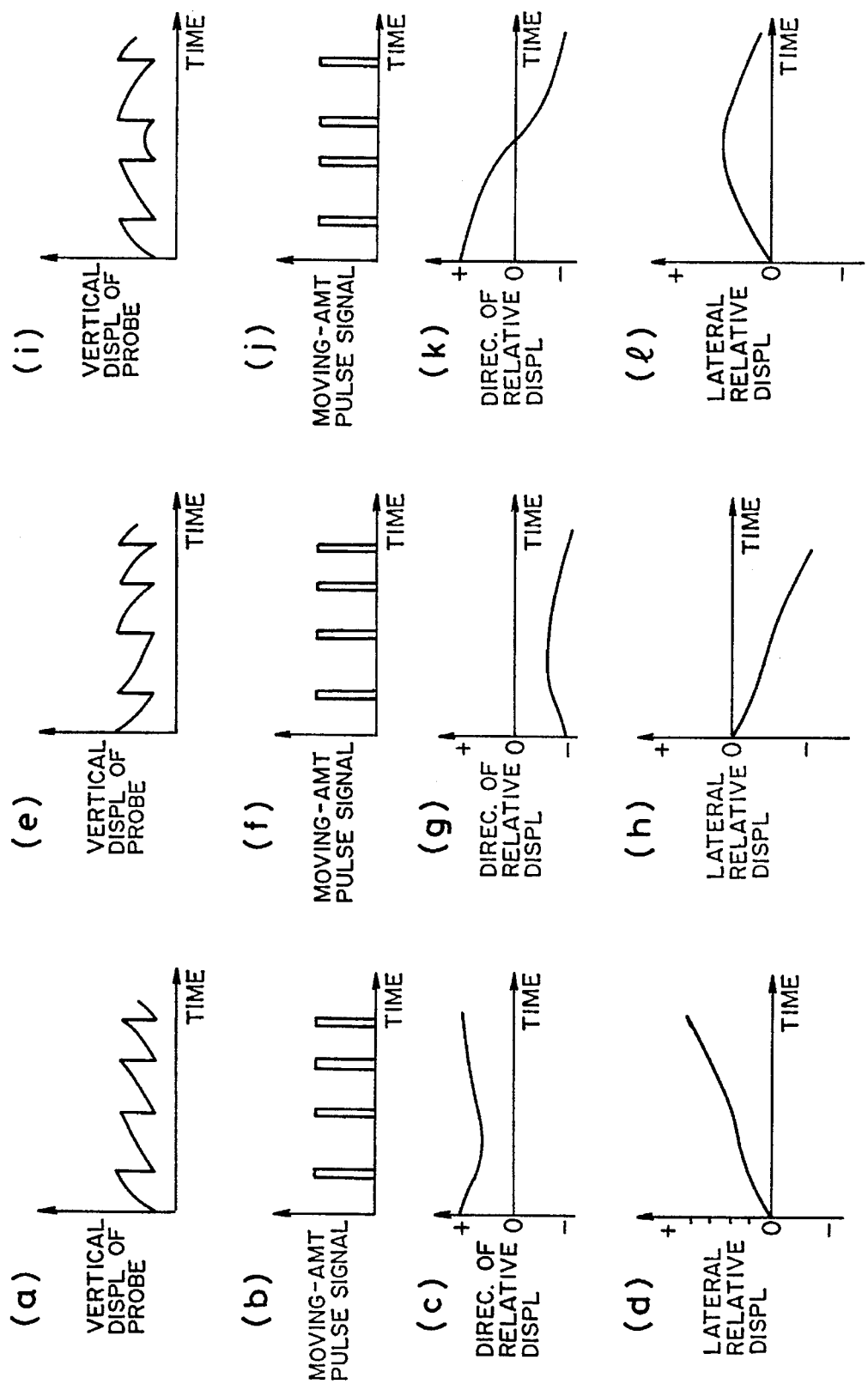
FIG. 24 is a waveform diagram showing signals which are obtainable in the FIG. 23 example.

FIG. 23 shows one example, of the FIG. 20 embodiment, in which an asymmetric shape (of an electron cloud distribution) in the direction of the relative displacement of the objects, as illustrated in FIG. 13, is used as a reference scale. Where the vertical position of a probe changes with the relative displacement of the objects 101 and 102, in a manner as shown in FIG. 24, (a), there are produced a moving amount signal 112 and a direction signal 113 within a subsequent lateral relative position information extracting means 109, such as illustrated in FIG. 24, (b) and (c), respectively. From these signals, the lateral relative displacement such as shown in FIG. 24, (d), is detectable. Therefore, in this case, it is discriminated that in FIG. 23, the object 102 has been displaced with respect to the object 101, rightwardly in the sheet of the drawing and by an amount as depicted in FIG. 24, (d).

Similarly, where the vertical displacement of the probe 104 changes with the relative displacement of the objects, in the manner as shown in FIG. 24, (e), after the signal waveform processing such as shown in FIG. 24, (f) and (g), it is discriminated that the object 102 has been displaced with respect to the object 101, leftwardly in the sheet of the drawing and by an amount as depicted in FIG. 24, (h).

Further, where, for example, the vertical displacement of the probe 104 changes such as shown in FIG. 24, (i), it is discriminated that, at point T, the direction of relative displacement of the object 102 with respect to the object 101 has changed, from rightwardly to leftwardly.

Figure 25:
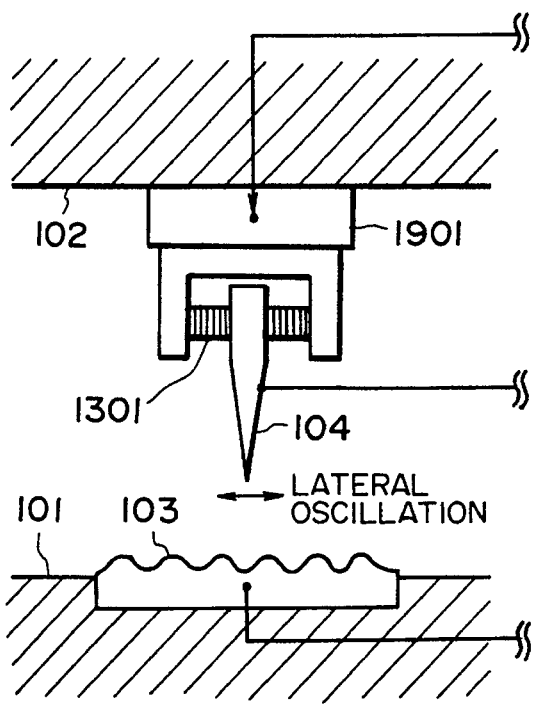
FIG. 25 is a schematic section showing an example of the FIG. 20 embodiment but, in this example, a probe is laterally oscillated for the detection of a direction.

FIG. 25 shows another example, of the above-described embodiment wherein the probe vertical position is detected, which example is arranged to detect the direction of the lateral relative displacement between the objects 101 and 102. In the FIG. 25 example, a probe 104 is oscillated minutely in the direction of the relative displacement of the objects, by use of a laterally oscillating means 1301. By oscillating the probe 104 sufficiently quickly as compared with the relative moving speed of the objects 101 and 102, it is possible to obtain a position differentiation coefficient for the absolute vertical position signal of the probe 104 with respect to the lateral relative displacement. From this, it is possible to detect the direction of the lateral relative displacement.

Figure 26:
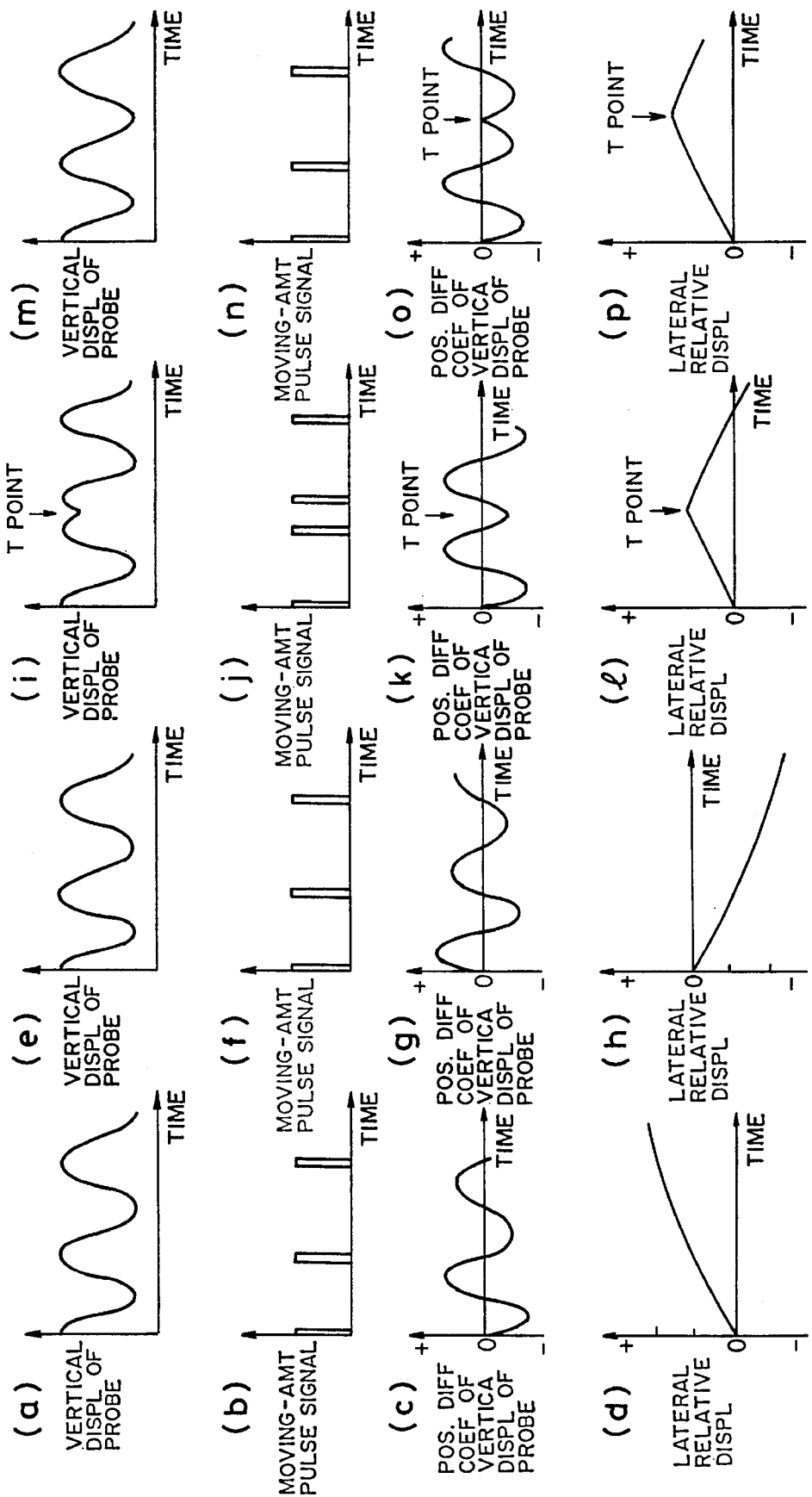
FIG. 26 is a waveform diagram showing signals which are obtainable in the FIG. 25 example.

For example, where the vertical displacement of the probe 104 and the position differentiation coefficient therefor, caused as a result of the lateral relative displacement between the objects 101 and 102, change in the manner as shown in FIG. 26, (a) and (c), then it is discriminated that in FIG. 25 the object 102 has been displaced with respect to the object 101, rightwardly in the sheet of the drawing and by an amount as depicted in FIG. 26, (d).

Similarly, where the vertical displacement of the probe 104 changes with the relative displacement of the objects in the manner shown in FIG. 26, (e), after the execution of the processing shown in FIG. 26, (f) and (g), it is discriminated that the object 101 has been displaced with respect to the object 102, leftwardly in the sheet of the drawing and by an amount as depicted in FIG. 26, (h).

Further, where there occurs a change such as shown in FIG. 26, (i) or (m), it is discriminated that, at point T, the direction of the relative displacement of the object 102 with respect to the object 101 has changed, from rightwardly to leftwardly.

Figure 27:
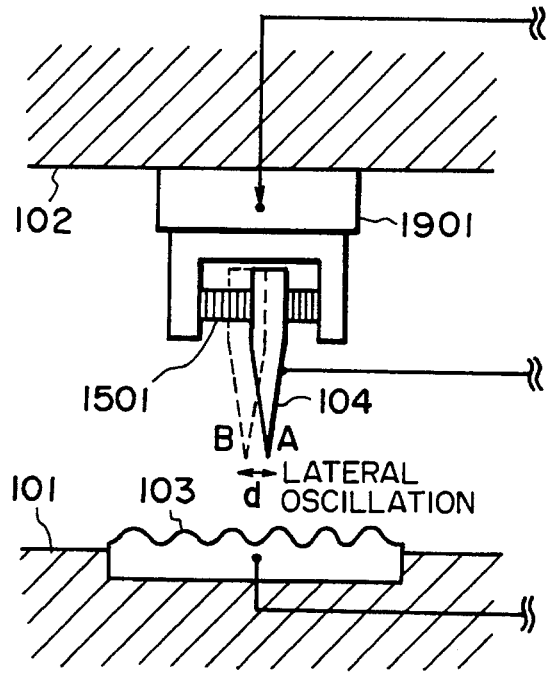
FIG. 27 is a schematic section showing an example of the FIG. 20 embodiment, wherein a probe is laterally oscillated for the detection of direction.

FIG. 27 shows a yet another example, of the above-described embodiment wherein the probe vertical position is detected, which example is arranged to detect the direction of the lateral relative displacement of the objects 101 and 102. In this example, a probe laterally oscillating means 1501 is used to oscillate a probe 104 in the direction of the relative displacement of the objects, so that at different two points A and B absolute vertical position signals A and B of the probe 104 are detected. It is necessary that the probe 104 is oscillated sufficiently quickly as compared with the relative moving speed of the objects 101 and 102 and also that, within sufficiently short time as compared with the cycle of oscillation of the probe 104, the vertical position control for the probe 104 is made by use of a probe vertical position controlling means 1901 (i.e. the feedback control for maintaining a tunnel current 105 constant). Where the range of oscillation of the probe 104 is denoted by d, the method of the present embodiment is equivalent to such a method in which two probes spaced by an interval d are used to detect the direction on the basis of two signals having a phase difference with respect to the same reference scale.

Here, as an example, the pitch of the reference scale is denoted by p and the range d of the oscillation of the probe 104 is selected so as to satisfy the following relation:

$$d = p/4 + N \cdot (p/2)$$

wherein N=0, 1, 2 . . .

Figure 28:
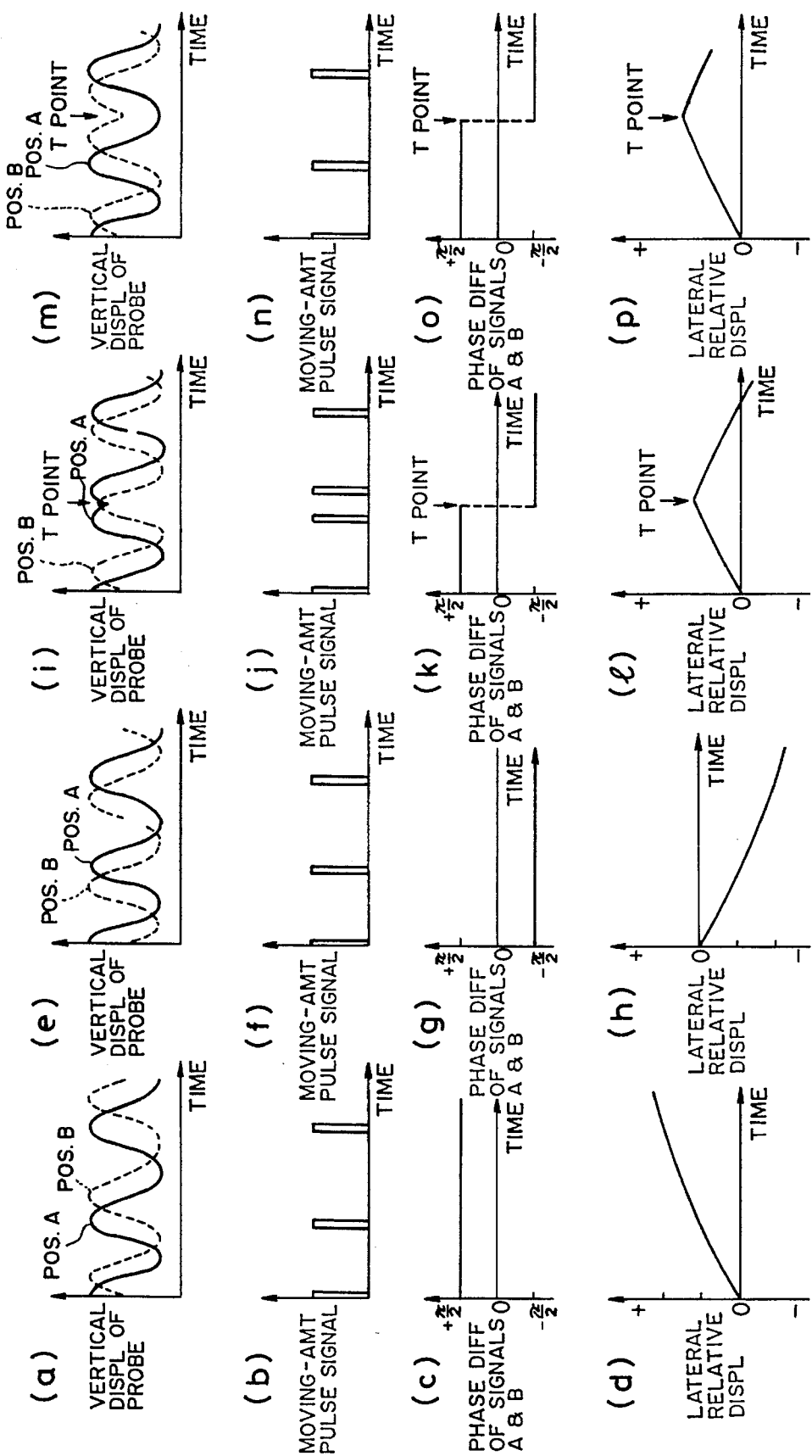
FIG. 28 is a waveform diagram showing signals which are obtainable in the FIG. 27 example.

In this case and where the vertical displacement of the probe 104 changes with the lateral relative displacement of the objects 101 and 102, in the manner as shown in FIG. 28, (a), it is discriminated that in FIG. 27 the object 102 has been displaced with respect to the object 101, rightwardly in the sheet of the drawing. Where the vertical displacement of the probe 104 is such as shown in FIG. 28, (e), it is discriminated that the object has been displaced leftwardly.

Further, where the vertical displacement of the probe 104 changes such as shown in FIG. 28, (i) or (m), it is discriminated that, at point T, the direction of the relative displacement of the object 102 with respect to the object 101 has changed, from rightwardly to leftwardly.

Figure 29:
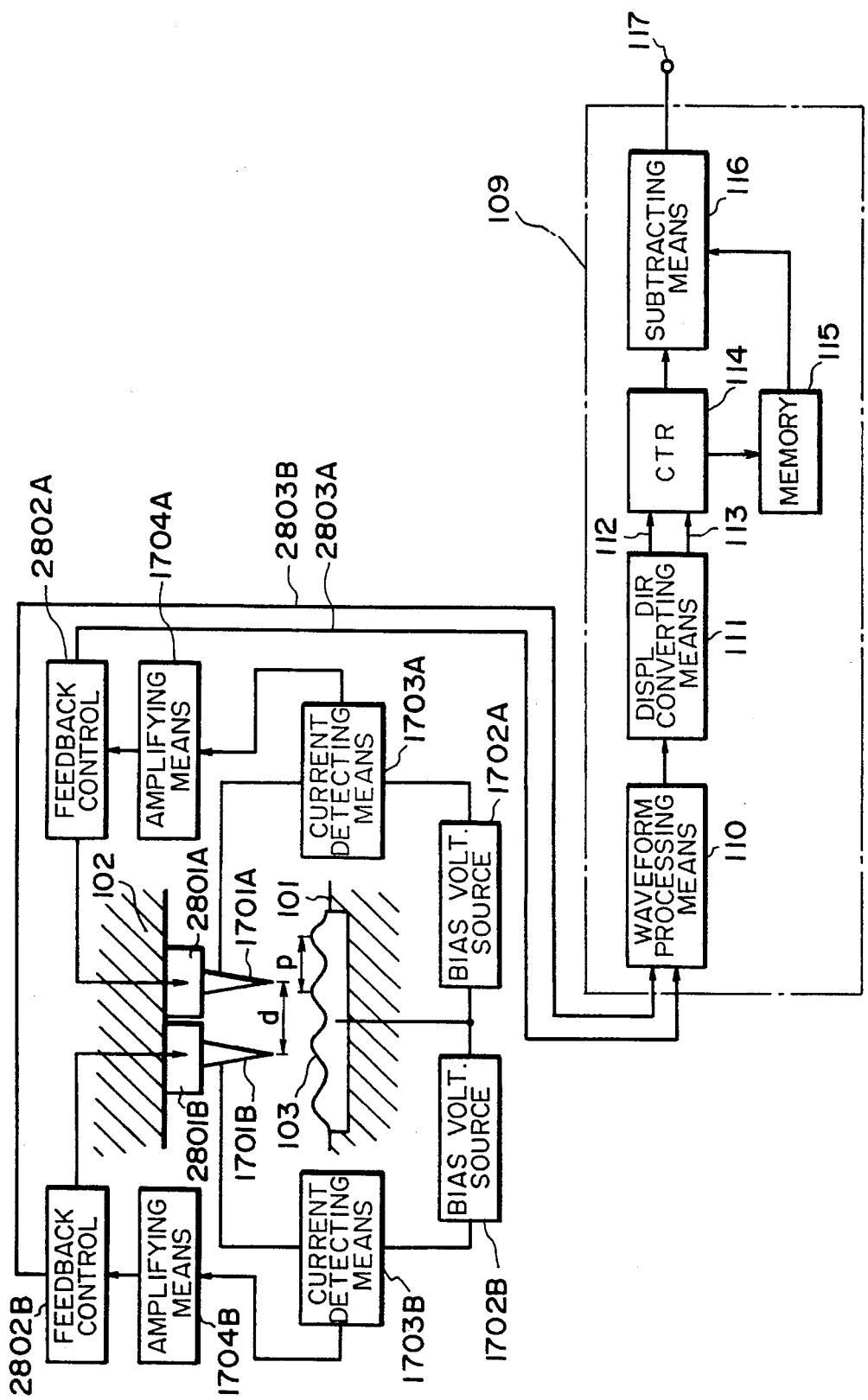
FIG. 29 is a schematic and diagrammatic view showing the structure of an embodiment wherein plural probes are used to allow detection of direction.

FIG. 29 shows a further example, of the above-described embodiment wherein the probe vertical position is detected, which example is arranged to detect the direction of the lateral relative displacement of the objects 101 and 102. In this example, two probes are used. In FIG. 29, two probe vertical position controlling means 2801A and 2801B are adapted to execute, independently of each other, the vertical position control for two probes 1701A and 1701B spaced by an interval d (i.e. feedback control for maintaining a tunnel current constant). By detecting two probe vertical displacement signals 2803A and 2803B, it is possible to detect the direction of the lateral relative displacement.

For example, the pitch of a reference scale 103 is denoted by p and the interval d between the probes 1701A and 1701B is selected so as to satisfy the following relation:

$$d = p/4 + N \cdot (p/2)$$

wherein N=0, 1, 2, ...

Figure 30:
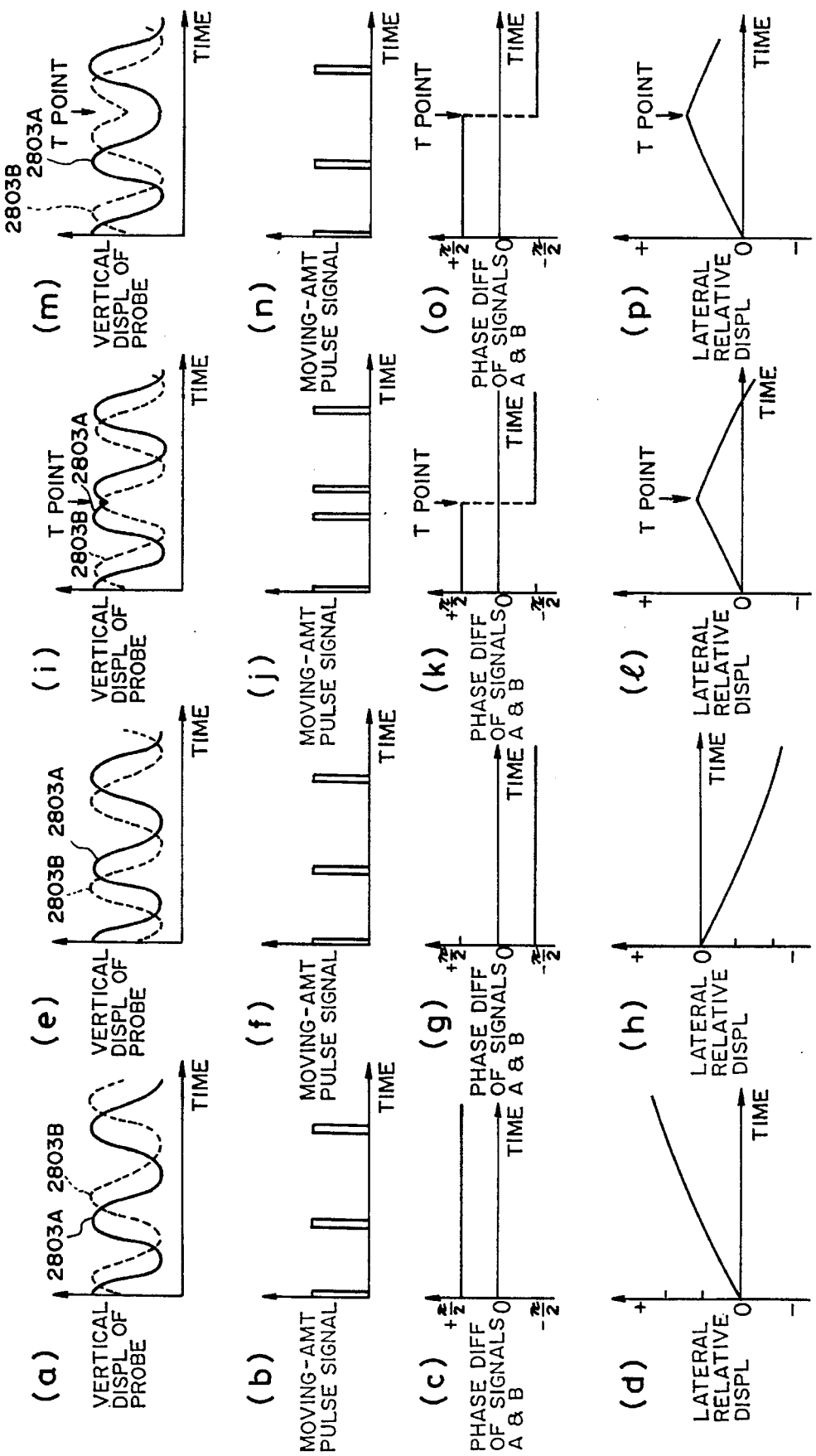
FIG. 30 is a waveform diagram showing signals which are obtainable in the FIG. 29 embodiment.

In this case and where the vertical displacements of the two probes 1701A and 1701B change with the lateral relative displacement of the objects 101 and 102 in the manner as shown in FIG. 30, (a), it is discriminated that in FIG. 29 the object 102 has been displaced with respect to the object 101, rightwardly in the sheet of the drawing. Where the vertical displacements of the two probes show the changes such as shown in FIG. 30, (e), it is discriminated that the object has been displaced rightwardly.

Further, where the vertical displacements of the two probes 1701A and 1701B, with the lateral relative displacement of the objects 101 and 102, change in the manner such as shown in FIG. 30, (i) or (m), it is discriminated that, at point T, the direction of the relative displacement of the object 102 with respect to the object 101 has changed, from rightwardly to leftwardly.

In accordance with those embodiments of the present invention, having been described hereinbefore, an atomic arrangement or otherwise is used as a reference scale and a tunnel current flowing between a probe and a reference scale is detected to determine any relative positional deviation between the probe and the reference scale. Accordingly, the invention in these aspects can provide an encoder of high resolution of an order of an interatomic distance (angstrom).

Further, according to one aspect of the invention, a tunnel current is detected while maintaining, constant, the interval between a probe and a reference scale. This assures higher-speed position detection. On the other hand, the vertical position of a probe may be detected while maintaining a constant tunnel current. This assures higher-precision position detection.

Additionally, as a reference scale, a combined structure of an atomic arrangement and a fabricated graduation or graduations may be used. This allows the detection of an absolute position and the position detection over a wider range as well as higher-speed position detection.

Figure 32:
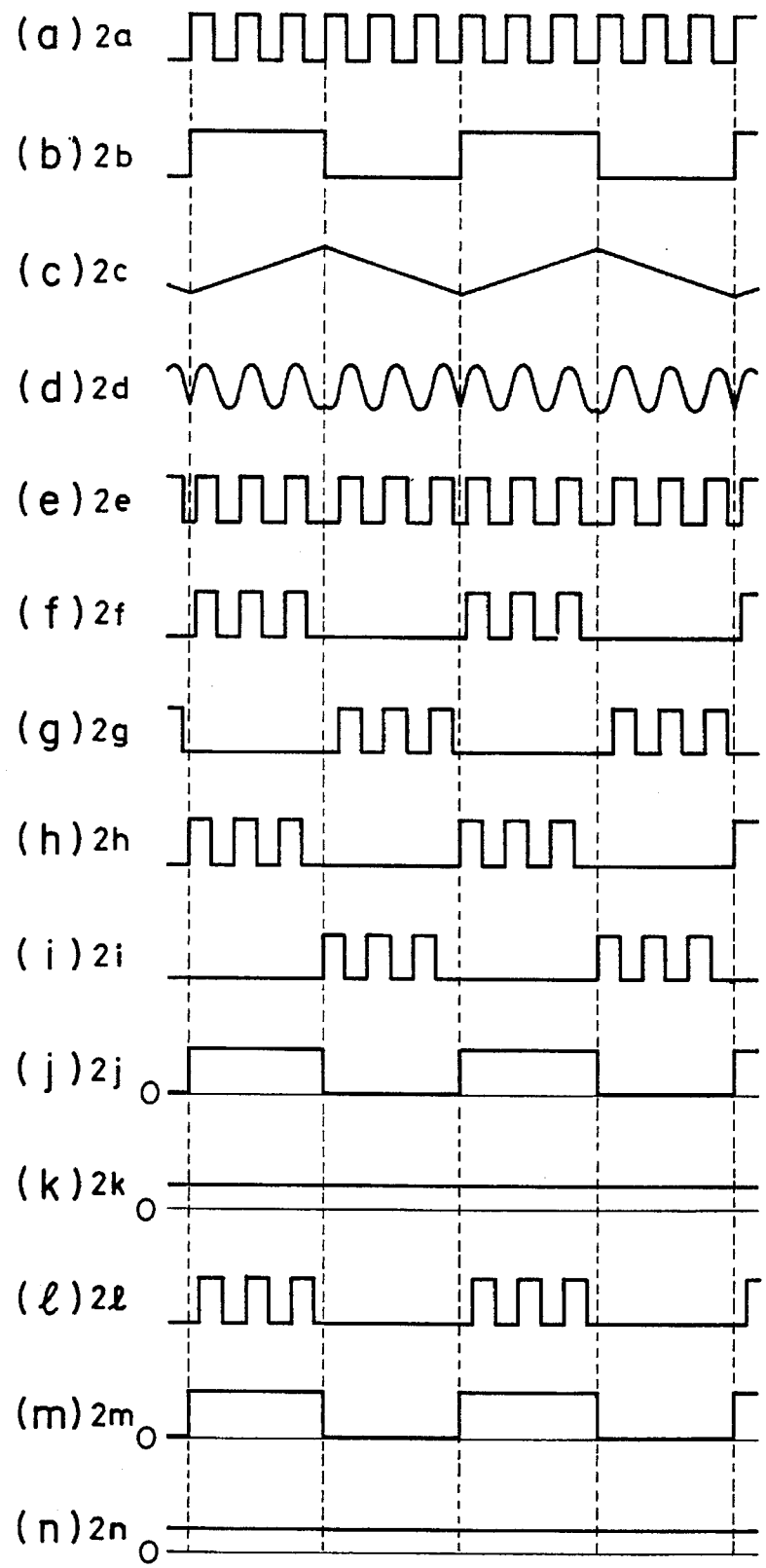
FIGS. 32 and 33 are waveform diagrams, respectively, showing signals which are obtainable at various constituent portions of the FIG. 31 embodiment.
Figure 33:
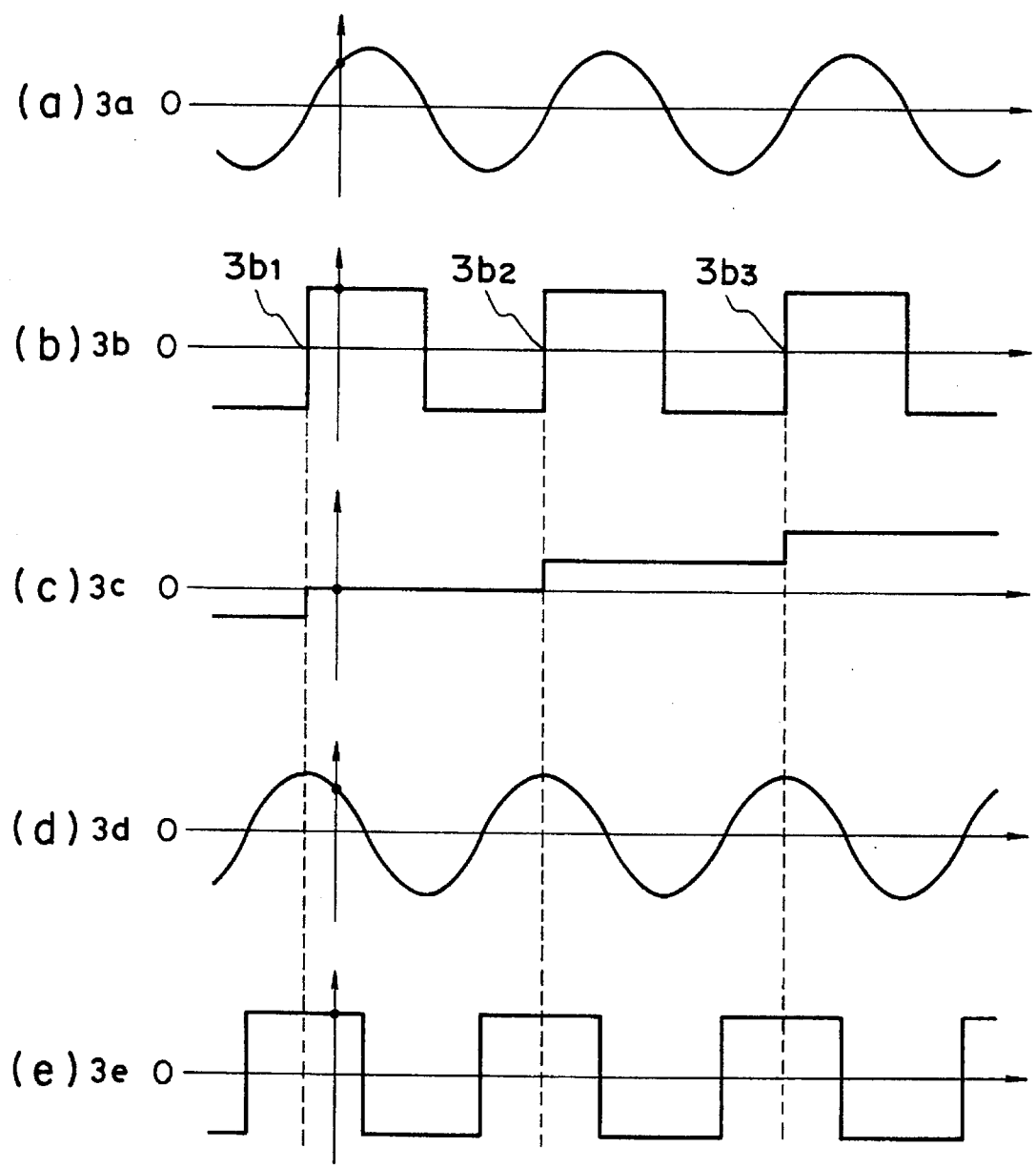

FIG. 31 shows the structure of an encoder according to another embodiment of the present invention. FIGS. 32 and 33 show signals which are obtainable at various constituent portions of the present embodiment.

In FIG. 31, an object 101 and another object 102 are made relative movable only in a lateral direction (horizontal direction in the sheet of the drawing). The object 101 is provided with an electrically conductive reference scale 103, while the object 102 is provided with an electrically conductive probe 104. To between the probe 104 and the reference scale 103, a bias voltage is applied by means of a bias voltage source 106. The probe 104 has a tip which is disposed close to the reference scale 103 so that a tunnel current schematically illustrated at 105 flows therebetween. The tunnel current 105 is converted into an electrical voltage by means of a current-to-voltage converting circuit 4107 and, after being amplified by an amplifying circuit 4108, the output signal is subjected to logarithmic transformation by a logarithmic transformation circuit 4109. This is made in order that the output signal becomes proportional to the interval between the probe and the scale.

There is provided a probe oscillating means 4110 which is operable to oscillate the probe 104 in the direction of the relative movement between the objects 101 and 102, at an oscillation frequency f and an amplitude d. The oscillation speed is made sufficiently higher than the relative moving speed of the objects 101 and 102.

A probe oscillating signal is obtained in the following manner.

Oscillator 4111 produces a rectangular wave 2a having an oscillation frequency nf which is applied to a frequency dividing circuit 4112 so that the rectangular wave is transformed into an output signal 2b. The output signal 2b is applied to a waveform transformation circuit 4113 by which it is transformed into a triangular wave (signal 2c) having an oscillation frequency f. After being amplified by an amplifier 4114, the signal 2c is applied to the probe oscillating means 4110. An appropriate oscillating means may be provided on the object 102 side to oscillate the reference scale, in place of oscillating the probe.

In order that the average interval between the probe and the reference scale is maintained constant (i.e. the average tunnel current is maintained constant) during the lateral relative movement between the objects 101 and 102, there are provided a feedback loop. The feedback loop comprises an average tunnel current level setting circuit 4115 which is adapted to detect the output signal of the logarithmic transformation circuit 4109 and to produce, in the case where the detected tunnel current level is deviated from a set level, such a signal that corrects the detected error. The feedback loop further comprises a low-pass filter 4116 and an amplifying circuit 4117. The output signal of the amplifying circuit 4117 is applied to a probe vertical position controlling means 4118 to adjust the interval between the probe and the reference scale. Here, the cut-off frequency of the low-pass filter 4115 is so selected that (i) a quick modulation component of the tunnel current which results from the variation in height of the portion of the reference scale as opposed to the probe, which variation occurs as a consequence of the scan of the reference scale by the probe being oscillated laterally relative to the reference scale, can be excluded and that (ii) a gradually changing component of the tunnel current which results from the inclination or otherwise of the reference scale during the lateral relative movement between the objects 101 and 102, can be transmitted. As a consequence, the probe vertical position controlling means 4118 does not follow the change in the tunnel current caused by the oscillation of the probe, but it follows only the change in the tunnel current caused as a result of the relative movement between the objects 101 and 102. In this manner, the vertical position of the probe is controlled.

As a result of the oscillation of the probe by the probe oscillating means 4110, there is produced in the tunnel current 105 flowing between the probe and the reference scale a modulation component of a frequency (2p/d)f (wherein p is the pitch of the reference scale) which is in accordance with the scan of the reference scale by the probe.

If, at this time, the objects 101 and 102 relative move in a lateral direction, there occurs a phase shift of the aforementioned modulation component of a frequency (2p/d)f, appearing in the tunnel current 105, with respect to a reference signal (which may be the probe oscillating signal, for example). Since one cycle of the signal (phase shift of 2 $\pi$) corresponds to the lateral relative shift of the probe and the reference scale by a distance corresponding to the unit scale (the interval between two adjacent graduations) of the reference scale, the amount of lateral relative movement between the objects 101 and 102 can be detected by detecting such phase shift. In this case, even if there is a defect or otherwise on the reference scale, only a portion of the waveform of the signal is disturbed and the phase shift is not substantially affected thereby. Therefore, the precision is hardly deteriorated due to the external disturbance such as the defect or otherwise.

Referring now to FIGS. 32 and 33, details of the signal processing method will be described.

The modulation component of the frequency (2p/d)f which appears in the tunnel current is picked up (as signal 2d), after being processed by the current-to-voltage converting circuit 4107, the amplifying circuit 4108, the logarithmic transformation circuit 4109 and a bandpass filter 4118. The signal 2d is binary-coded by a binarizing circuit 4119, whereby a signal 2e is produced.

Here, the amplitude of the probe oscillating signal 2c to be applied to the probe oscillating means 4110 (i.e. the gain of the amplifying circuit 4114) is adjusted to satisfy the relation "d=2p/n", such that the frequency of the signal 2e is made equal to "nf". Additionally, while using as a reference signal the frequency-divided signal 2b, having been produced by frequency-dividing the output signal 2a of the oscillator 4111 by means of the frequency dividing circuit 4112 so that the frequency is demultiplied to 1/n, the signal 2e is separated into two signals 2f and 2g by use of an analog switch 4120.

Also, by use of another analog switch 4121, the signal 2a is separated into two signals 2h and 2i, while using the signal 2b as a reference signal.

Here, the signals 2f and 2h are applied to a phase comparator 4122 to obtain a phase difference output signal 2j which is in turn averaged by an averaging circuit 4123, whereby an output signal 2k is produced. When the objects 101 and 102 moves relative and laterally, the signal 2k changes, such as a signal 3a, in accordance with the amount of the relative movement. Further, each time the phase difference becomes equal to "2n$\pi$" (n is an integral number), the zero-cross point, for example, of the phase difference output signal 3a is detected by use of a binarizing circuit 4124 to produce pulses (signal 3b). The number of these pulses is counted by an up/down counter 4125. By doing so, it is possible to detect the amount of relative phase deviation between the signals 2f and 2h, as an encoder output signal 3c. At this time, the phase deviation direction signal to be applied to the counter 4125, namely, the up/down condition (sign), can be determined in the following manner:

First, by using the output signal 2a of the oscillator 4111 and by using a phase shifter 4126 and an analog switch 4127, a signal 2l whose phase is shifted by 90 degrees as compared with the signal 2h is produced. The signal 2l as well as the signal 2f are applied to a phase comparator 4128 to produce a phase difference output signal 2m which, in turn, is averaged by an averaging circuit 4129, whereby a signal 2n is produced.

Similar to the signal 2k, the signal 2n changes such as a signal 3d with the lateral relative movement between the objects 101 and 102 and in accordance with the amount of such relative movement.

Figure 34:
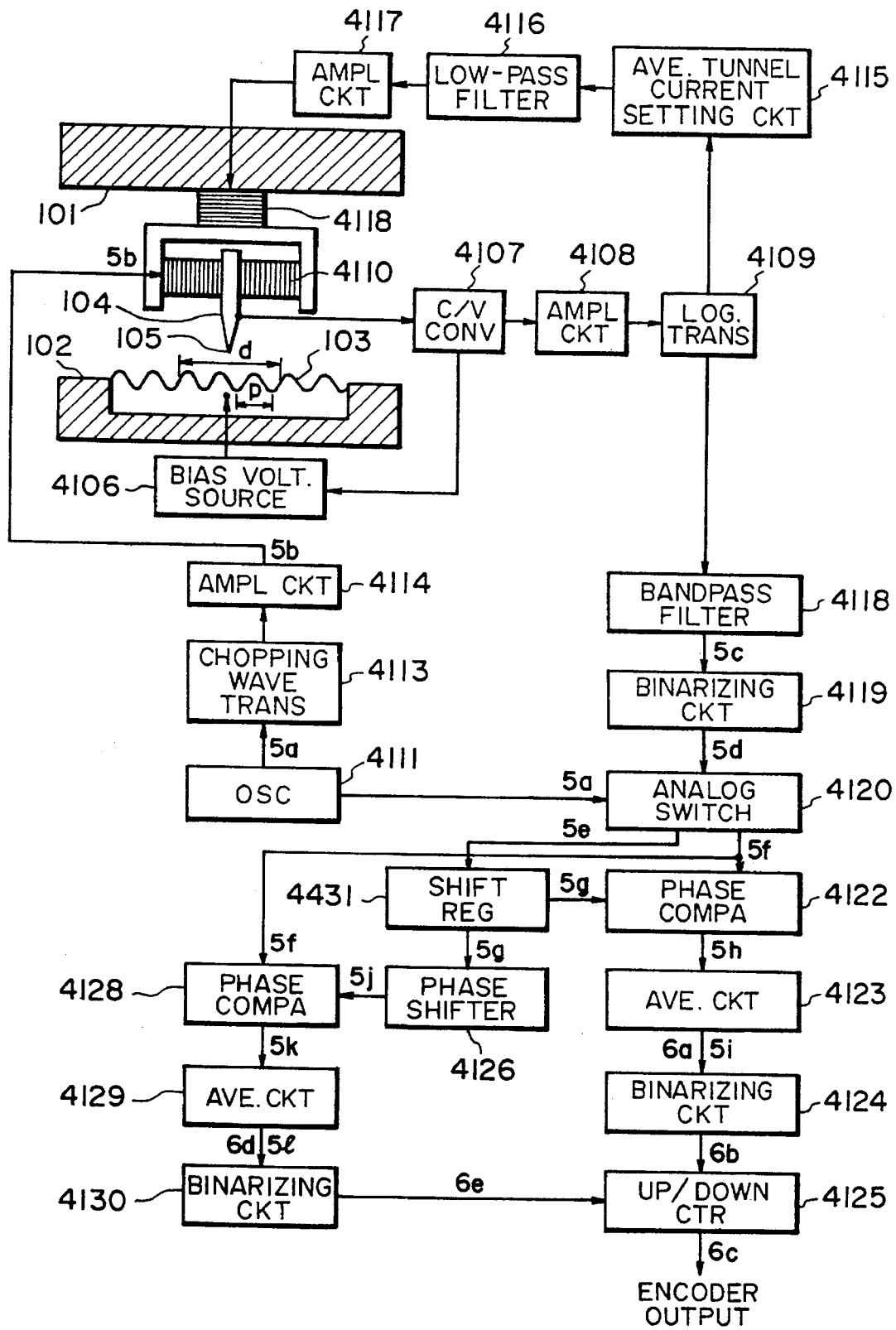
FIG. 34 is a schematic and diagrammatic view of an encoder according to another embodiment of the present invention.
Figure 35:
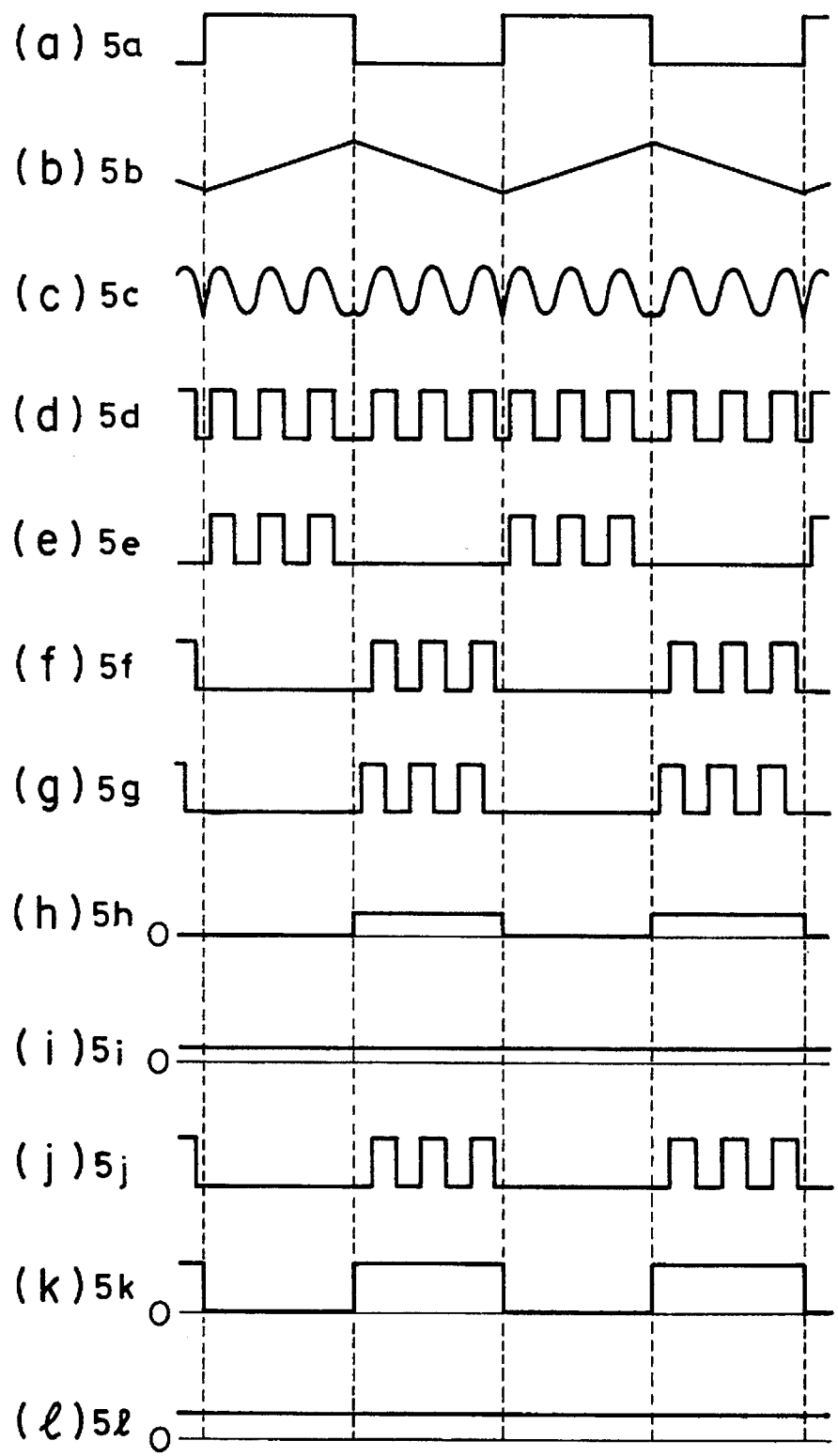
FIGS. 35 and 36 are waveform diagrams, respectively, showing signals which are obtainable at various constituent portions of the FIG. 34 embodiment.
Figure 36:
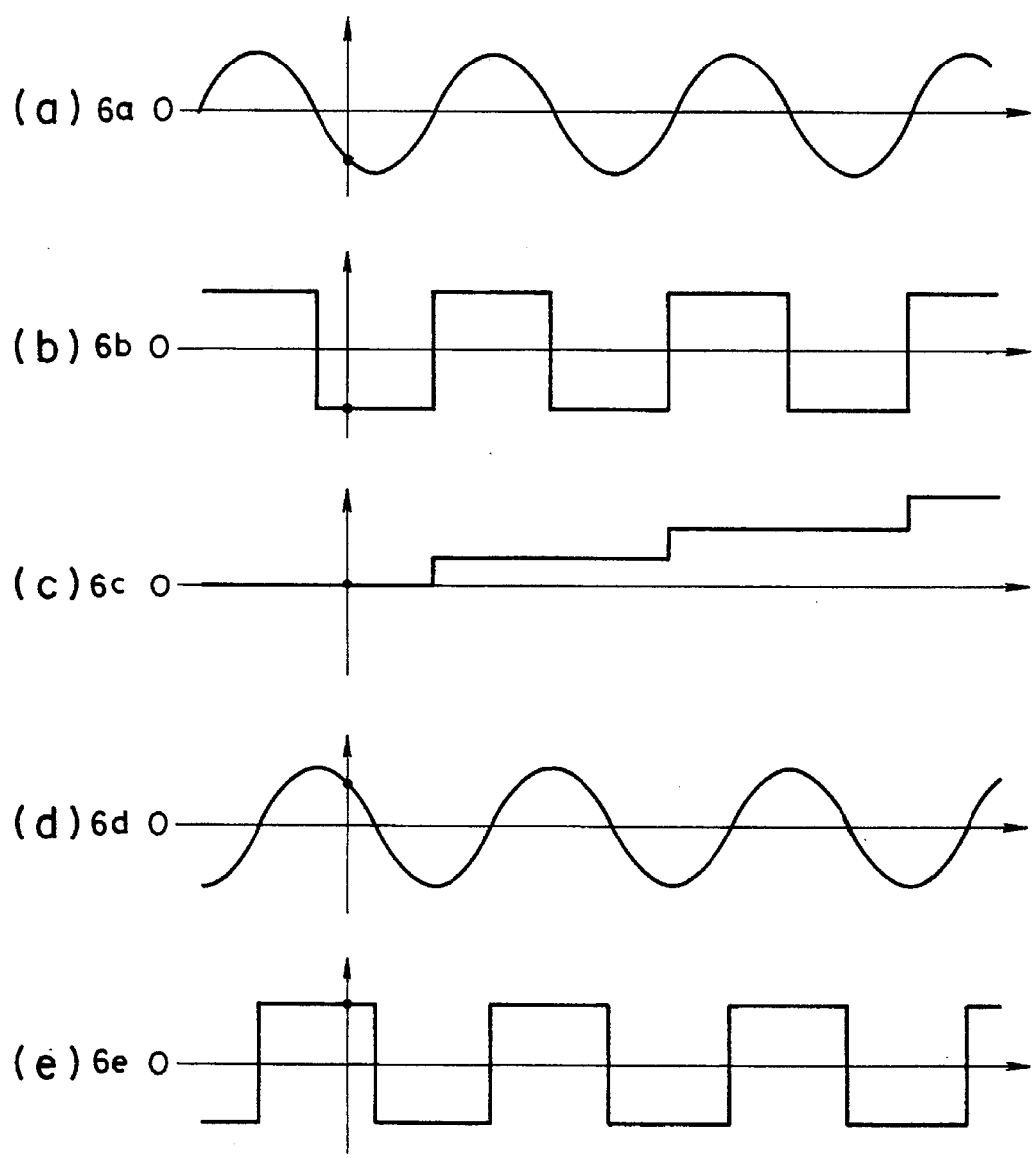

Further, the signal 3d is binary-coded by a binarizing circuit 4130, such that a phase deviation direction signal, namely, an up/down signal 3e to be applied to the up/down counter 4125 is produced. If the sign of this up/down signal 3e is positive at the moment of the rise point ($3b_1$, $3b_2$ and $3b_3$) of the moving amount pulse signal 3b, the up/down counter 4125 operates to count up the number of pulses. If, to the contrary, the sign of the up/down signal 3e at the moment of the rise point is negative, the counter 4125 operates to count down the same. In this manner, the amount of lateral relative movement between the objects 101 and 102 can be detected. In the method used in the present embodiment, one cycle (2 $\pi$) of phase shift corresponds to the relative displacement by a distance corresponding to the unit scale (pitch) of the reference scale. Even if there is a defect or otherwise of the reference scale, only a portion of the waveform of the signal is disturbed and the phase shift is not substantially affected thereby. Therefore, the correctness of the measured value can be retained irrespective of the presence of any external disturbance. In place of the above-described signal processing made to the signals 2f and 2h, the signals 2g and 2i may be processed in a similar manner. The relative displacement can be detected also in this way. FIG. 34 shows the structure of an encoder according to a further embodiment of the present invention. FIGS. 35 and 36 show signals which are obtainable at various constituent portions of the present embodiment.

In FIG. 34, an object 101 and another object 102 are made relative movable only in a lateral direction (a horizontal direction in the sheet of the drawing). The object 101 is provided with an electrically conductive reference scale 103, while the object 102 is provided with an electrically conductive probe 104. To between the probe 104 and the reference scale 103, a bias voltage is applied by means of a bias voltage source 106. The probe 104 has a tip which is disposed so close to the reference scale 103 that a tunnel current, schematically illustrated at 105, flows therebetween. The tunnel current 105 is converted into an electrical voltage by means of a current-to-voltage converting circuit 4107 and, after being amplified by an amplifying circuit 4108, it is subjected to logarithm transformation by means of a logarithm transformation circuit 4109.

There is provided a probe oscillating means 4110 which is operable to oscillate the probe 104 in the direction of the relative movement between the objects 101 and 102, at an oscillation frequency f and an amplitude d. The oscillation speed is made sufficiently higher than the relative moving speed of the objects 101 and 102.

Probe oscillating signal is obtained in the following manner.

Oscillator 4111 produces a rectangular wave 2a having an oscillation frequency f which is applied to a waveform transformation circuit 4113 by which it is transformed into a triangular wave. After being amplified by an amplifier 4114, the signal (signal 5b) is applied to the probe oscillating means 4110. An appropriate oscillating means may be provided on the object 102 side to oscillate the reference scale, in place of oscillating the probe.

In order that the average interval between the probe and the reference scale is maintained constant (i.e. the average tunnel current is maintained constant) during the lateral relative movement between the objects 101 and 102, there are provided a feedback loop. The feedback loop comprises an average tunnel current level setting circuit 4115 which is adapted to detect the output signal of the logarithmic transformation circuit 4109 and to produce, in the case where the detected tunnel current level is deviated from a set level, such a signal that corrects the detected error. The feedback loop further comprises a low-pass filter 4116 and an amplifying circuit 4117. The output signal of the amplifying circuit 4117 is applied to a probe vertical position controlling means 4118 to adjust the interval between the probe and the reference scale. Here, the cut-off frequency of the low-pass filter 4115 is so selected that (i) a quick modulation component of the tunnel current which results from the variation in height of the portion of the reference scale as opposed to the probe, which variation occurs as a consequence of the scan of the reference scale by the probe being oscillated laterally relative to the reference scale, can be excluded and that (ii) a gradually changing component of the tunnel current which results from the inclination or otherwise of the reference scale during the lateral relative movement between the objects 101 and 102, can be transmitted. As a consequence, the probe vertical position controlling means 4118 does not follow the change in the tunnel current caused by the oscillation of the probe, but it follows only the change in the tunnel current caused as a result of the relative movement between the objects 101 and 102. In this manner, the vertical position of the probe is controlled.

As a result of the oscillation of the probe by the probe oscillating means 4110, there is produced in the tunnel current 105 flowing between the probe and the reference scale a modulation component of a frequency (2p/d)f (wherein p is the pitch of the reference scale) which is in accordance with the scan of the reference scale by the probe. If, at this time, the objects 101 and 102 relative move in a lateral direction, there occurs a phase shift of the aforementioned modulation component of a frequency (2p/d)f, appearing in the tunnel current 105, with respect to a reference signal (which may be the probe oscillating signal, for example). Since one cycle of the signal (phase shift of 2 π) corresponds to the lateral relative shift of the probe and the reference scale by a distance corresponding to the unit scale (the interval between two adjacent graduations) of the reference scale, the amount of lateral relative movement between the objects 101 and 102 can be detected by detecting such phase shift. In this case, even if there is a defect or otherwise on the reference scale, only a portion of the waveform of the signal is disturbed and the phase shift is not substantially affected thereby. Therefore, the precision is hardly deteriorated due to the external disturbance such as the defect or otherwise.

Referring now to FIGS. 35 and 36, details of the signal processing method will be described.

The modulation component of the frequency (2p/d)f which appears in the tunnel current is picked up (as signal 5c), after being processed by the current-to-voltage converting circuit 4107, the amplifying circuit 4108, the logarithmic transformation circuit 4109 and a bandpass filter 4118. The signal 5c is binary-coded by a binarizing circuit 4119, whereby a signal 5D is produced.

Additionally, while using as a reference signal the output signal 5e of the oscillator 4111, the signal 5d is separated into two signals 5e and 5f by use of an analog switch 4120.

Also, a shift register 4431 operates to provide a delay of time ½f, whereby a signal 5g is produced.

Here, the signals 5f and 5g are applied to a phase comparator 4122 to obtain a phase difference output signal 5h which is in turn averaged by an averaging circuit 4123, whereby an output signal 5i is produced. When the objects 101 and 102 moves relative and laterally, the signal 5i changes, such as a signal 6a, in accordance with the amount of the relative movement. Further, each time the phase difference becomes equal to "2π" (n is an integral number), the zero-cross point, for example, of the phase difference output signal 6a is detected by use of a binarizing circuit 4124 to produce pulses (signal 6b). The number of these pulses is counted by an up/down counter 4125. By doing so, it is possible to detect the amount of relative phase deviation between the signals 5f and 5g, as an encoder output signal 6c. At this time, the phase deviation direction signal to be applied to the counter 4125, namely, the up/down condition (sign), can be determined in the following manner:

First, a signal 5j whose phase is shifted by 90 degrees as compared with the signal 5g is produced. The signal 5f as well as the signal 5j are applied to a phase comparator 4128 to produce a phase difference output signal 5k which, in turn, is averaged by an averaging circuit 4129, whereby a signal 2l(6d) is produced.

Similarly to the signal 5i, the signal 5l changes such as a signal 6d with the lateral relative movement between the objects 101 and 102 and in accordance with the amount of such relative movement.

Further, the signal 6d is binary-coded by a binarizing circuit 4130, such that a phase deviation direction signal, namely, an up/down signal 6e to be applied to the up/down counter 4125 is produced. In this embodiment, the up-down counter 4125 operates to count down the number of pulses if the sign of the signal 6e at the moment of the pulse rise point of the signal 6b is positive, whereas the counter 4125 counts up if the sign of the signal 6e at the same moment is negative.

In this manner, the lateral relative displacement between the objects 101 and 102 can be detected. In the method used in the present embodiment, one cycle (2 π) of phase shift corresponds to the relative displacement by a distance corresponding to a half of the unit scale (pitch) of the reference scale.

In accordance with these embodiments of the present invention, as described hereinbefore, an atomic arrangement or otherwise is used as a reference scale and a tunnel current flowing between a probe and the reference scale is detected to thereby detect the relative positional deviation between the probe and the reference scale. Accordingly, the present invention can provide an encoder having a high resolution of an order of interatomic distance (angstrom). Further, by relative oscillating the probe and the reference scale in the direction of the relative positional deviation, it is possible to ensure stable and reliable encoder in which substantially no error occurs, irrespective of the presence of any local defect of the reference scale used or any external disturbance such as vibration.

Next, a description will be provided of an aspect of the present invention according to which an encoder capable of conducting high precision and wider range measurement is provided.

Figure 37:
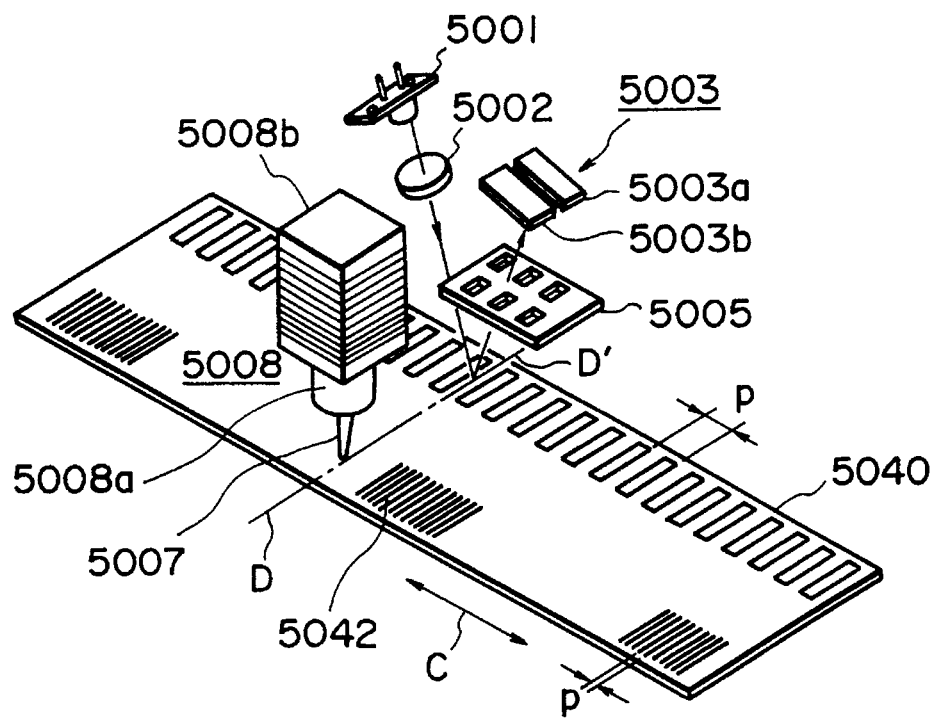
FIG. 37 is a perspective view schematically showing an encoder according to a further embodiment of the present invention.

FIG. 37 shows an embodiment of the encoder according to this aspect of the present invention. In FIG. 37, denoted at 5001 is a light emitting element; denote at 5002, a collimator lens; at 5003, a light receiving portion which comprises two light receiving elements 5003a and 5003b; and denote at 5005, a perforated code plate. Denoted at 5040 is a metallic code plate which is movable in the direction of an arrow C. The code plate 5040 is provided with a scale 5041 to be used with a first position detecting means and another scale 5042 to be used with a second position detecting means, these scales being formed on the same plane. The code plate 5040 is used as a reflection type and, for this reason, the scale 5041 comprises what is called "black-and-white pattern" formed by a combination of such portions as having a large reflection factor and such portions as having substantially no reflectivity, those two types of portions being formed at a regular pitch. A portion of the light reflected by the pattern of the scale 5041 passes through the perforated code plate 5005, and the intensity of the light passing therethrough changes periodically in accordance with the relative displacement between the two code plates 5005 and 5040. The scale 5042 has a pitch which is very fine as compared with that of the scale 5041. The scale 5042 may be made by the following manner. A substrate coated with a resist material is used and a scale pattern is transferred thereonto by means of electron-beam pattern drawing or lithography. After resist development, etching treatment is made, whereby grooves each having a predetermined depth from the surface of the code plate are formed successively in the direction of arrow C. In this embodiment, the pitch of the scale 5042 is set to be equal to 1/N of the pitch of the scale 5041, wherein N is an integral number.

There are provided a probe 5007 made of an electrically conductive material, and a probe driving means 5008 operable to move the probe in a direction substantially perpendicular to the surface of the code plate 5040. The probe driving means 5008 comprises two piezoelectric actuators 5008*a* and 5008*b*. The actuator 5008*a* comprises a single piezoelectric material and functions as a first probe driver. The actuator 5008*a* has an end connected to the probe 5007, while the other end of it is fixed to an end of the piezoelectric actuator 5008*b* which comprises a multi-layered type piezoelectric device and which functions as a second probe driver. The other end of the actuator 5008*b* are fixedly secured, together with the first position detecting means, to a casing of a position detecting head (both being not shown). The first position detecting means is provided by various elements such as the light emitting element 5001, the collimator lens 5002, the light receiving element 5003 and the perforated code plate 5005. The probe 5007 and the probe driving means 5008 cooperate with a control means, which comprises various blocks shown in FIG. 38, to provide the second position detecting means.

Figure 38:
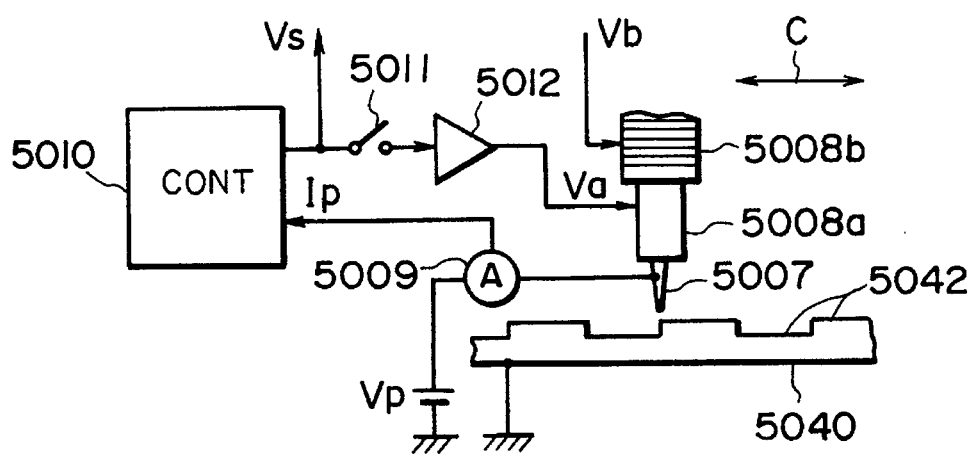
FIG. 38 is a diagrammatic view showing control means of the encoder of the FIG. 37 embodiment.

In FIG. 38, denoted at 5009 is a detecting means for detecting an electric current Ip which flows through the probe 5007 when a certain voltage Vp is applied to and between the code plate 5040 and the probe 5007. Controller 5010 produces a signal Vs which is applied, when a switch 5011 is closed to, a piezoelectric device driver 5012 for controlling the piezoelectric actuator 5008*a*, in order that the distance between the probe 5007 and the scale 5042 on the code plate 5040 is maintained constant and, as a result of which, the electric current Ip is maintained constant. Electric voltage Vb is produced by a driver (not shown) and is used to drive the second driver 5008*b* so as to move the probe 5007 so that it comes close to the scale 5042, to such a distance that allows detection of the electric current Ie. Once the voltage Vb is set, the magnitude thereof is retained fixed during the use of the encoder.

Next, the operation of the second position detecting means will be explained.

The second position detecting means utilizes an operational principle similar to that of a scanning tunneling microscope (STM) which is discussed in "Scanning Tunneling Microscope" by Kajimura et al, Solid State Physics, Vol. 22, No. 3, pp. 176–185 (1987), or in "Recent Progress in the Scanning Tunneling Microscope" by H. Adachi, Proc. 6th Sensor Symposium, pp. 137–142 (1986) or otherwise. This is also with the case of the embodiments described in the foregoing.

Figure 39:
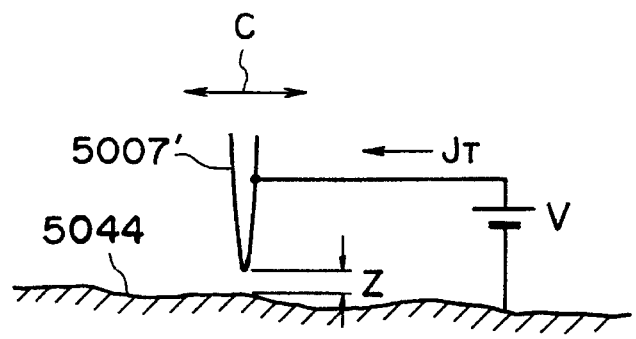
FIG. 39 is a schematic view explicating the principle of a scanning tunneling microscope, which principle is used in the present invention.

More specifically, it is known that, when as shown in FIG. 39 an electrical voltage V is applied to between a sample 5044 and a probe 5007' made of an electrically conductive material and the interval therebetween is gradually reduced, and when the interval is reduced to a distance Z, there occurs a flow of minute electric current $J_T$ which is called a "tunnel current". The scanning tunneling microscope (STM) uses this principle. The tunnel current changes exponentially with the distance Z, as represented by equation (1) and as described hereinbefore.

Here, if the probe 5007' is moved in the direction of an arrow C while moving the same upwardly and downwardly so that the distance Z is maintained constant, the vertical movement itself of the probe 5007' corresponds to the surface shape of the sample 5044 in the direction of the arrow C. Also, it has been confirmed that the resolution in the direction along the surface is of an order of atom.

Figure 40:
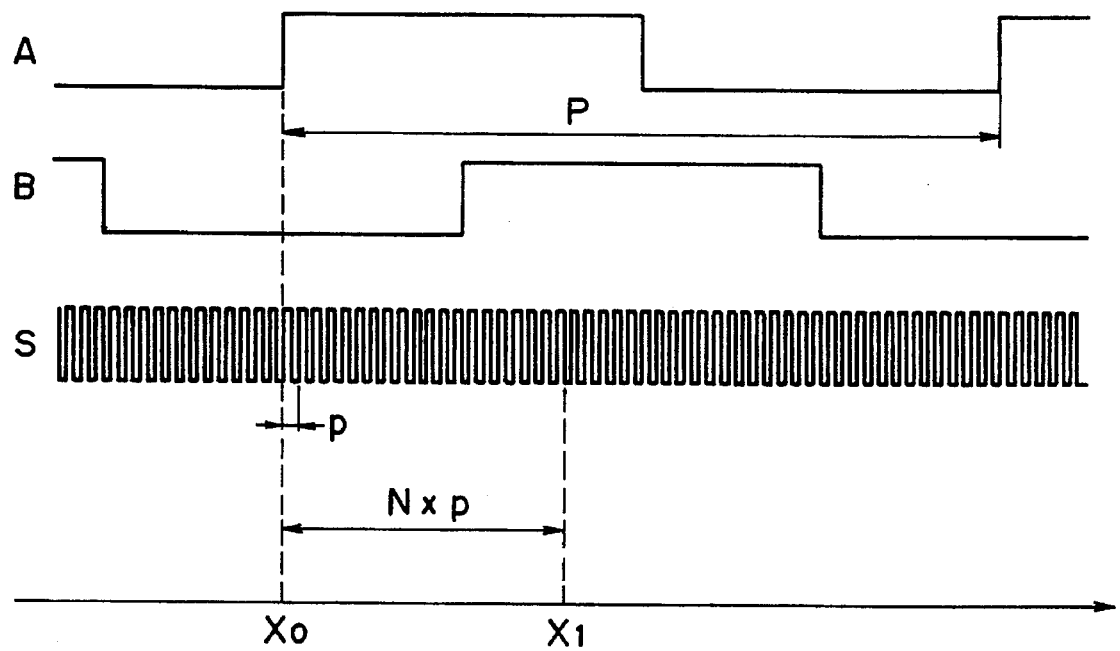
FIG. 40 is a timing chart showing the interrelationship among the signals obtainable in the device of FIG. 37.

The second position detecting means of the present embodiment utilizes this principle, as in the cases of the embodiments described with reference to FIGS. 20–36. In operation, first in FIG. 38 a constant voltage Vp is applied to between the code plate 5040 and the probe 5007. Then, by using the piezoelectric actuator 5008*b* while adjusting an electrical voltage Vb, the probe 5007 is displaced toward the code plate 5040 and to the position of a distance through which a tunnel current can flow. Subsequently, the switch 5011 is closed and, in order that the tunnel current Ip to be detected by a current detecting means 5009 is made constant, an electric voltage Va to be applied to the piezoelectric actuator 5008*a* is adjusted by use of a signal Vs supplied from the controller 5010 to the driver 5012. If, in this state, there occurs relative movement between the probe 5007 and the code plate 5040 in the direction of arrow C, the tunnel current Ip changes with the surface shape (change in the surface height) of the scale 5042. Accordingly, the controller 5010 supplies a signal Vs to the driver 5012 for the piezoelectric actuator 5008*a*, so as to maintain the tunnel current Ip constant as described hereinbefore, namely, so as to assure that the interval between the probe 5007 and the scale 5042 is maintained continuously constant. Since the amount of prolongation/contraction of the piezoelectric actuator 5008*a* is proportional to the applied voltage Va, the signal Vs is a signal that corresponds to the surface shape of the scale 5042. By binary-coding and waveform rectification made to this signal, a signal S as illustrated in FIG. 40 is obtainable. As an alternative, the voltage Va may be maintained constant while keeping the switch 5011 open; the spatial position of the probe 5007 in the direction of the thickness of the code plate 5040 may be retained constant; and the electric current Ip as obtainable at the current detecting means 5009 may be quantized. A similar signal S is obtainable also in this manner.

In FIG. 40, denoted at A and B are those signals of the light receiving elements 5003*a* and 5003*b* shown in FIG. 37, as having been binary-coded and waveform-rectified. By the function of the perforated code plate 5005, these signals have a mutual phase difference of 90 degrees (the axis of abscissa denotes the position). In the example of FIG. 40, the pitches of the scales 5041 and 5042 have a ratio of 50 (no phase shift; duty=50:50) and, also, in FIG. 37 the position of a spot defined on the scale 5041 by the light emitting element 5001 of the first position detecting means as well as the position, on the scale 5042, of the probe 5007 of the second position detecting means are both on a straight line D–D' which extends orthogonally to these two scales.

Figure 41:
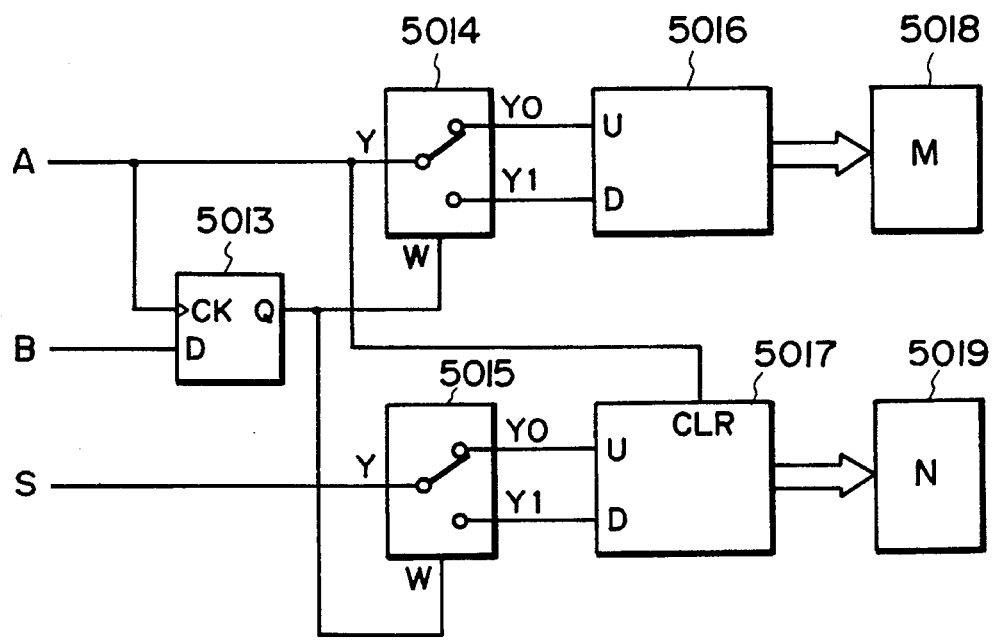
FIG. 41 is a diagrammatic view of a pulse counter used in the device of FIG. 37.

Next, while referring to FIGS. 40 and 41, a description will be provided of the manner of position detection by use of the encoder structured as described above.

FIG. 41 shows the structure of a pulse counter used in the device of FIG. 37.

Where the position of a point X1 with respect to the positional origin (leftward: not shown) is to be detected, the signal S from the position detecting means (FIG. 38) may be counted up or down with reference to the origin, because the positiveness (or negativeness) of the moving direction can be discriminated by a flip-flop 5013 (FIG. 41) and from the signals A and B produced by the first position detecting means. Since, however, the pitch ratio of the two scales 5041 and 5042 (P:p=50:1) is predetermined, first the signal A (or B) is used to execute rough counting and, thereafter, the signal S is counted up from the point of the last rise X0 (or fall) of the signal A (or B). By doing so, the structure of the counter can be simplified. For example, as shown in FIG. 41, a counter 5016 may be used to count the signal A while another counter 5017 may be used to count the signal S. In this case, the counter 5017 may be cleared at each rise (or fall) of the signal A. By doing so, the position of the point X1 can be detected. This is because where the count for the signal A is denoted by M and the count for the signal S is denoted by N, it follows that, since P=50·p:

$$X1=M·P+N·p=(50·M+N)p$$

Denoted in FIG. 41 at 5014 and 5015 each is a multiplexer for changing the input to the up/down terminals (U and D) of the counter 5016 or 5017, in accordance with the moving direction, namely, the output of the flip-flop 5013. Denoted at 5018 and 5019 are displays for displaying the counts of the counters 5016 and 5017, respectively. The resolution of the encoder can be increased in this manner. However, if further improvement in the resolution is desired, an atomic arrangement of the surface of the code plate may be used as a scale (the size of the atom can be predetected).

Figure 42:
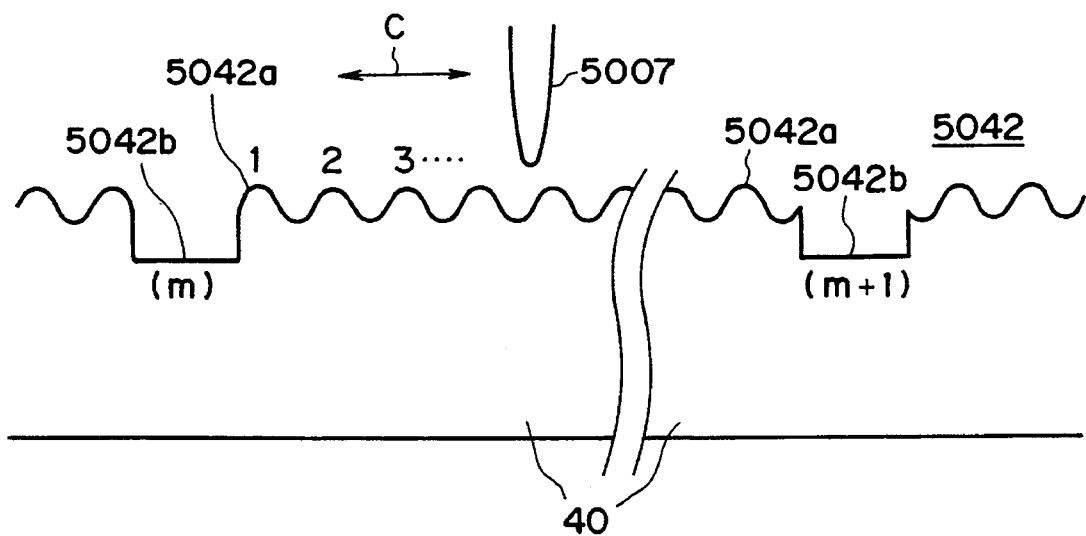
FIG. 42 is a schematic section showing a code plate used in the device of FIG. 37.

Such an example is shown in FIG. 42. FIG. 42 is a vertical section of the surface portion of the scale 5042. Denoted at 5042a are metal atoms constituting the code plate 5040. Denoted at 5042b are grooves having been formed by an electron-beam pattern drawing technique or otherwise so that they extend in directions perpendicular to the direction of position detection. Generally, it is difficult to provide these grooves with the intervals of the precision of an order of atoms. However, by preparatorily measuring the position of each groove with respect to the positional origin (by counting the number of atoms by use of the second position detecting means) and by storing the measured positions into a memory or otherwise, it is possible to detect the position of an m-th groove 5042b in the manner as having been described with reference to FIG. 41. Accordingly, by starting the counting of the number n of atoms, from the position of the rise of the m-th groove, the position detection of the order of atom is assured.

Figure 43:
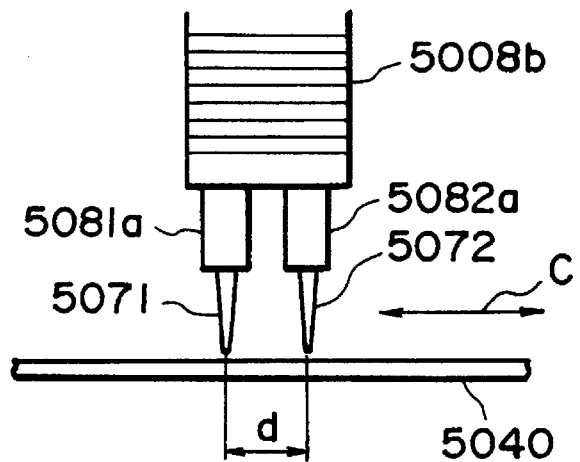
FIG. 43 is a side view showing a major portion of an encoder according to a still further embodiment of the present invention.

FIG. 43 shows a major portion of an encoder according to another embodiment. This example corresponds to a case wherein the above-described second position detecting means includes two probes. Reference numerals 5071 and 5072 denote such two probes which are disposed opposed to the same scale. Denoted at 5081a and 5082a are piezoelectric actuators each functions as a second probe driver for corresponding one of the probes. Denoted at 5008b is a piezoelectric actuator which functions as a first probe driver. Denoted at d is the interval between the two probes 5071 and 5072 in the direction of the position detection (arrow C). The interval d is set with respect to the pitch p of the above-described scale 5042 to satisfy the relation:

$$d=(2n+1)·p/4$$

wherein n is an integral number.

Further, with each of the probes 5071 and 5072 and the second probe drivers 5081a and 5082a, the control means (FIG. 38) is operationally associated such that, in a similar manner as described, the distance between the scale 5042 and each probe 5071 or 5072 can be controlled and maintained constant. With this arrangement, two signals having a phase difference of 90 degrees are obtainable in the same way as described and, therefore, it is possible to detect the moving direction even if the distance of movement is so minute that the direction thereof can not be detected by the first position detecting means.

Figure 44:
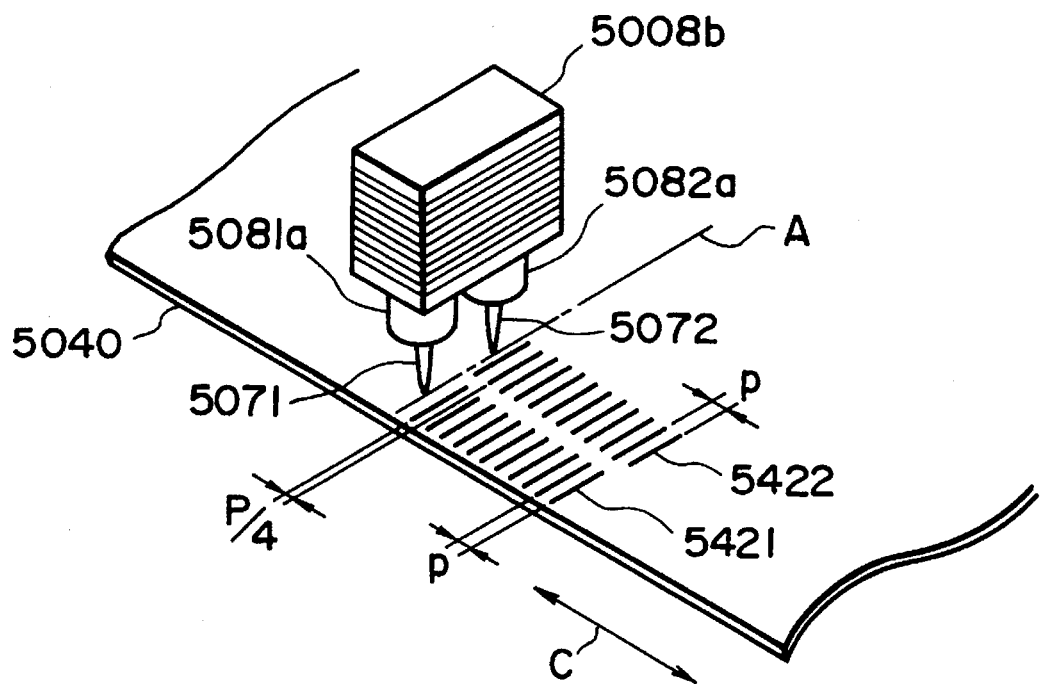
FIG. 44 is a perspective view showing a major portion of an encoder according to a yet another embodiment of the present invention.

FIG. 44 is a perspective view showing a major portion of an encoder according to a still further embodiment of the present invention. In this embodiment, the scale 5042 of the foregoing embodiment to be used with the second position detecting means is provided by two rows of scales 5421 and 5422 having a mutual phase shift of an amount corresponding to a quarter of the pitch (i.e. p/4). In place thereof, any phase shift between two probes 5071 and 5072 (as in the case of the foregoing embodiment) is avoided and they are disposed above the scales 5021 and 5022, respectively. Also, in the present embodiment, substantially the same advantageous effects as attainable in the FIG. 43 embodiment are attained.

Figure 45A:
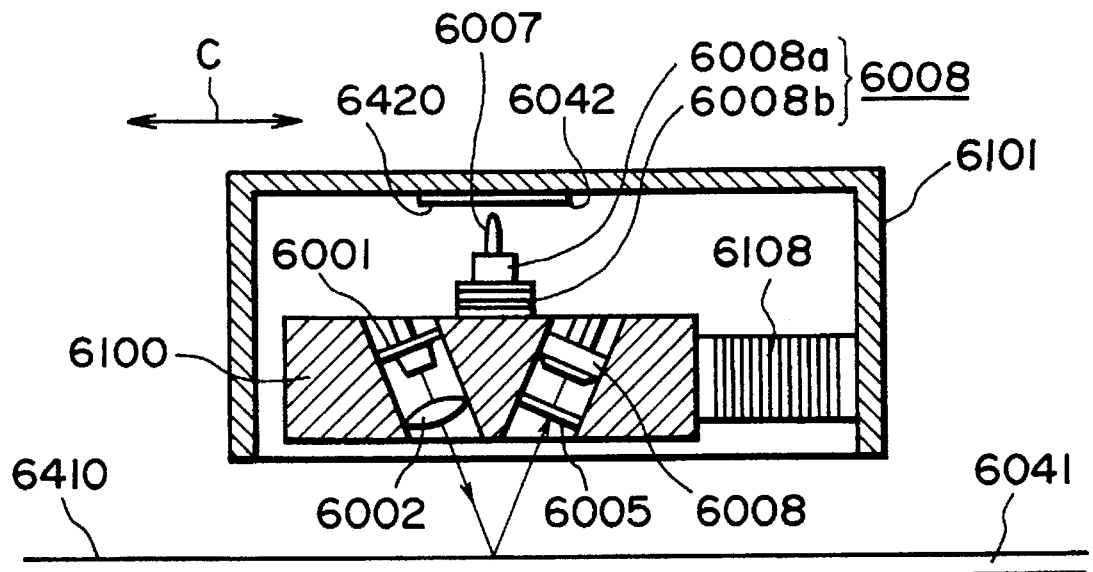
FIGS. 45A and 45B are a sectional view and a top plan view, respectively, showing an encoder according to a still further embodiment of the present invention.
Figure 45B:
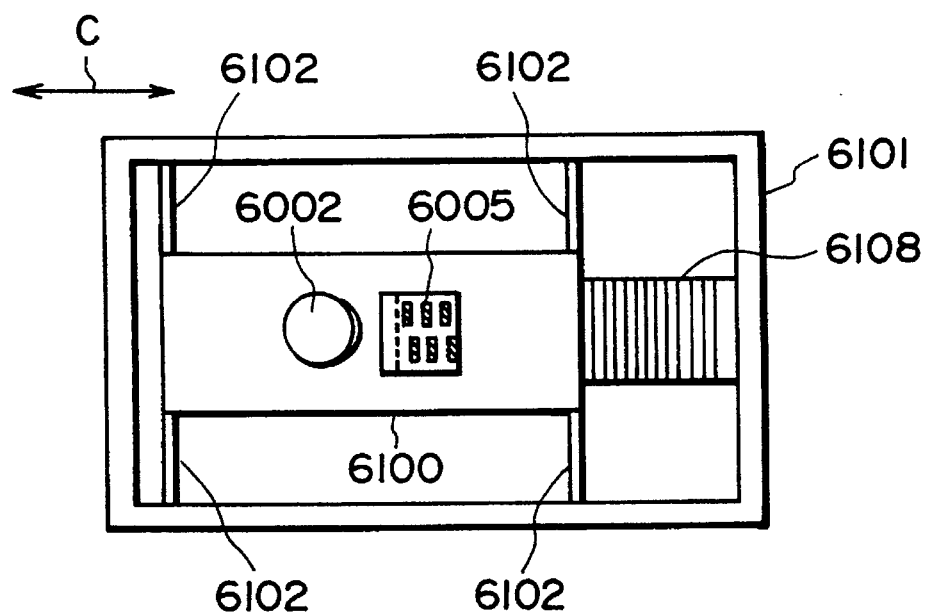

FIGS. 45A and 45B show an encoder according to a yet another embodiment of the present invention, wherein FIG. 45A is a sectional side view while FIG. 45B shows the encoder as viewed from the below in FIG. 45A. In these figures, denoted at 6007 is a probe made of an electrically conductive material; and at 6008, a driving means which comprises two piezoelectric actuators 6008a and 6008b and which is operable to move the probe 6007 in a direction substantially perpendicular to the surface of a second code plate 6042 which will be described later. The piezoelectric actuator 6008a comprises a single piezoelectric material and functions as a first probe driver. The actuator 6008a has an end connected to the probe 6007, and the other end thereof is fixed to an end of the piezoelectric actuator 6008b which is a multi-layered type piezoelectric device and which functions as a second probe driver. The other end of the piezoelectric actuator 6008b is fixedly secured to a holding member 6100 for holding, in a predetermined positional relationship, various elements such as a light emitting element 6001, a collimator lens 6002, a light receiving element 6003 and a perforated code plate (mask) 6005 which cooperate with each other to provide a first position detecting means. The probe 6007 and the probe driving means 6008 cooperate with a control means, comprising various blocks shown in FIG. 46, to provide a second position detecting means. Denoted in FIG. 45A at 6041 is a first code plate having a surface 6410 on which, for allowing that the first code plate 6041 is used as a reflection type, there is provided a scale, not shown, formed by what is called a "black-and-white pattern" which comprises such areas as having a large reflection factor and such areas as having substantially no reflectivity, these two types of areas being disposed at regular pitch. Denoted at 6101 is a casing having four parallel leaf-springs of metal plates 6102, made of phosphor bronze or otherwise, for supporting the holding member 6100 for relative movement in the direction of an arrow C. The casing as a whole may be referred to as a "measuring head". The measuring head 6101 is made movable relative to the first code plate 6041. Denoted at 6042 is a second code plate which is made of an electrically conductive material and which is disposed on the inside surface of the measuring head 6101 to be opposed to the probe 6007. A constant electrical voltage is applied to between the probe 6007 and the second code plate. On the surface 6420 of the second code plate 6042, there is formed a scale 6021 which comprises grooves or protrusions of a predetermined depth (height) having a pitch which is very fine as compared with that of the scale of the first code plate 6041. The grooves of the scale 6421 are formed successively in the direction of arrow C, by means of electron-beam pattern drawing process or lithography process.

For example, the pitch of the scale 6421 is set to be equal to 1/N of the pitch of the scale of the first code plate 6041, wherein N is an integral number. Denoted at 6108 is a driving means which is provided between the holding member 6100 and the measuring head 6101, for moving the holding member 6100 relative to the measuring head 6101. This driving means comprises a multilayered type piezoelectric actuator, for example. Denoted at 6003 is a light receiving device which comprises two light receiving elements 6003a and 6003b, as in the case of FIG. 37.

Figure 46:
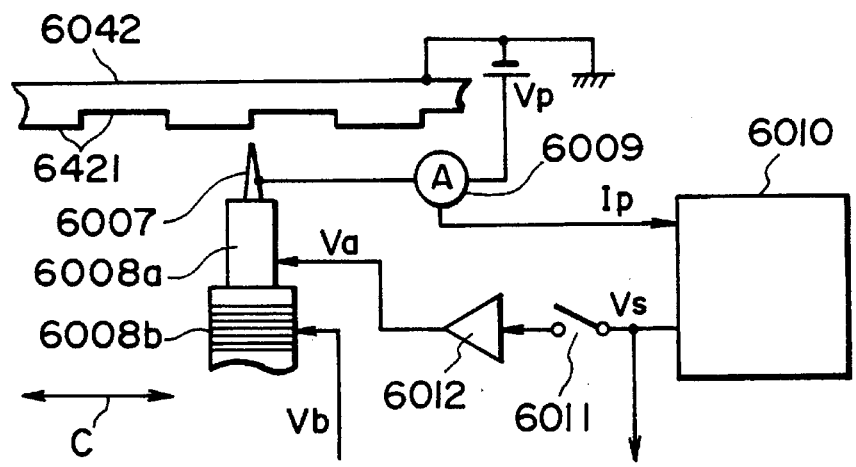
FIG. 46 is a diagrammatic view showing control means used in the encoder of the embodiment shown in FIGS. 45A and 45B.

FIG. 46 is a block diagram showing a control means of the encoder of the FIG. 45 embodiment.

In FIG. 46, denoted at 6009 is a current detecting means for detecting an electric current Ip which flows through the probe 6007 when a certain electrical voltage Vp is applied to between the probe 6007 and the second code plate 6042. Controller 6010 produces a signal Vs to be applied, when a switch 6011 is closed, to a piezoelectric device driver 6012 for controlling the piezoelectric actuator 6008a, in order that the distance between the probe 6007 and the scale 6021 on the second code plate 6042 is maintained constant and, as a result of which, the electric current Ip is maintained constant. Electric voltage Vb is produced by a driver (not shown) and is used to drive the piezoelectric actuator 6008b of multilayered type so as to move the probe 6007 toward the scale 6421 and to the position of such distance by which the current Ip can be detected. Once the voltage Vb is set, the magnitude thereof is retained fixed during the use of the encoder.

The operation of the second position detecting means is similar to that of the FIG. 37 embodiment. And, for this reason, a description thereof is omitted here for simplicity.

Figure 47:
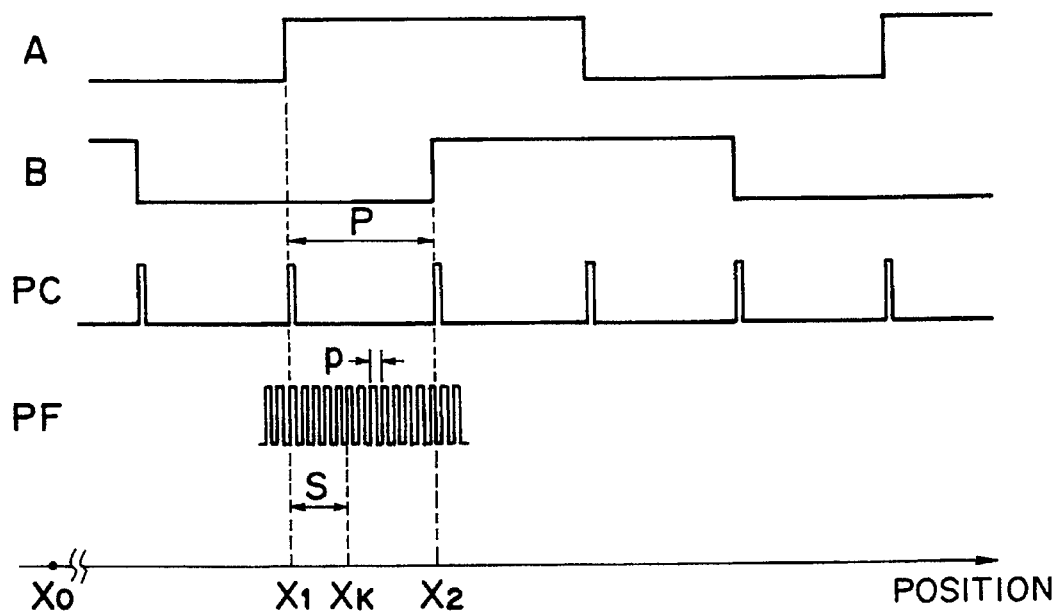
FIG. 47 is a timing chart showing the interrelationship among the signals obtainable in the device of the embodiment shown in FIGS. 45A and 45B.

FIG. 47 is a timing chart showing the relationship among the signals produced at various portions of the device of FIG. 45. Denoted in FIG. 47 at A and B are those signals from the light receiving device 6003 (the elements 6003a and 6003b) as having been binary-coded and waveform-rectified. By the function of the mask 6005, these signals have a mutual phase shift of 90 degrees (the axis of abscissa denotes the position). Pulses PC are formed by generating a pulse of a predetermined width, starting from each rise or fall of these two signals and, thus, correspond to those in which the original pulse generation frequency is multiplied by four.

Figure 48:
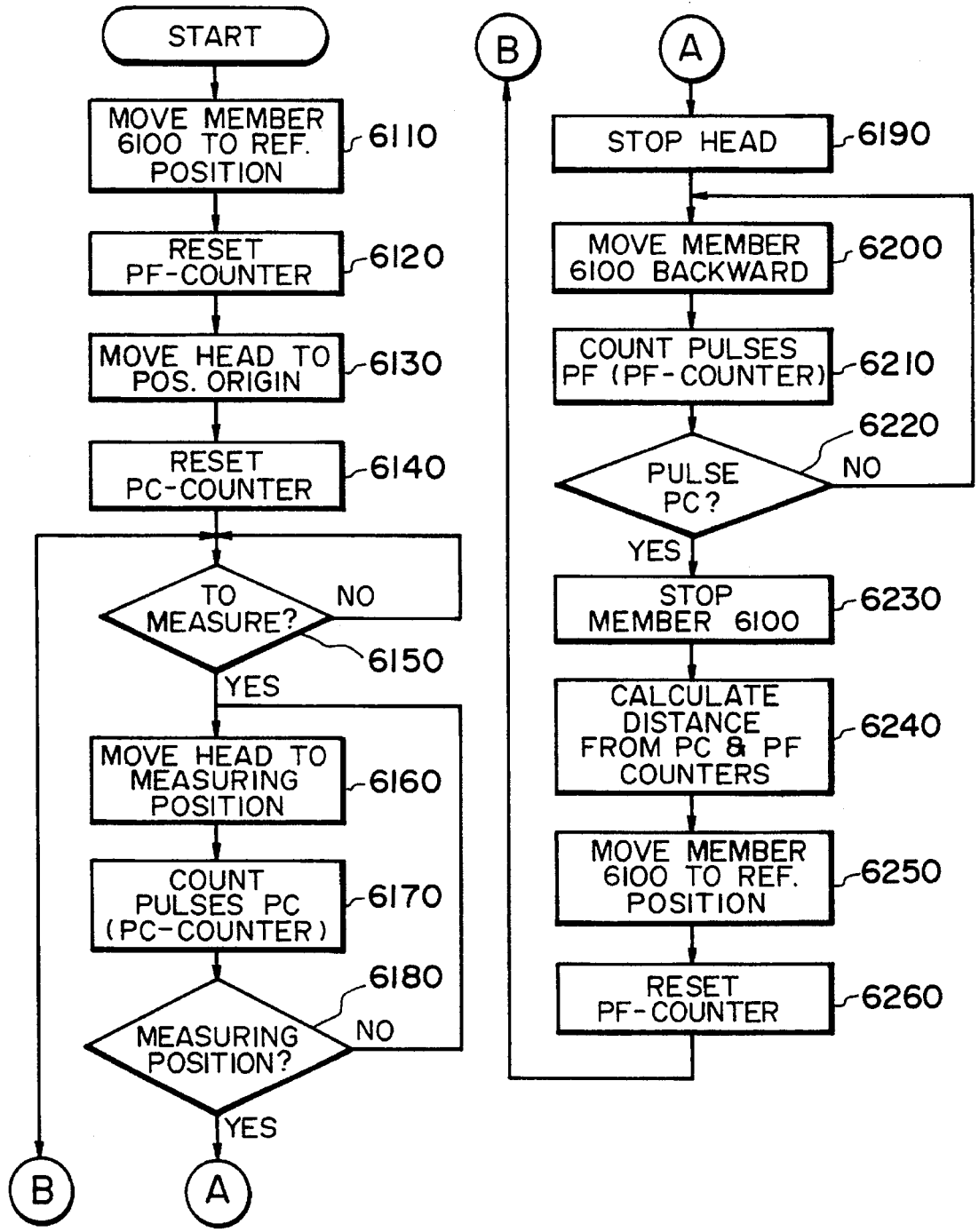
FIG. 48 is a flow chart showing the sequence of measurement made in the device of the embodiment shown in FIGS. 45A and 45B.

The manner of position detection by use of the encoder structured as described above, will now be explained taken in conjunction with FIGS. 45A, 45B and 47 as well as the flow chart of FIG. 48, showing the sequence of measuring process.

In the case where, in FIG. 47, the distance from a positional origin X0 to a position Xk is to be measured and if only the first position detecting means is used, the pulse counting starts at the leftmost point in FIG. 47 to count the pulses PC. Thus, the value "M×P" as determined by the number M of the pulses, from the origin X0 to the position X1 and by the pitch P of the pulses (which is equal to ¼ of the pitch of the scale of the code plate 6041), is obtained as the distance from the origin to the position Xk. With this method, however, the length S from the position X1 to the position X2 is not measured. In other words, the measured value contains an error corresponding to one pulse spacing (±P) of the signal PC. According to the present embodiment, this length S can also be measured by use of the second position detecting means, to thereby improve the measurement accuracy (resolution).

The measurement process starts at the execution of the preparation (such as described below) to be made prior to the measuring operation. Referring back to FIGS. 45A and 45B, first, the driving means 6108 moves the holding member 6100 to displace the probe 6007 to a reference position on the code plate 6042 (step 6110). This is done in order that the first position detecting means is placed at a fixed position with respect to the measuring head casing 6101. Subsequently, a counter (not shown) for counting pulses PF is reset (step 6120). The aforesaid reference position can be discriminated by, for example, preparatorily and locally changing the pitch of the scale 6421 on the second code plate 6042. Subsequently, the measuring head 6101 is moved to the positional origin X0 (step 6130) and a counter (not shown) for counting the pulses PC is reset (step 6140). For the positioning at this positional origin, a separate light switch such as a photo-interrupter may be used. Alternatively, a specific mark for the positional origin may be provided on the first code plate 6041 and this may be detected by the first position detecting means.

If, at step 6051, the discrimination result shows that the measurement is to be effected, first the measuring head 6101 is moved toward the measuring position (step 6160). While counting pulses PC by use of the first position detecting means (step 6170), the measuring head is moved. When it reaches the measuring position (step 6180), the measuring head 6101 is stopped (step 6190). Further, for measuring the minute distance S in FIG. 47, the holding member 6100 is displaced by the driving means 6108 in a direction opposite to that in which the measuring head 6101 has moved, until the last-counted pulse PC appears (step 6200). During this displacement, pulses PF are counted by use of the probe 6007 and the PF pulse counting counter (step 6210). When the pulse PC appears (although at this time the PC pulse counting counter is not decremented by one) (step 6220), the distance of the measuring position from the positional origin is calculated from the counts of the PC pulse counting counter and the PF pulse counting counter (step 6240). For example, if the two counts are M and N, then the distance X to be measured can be expressed as follows:

$$X = M \cdot P + N \cdot p$$

Finally, the holding member 6100 is returned to the reference position and the PF pulse counting counter is reset, for preparation for the next measurement.

In this manner, the measurement with higher resolution as compared with those of the conventional encoders is attained. If, however, further improvement in the resolution is desired, an atomic arrangement on the surface of the second code plate may be used as a scale, as in the case of the FIG. 42 embodiment (the size of atom may be predetected). Since such a scale has been explained with reference to FIG. 42, description thereof is omitted here for simplicity.

It is sufficient for the second position detecting means to play a role supplementing the first position detecting means, and for this reason the range of measurement thereof may be small. At the minimum, a range not smaller than the pitch P of the pulses PC is sufficient. For this reason, the size of the second code plate and/or the actuator (driving means) may be small. As a result, the measuring head including these components may have substantially the same size as of that of the conventional type measuring head.

Figure 49:
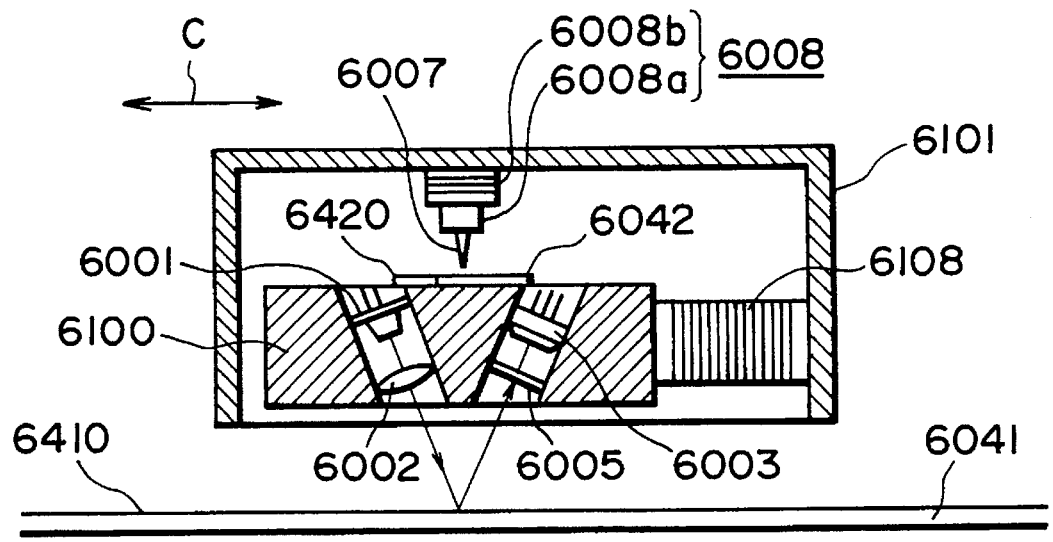
FIG. 49 is a schematic section showing an encoder according to another embodiment of the present invention.

As a matter of course, the second position detecting means of the FIG. 45 embodiment may be replaced by that as having been described with reference to FIG. 43 or 44. Also, as shown in FIG. 49, it is possible that a probe 6007 and a probe driving means 6008 are provided on the inside surface of a measuring head 6101 while a code plate 6042 is provided on a holding member 6100, such that the relationship between the probe 6007 and the code plate 6042 is reversed as compared with the foregoing embodiment. Similarly, in the other embodiments, the relationship between the scale and the first or second position detecting means may be reversed.

In the embodiments described with reference to FIGS. 37–49, the first position detecting means is not limited to an optical type, but a magnetic or other type detecting means may be used. Further, while the foregoing embodiments have been described with reference to a linear type measuring system, the device may be arranged as a rotary type (namely, as an angle measuring device).

Next, a description will be provided of another aspect of the present invention. In this aspect, it is intended to provide a recording/reproducing apparatus wherein a probe electrode is used to conduct electrical high-density recording/reproducing and wherein the functions of high-precision position detection and position control are introduced to assure the recording/reproducing with high density and good reproducibility.

Briefly, in accordance with this aspect of the present invention, there is provided a recording/reproducing apparatus which includes a recording medium having a position coordinate axis functioning as a reference, voltage applying means having a probe electrode, and detecting means for detecting the position on the position coordinate axis, such that the recording of information and/or the reproduction of recorded information can be made at such position on the recording medium that corresponds to the detected coordinate position.

The position detecting device and recording/reproducing of information, employed in some embodiments in this aspect of the invention, utilize the phenomenon that, when an electrically conductive probe (probe electrode) and an electrically conductive material are brought close to each other to a clearance of about 1 nm while applying an electrical voltage to therebetween, there occurs a flow of tunnel current therebetween. Since such a tunnel current depends on the work function on the surface of a conductor, information concerning various surface electron states can be read out. The present invention uses this. More specifically, a recording medium having a regular atomic arrangement or an arbitrary formed origin, operable as a reference, is used and, to such recording medium, a position coordinate system based on the regular atomic arrangement or the reference origin, is introduced. The position detection is effected by detecting a characteristic change in the tunnel current corresponding to the position coordinate system. Also, on the basis of the result of the position detection, the recording/reproducing position on the recording medium, which is in a determined positional relation with the position coordinate system, is specified, and the positioning of the probe electrode to such recording/reproducing position is controlled. Thereafter, by use of the probe electrode, the recording/reproducing is effected.

Figure 50:
FIG. 50 is a principle view showing the interrelationship between a coordinate axis and recording positions, in one embodiment of the present invention.

The positional relation between the coordinate axis and the recording position at this time is schematically shown in FIG. 50. The positional information (A–I) in the form of graduations on the coordinate axis is always in a "relative" positional relation with the recording position (A'–I'). Namely, A:A', for example Therefore, by detecting the positional information A–I, the recording position A'–I' can be necessarily specified. In this case, it is not always necessary that the points (graduations) on the coordinate axis and the recording positions are placed in a univocal relative disposition. For example, there may be plural recording positions such as a point A", a point A''', etc. as well as a point A', all corresponding to the positional information A. However, from the viewpoint of precision, a univocal relation (one-to-one relation) is preferable. Further, use of a single coordinate axis is not a limitation, but plural axes may be used as required. Additionally, the coordinate system is not limited to one-dimensional, and a two-dimensional system (grid-like system) may be used. In such case, in accordance with the grid points of the two-dimensional coordinate system, the recording positions may be distributed two-dimensionally.

Coordinate Axis

The coordinate axis used in the present invention as a member of a position detecting system may be formed by use of a regular atomic arrangement or, alternatively, an arbitrary formed reference point. As for such a regular atomic arrangement, an electrically conductive material whose lattice spacing is predetected (for example, one of various metals, graphite monocrystal or otherwise) may be used. Additionally, since the tunnel current used in this aspect of the present invention has a magnitude of an order of nA, those materials as having an electric conductivity not less than $10^{-10}$ $(ohm.cm)^{-1}$ may be used as the aforementioned conductive material. Accordingly, a monocrystal of semiconductor such as silicons, may be used. As a representative of these materials, a metal sample is now considered.

In equation (1), the tunnel current density $J_T$ changes with the distance Z. Therefore, if a probe electrode is scanned in an arbitrary rectilinear direction relative to the surface of the metal sample, while maintaining constant an average distance between the probe and the reference atomic arrangement, the tunnel current changes periodically in accordance with the metal atomic arrangement. Where such a metal sample whose lattice constant is predetected is used, the state of the atomic arrangement in an arbitrary direction with reference to a certain lattice point upon an arbitrary crystal plane is self-evident and, therefore, the periodic change in the tunnel current which occurs as a result of the scan of the probe electric in that direction can be satisfactorily predicted. Thus, by correcting the scan direction of the probe electrode so as to assure that the predicted value of the change in the tunnel current and the measured value of the change in the tunnel current, caused as a result of actual scan of the probe electrode, become equal to each other, it is possible that the motion of the probe electrode accords with the atomic arrangement of the sample. Namely, if the atomic arrangement is considered as a coordinate axis, the probe electrode moves just along this coordinate axis. Assuming now that the probe electrode on this coordinate axis is movable in a particular direction and to a position spaced by a particular distance and that the end of transfer (destination) is at a recordable/reproduceable region, the recording/reproducing can be made at each position corresponding, in a one-to-one relation, to each point on the coordinate axis. In this case, it is not always necessary that the probe electrode moves between the coordinate axis and the recording region. For example, to a probe electrode (position detecting probe electrode) moving along the coordinate axis, a separate recording/reproducing probe electrode may be provided at a predetermined position and they may be operationally associated with each other.

In any case, the position of the probe electrode in the recording region, namely, the recording position, can be determined univocally with respect to the coordinate axis which uses the crystal lattice of a metal sample.

In the case where a portion of or all of the surface of a recording medium has a regular atomic arrangement and where the state of such arrangement is predetected, it is possible to set such a recording region as having an X-Y coordinate system which shows a univocal relation with a coordinate axis using the crystal lattice of such atomic arrangement.

As for the coordinate axis for the position detecting, as other alternatives, a recessed or protruded structure may be formed on the surface of a sample, or a plurality of reference points may be artificially formed by ion injection of atoms. The surface structure or these points can be used as a position coordinate, although the precision as a coordinate axis may be inferior, as compared with one in which the atomic arrangement is used.

In the described manner, a position coordinate can be set on a recording medium and, at each point corresponding to the position coordinate, the recording/reproducing can be made. Upon actual recording/reproducing, however, it is necessary to specify the start point. Namely, it is necessary to define an origin on the coordinate axis, which functions as a reference. As for such reference origin, a surface step (recess or protrusion) may be formed on the coordinate axis by an etching process or otherwise or, alternatively, ion injection may be used to change the state of the surface of the recording medium. However, as described hereinbefore, the precision thereof is not satisfactory for use as an origin of a coordinate axis using an atomic arrangement. When in FIG. 50 the point A on the coordinate axis is to be selected as a reference origin, discriminating the point A is equivalent to discriminating a point A' on the recording region which is in a univocal positional relation with the point A. In other words, if it is possible to discriminate the point A', the coordinate axis and the positions of the points on the coordinate axis are determined univocally. As for the method of setting a reference origin at the point A', a method of inputting information concerning an origin to the point A', like a method of record writing, is superior in respect to the precision as well as ease in the formation. The number of such reference origin is not limited to one, and plural reference origins may be formed in accordance with requirements such as enlargement of the recording region.

Recording Medium

As for the recording medium usable in this aspect of the present invention, those materials as providing, in current/voltage characteristics, a memory switching phenomenon (electric memory effect) may be used. Examples are as follows.

(1) Amorphous semiconductors such as oxide glass, borate glass or chalcogenide glass containing Se, Te or As combined with elements of groups III, IV, V and VI in the periodic table. These materials are intrinsic semiconductors having optical band gap Eg of 0.6–1.4 eV or electric activation energy $\Delta E$ of about 0.7–1.6 eV. Examples of chalcogenide glass are: As— Se—Te series, Ge—As—Se series, Si—Ge—As—Te series, for example $Si_{16}GE_{14}As_5Te_{65}$ (suffix is atom %), Ge—Te—X series, Si—Te—X series (X=a small amount of V or VI group element), for example $Ge_{15}Te_{81}Sb_2S_2$. Further, Ge—Sb—Se series chalcogenide glass may be used.

In an amorphous semiconductor layer wherein the above-described compound is deposited on an electrode, the electric memory effect of the medium can be presented by applying an electrical voltage perpendicularly to the film surface by use of a probe electrode.

As for the method of depositing such material, any well-known thin film forming process may be used to sufficiently achieve the objects of the present invention. Preferable examples of a film forming method are: vacuum deposition method and cluster ion beam method. Generally, the electric memory effect of such a material is observed on the condition of thickness not greater than a few microns and in respect to the recording resolution as a recording medium, thinner thickness is preferable. However, from the viewpoint of uniformness and recording performance, a thickness not less than 100 angstroms and not greater than 1 micron, preferably not greater than 1000 angstroms, is desirable.

(2) An organic semiconductor formed by depositing on an electrode a salt composed of a metal such as Cu or Ag having a relative low reduction potential and an electron accepting compound such as tetraquinodimethane (TCNQ), TCNQ derivative, for example tetrafluorotetracyanoquinodimethane ($TCNQF_4$), tetracyanoethylene (TCNE) and tetracyanonaphthoquinodimethane (TNAP).

As for the method of forming such an organic semiconductor layer, use may be made of a method of vacuum-depositing the above-described electron accepting compound on an electrode of Cu or Ag.

The electric memory effect of such an organic semiconductor is observed on the condition of a thickness not greater than several tens microns. However, from the view points of film formation property and uniformness, a thickness in a range of 100 angstroms to 1 micron is preferable.

(3) Recording media made of amorphous silicon material. Examples are those recording mediums having a layered structure of metal/A-Si ($p^+$-layer/n-layer/i-layer) or metal/A-Si ($n^+$-layer/p-layer/i-layer). Deposition of each layer of A-Si can be satisfactorily made by use of any well-known method. Preferably, in the present invention, glow discharge method (GD method) is used. As for the film thickness of the A-Si material, the n-layer preferably has a thickness of 2000–8000 angstroms while each of the i-layer and $p^+$-layer preferably has a thickness of about 1000 angstroms. The total thickness is preferably about 0.5–1 micron.

(4) Recording media having on an electrode a laminated structure of those molecules as having a group of $\pi$-electron level and a group of only $\sigma$-electron level.

As the structure of the dye having $\pi$-electron system suitable for the present invention, there may be included, for example, dyes having porphyrine skeleton such as phthalocyanine, tetraphenylporphyrine, etc.; azulene type dyes having squarilium group and croconic methine group as the bonding chain and cyanine-like dyes having two or more nitrogen-containing heterocyclic rings such as quinoline, benzothiazole, benzoxazole, etc. bonded through squarilium group and croconic methine group; or cyanine dyes, condensed polycyclic aromatic compounds such as anthracene and pyrene, and chain compounds obtained by polymerization of aromatic ring and heterocyclic compounds; and polymers of diacetylene group; further derivatives of tetraquinodimethane or tetrathiafluvalene and analogues thereof and charge transfer complexes thereof; and further metal complex compounds such as ferrocene, tris-bipyridine ruthenium complexes, etc.

As for the formation of an organic recording medium, specifically a deposition method, cluster ion beam method or otherwise are usable. However, from the points of controllability, easiness and reproducibility, the LB method is very suitable one among various conventional processes.

According to this LB method, a monomolecular film or its built-up film of an organic compound having, in one molecular, a hydrophobic site and a hydrophilic site, can be easily formed on a substrate. Thus, with a thickness of an order of molecule and over a wide area, a uniform and homogeneous organic super-thin film can be produced stably.

The LB method is a method for forming a monomolecular film or a built-up film by utilizing the phenomenon that, where, in the molecule structure having in the molecule a hydrophobic site and a hydrophilic site, a suitable balance (amphiphatic balance) is maintained therebetween, molecules form a monomolecular layer on the surface of water with the hydrophilic radical facing downwardly.

As for the radical constituting the hydrophobic site, there are various hydrophobic radicals such as, for example, prevalently known saturated and non-saturated hydrocarbon group, condensed polycyclic aromatic group and chain polycyclic phenyl group. They can provide singly or in combination a hydrophobic portion. On the other hand, most typical examples as the constituent elements of the hydrophilic portion are hydrophilic radicals such as carboxyl group, ester group, acid amide group, imide group, hydroxyl group and amino group (first, second and third classes and fourth class). Similarly, they can provide singly or in combination the hydrophilic portion of the molecule.

Those dye molecules, if they have well-balanced hydrophobic and hydrophilic sites and $\pi$-electron system of a suitable magnitude, can form a monomolecular film on the surface of water and, therefore, they can be used as very suitable materials for the present invention.

As specific examples, there may be molecules such as described below.

[I] Croconic methine dyes

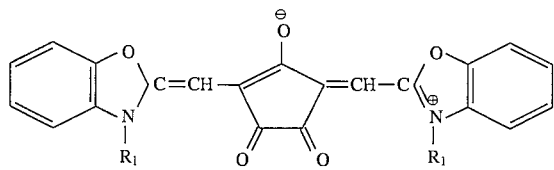

1)

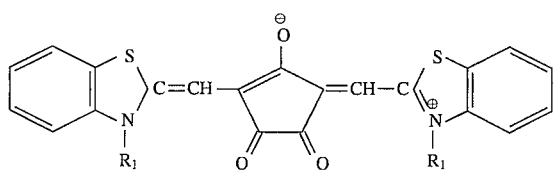

2)

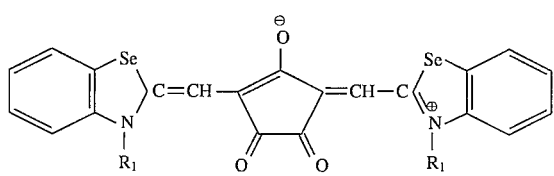

3)

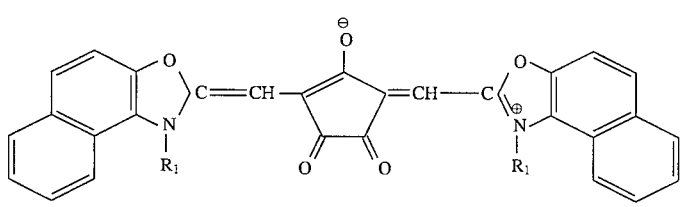

4)

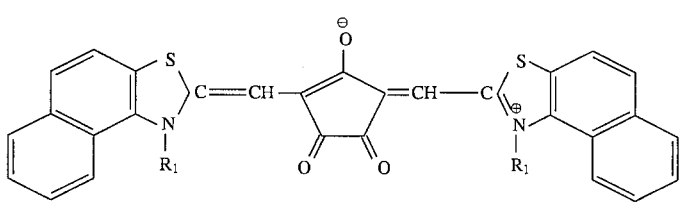

5)

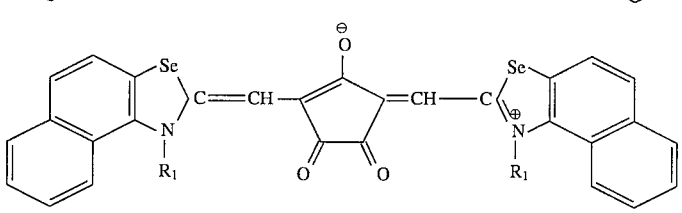

6)

-continued

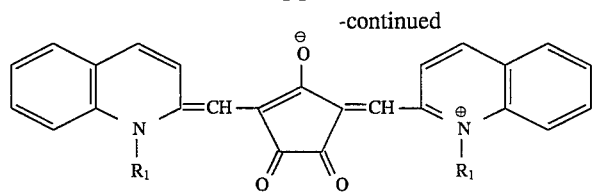
7)

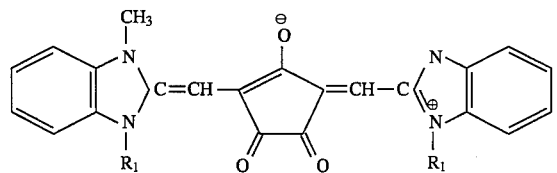
8)

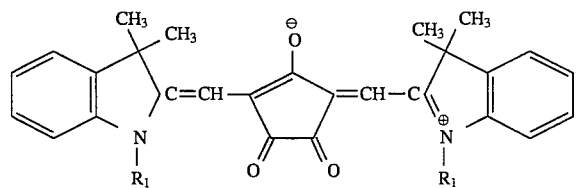
9)

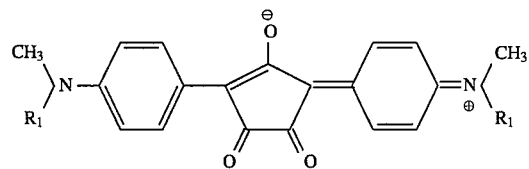
10)

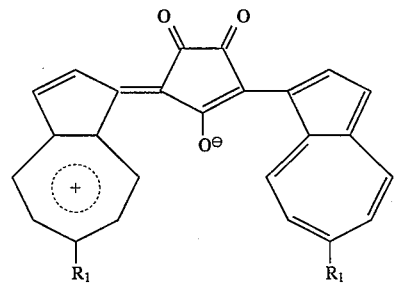
11)

In the above examples, $R_1$ denotes a long chain alkyl group corresponding to a group having the above-described σ electron level and having been introduced to make easier the formation of a monomolecular film on the surface of water. The carbon number n thereof is preferably in the range of $5 < n < 30$. Those compounds listed above as specific examples are only fundamental structures, and various substitution products of these compounds may of course be preferably used in the present invention.

[II] Squarilium dyes

Compound in which croconic methine group of the compound as described in item [I] is substituted by a squarilium group having the following structure:

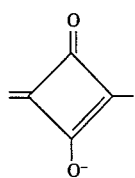

[III] Porphyrine type dye compound

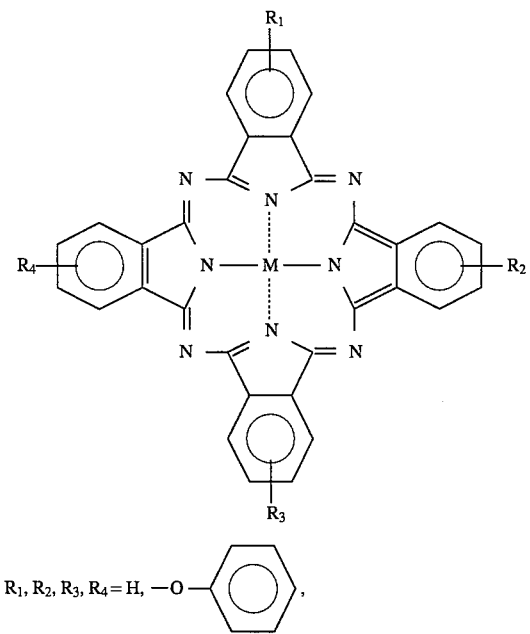
1)

$R_1, R_2, R_3, R_4 = H, -O-\phenyl$,

35
-continued

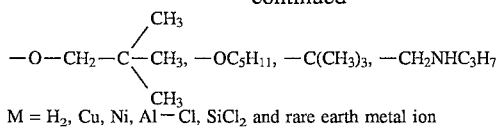

M = $H_2$, Cu, Ni, Al—Cl, $SiCl_2$ and rare earth metal ion

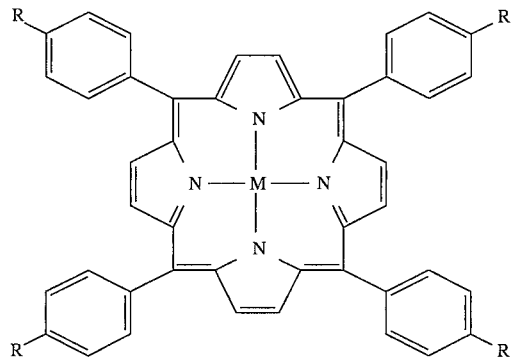
2)

R = $OCH(COOH)CnH_{2n+1}$  $5 \leq n \leq 25$
M = $H_2$, Cu, Ni, Zn, Al—Cl, $SiCl_2$ and rare earth metal ion

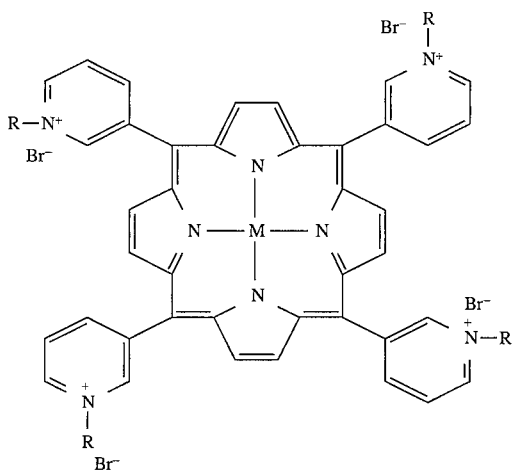
3)

R = $CnH_{2n+1}$  $5 \leq n \leq 25$
M = $H_2$, Cu, Ni, Zn, Al—Cl $SiCl_2$ and rare earth metal ion In these examples, R has been introduced to make the formation of a monomolecular film easier and it is not limited to the substituent group mentioned above. Also, $R_1$–$R_4$ and R correspond to the above-described groups having σ-electron level.

[IV] Condensed polycyclic aromatic compound

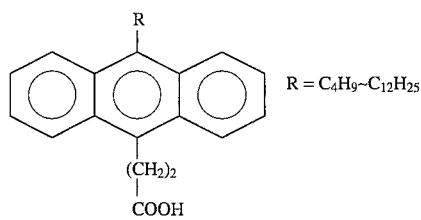

R = $C_4H_9$~$C_{12}H_{25}$

36
-continued

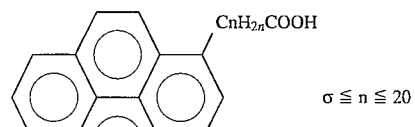

$CnH_{2n}COOH$ $\sigma \leq n \leq 20$

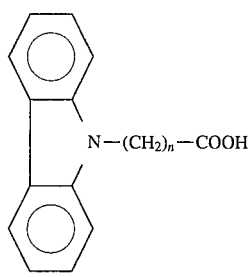

$N-(CH_2)_n-COOH$

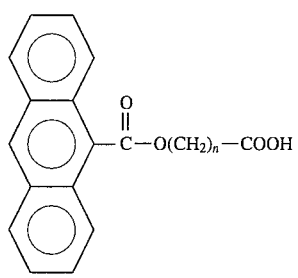

$-C-O(CH_2)_n-COOH$

[V] Diacetylene compounds

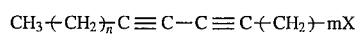

$CH_3(CH_2)_nC \equiv C-C \equiv C(CH_2)_mX$ $0 \leq n, m \leq 20$ wherein $n + m > 10$ X denotes a hydrophilic radical and usually —COOH is used. However, —OH, —$CONH_2$ or otherwise may be used.

[VI] Others

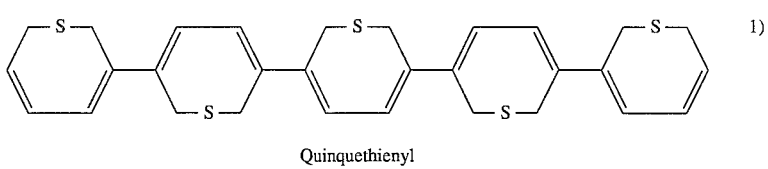
1)

Quinquethienyl

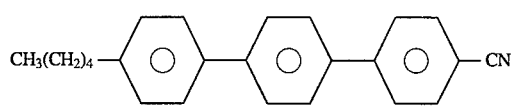

2)

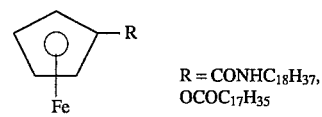

R = CONHC₁₈H₃₇, OCOC₁₇H₃₅

3)

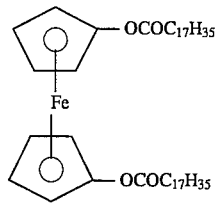

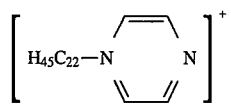

4)

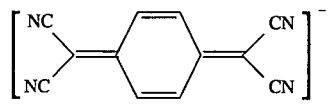

5)

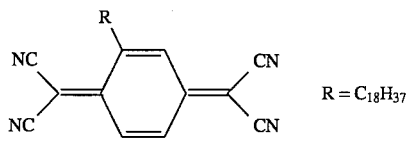

6)

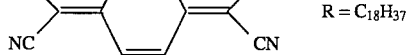

R = C₁₈H₃₇

Other than the aforementioned materials, those dye materials suitable to the LB method may of course be conveniently used in the present invention. For example, biological material (such as, for example, bacteriorhodopsin or cytochrome c), synthetic polypeptides (PBLG, etc.) or otherwise are usable.

The electric memory effect of these compounds having π-electron level is observed on the condition of a thickness not greater than several tens of microns. However, from the viewpoint of film formation property and uniformness, a thickness in the range of 15–2000 angstroms is preferable.

The substrate for supporting those materials described in items (1)–(4) and having the electric memory effect should have characteristics as an electrode. However, any material can be used provided that it is an electric conductor having a conductivity not less than $10^{-6}$ (ohm.cm$^{-1}$). Namely, many varieties of materials may be used. Examples are: a metal plate such as Au, Pt, Pd, Ag, Al, In, Sn, Pb, W or otherwise; an alloy of suitable ones of these materials; a glass, ceramics or plastic material on which such metal or alloy is deposited; Si (crystal, amorphous) or graphite; electrically conductive oxide such as ITO or otherwise, etc.

The recording medium of the present invention may be provided by a combination of such an electric memory effect exhibiting material and a supporting base (electrode). Where an atomic arrangement is used as the above-described coordinate axis, the atomic arrangement of such an electric memory effect exhibiting material itself is, in many cases, inferior in respect to the regularity and, therefore, it is not desirable to use the same as the coordinate axis. Accordingly, it is desirable to use, as the supporting base, a material having a regular atomic arrangement such as, for example, metal, crystal Si or graphite and, while defining on that material a portion in which the electric memory effect exhibiting material is not deposited, to use the atomic arrangement of that portion of the base as the coordinate axis.

Probe Electrode

In order to assure increased resolution of recording, reproducing and/or erasing, it is necessary obtain a point, as sharp as possible, of the tip of a probe electrode used in the present invention. In one embodiment, a probe is formed by mechanically grinding the tip of a tungsten wire of a diameter 1⌀ so that it is shaped into a cone of 90 degrees and, thereafter, by applying an electric field to it in a super high vacuum to cause vaporization of surface atoms. However, the shape of the probe or the process of treatment is not limited thereto.

Further, it is not always necessary to use separate probe electrodes for the position detection and for the recording/reproducing. A common probe electrode may be used. Also, different probe electrodes may be used for each of the position detection and the recording/reproducing.

Figure 51:
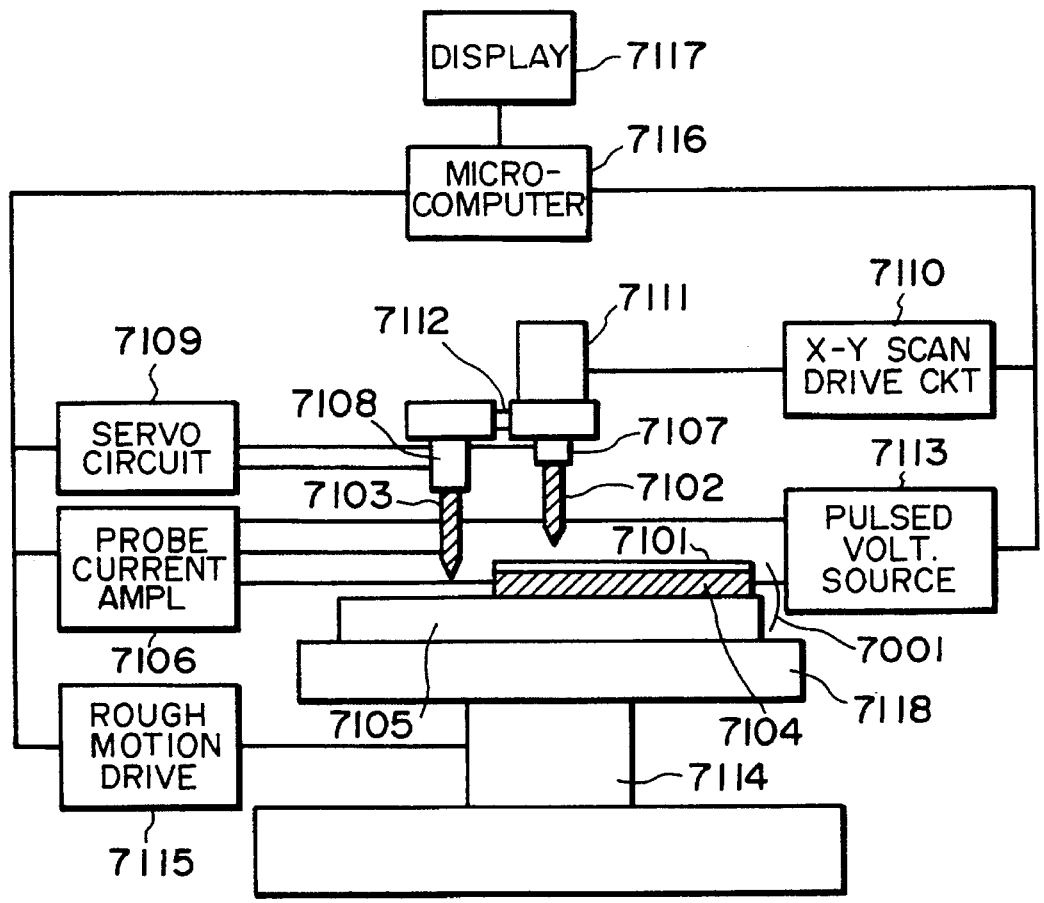
FIG. 51 is a block diagram schematically showing a recording and reproducing (playback) apparatus, arranged in accordance with the embodiment of FIG. 50.

FIG. 51 is a schematic and diagrammatic view of a recording apparatus according to one embodiment of the present invention and, in this example, two probe electrodes are provided for the position detection and for the recording/reproducing, respectively. Denoted in FIG. 51 at 7102 and 7103 are the probe electrodes used for the recording/reproducing and for the position detection, respectively. Although the distance between these two probe electrodes can be adjusted minutely by means of a probe electrode interval minute adjusting mechanism 7112 using a piezoelectric device, usually they are maintained at a fixed interval. Denoted at 7106 is a probe current amplifier and, denoted at 7109, is a servo circuit for controlling fine motion driving mechanisms 7107 and 7108 each using a piezoelectric device, so as to maintain the probe current constant. Denoted at 7113 is a voltage source for applying, to and between the recording/reproducing probe electrode 7102 and a base electrode 7104, a pulse voltage for the recording/erasing.

Since the probe current changes radically when the pulse voltage is applied, the servo circuit 7109 controls to turn a hold circuit on so that the output voltage is maintained constant during that period.

Denoted at 7110 is an X-Y scan drive circuit for controllably moving the paired prove electrodes 7102 and 7103 in the X and Y directions. Rough-motion drive mechanisms 7114 and 7115 are used to preparatorily and roughly control the distance between the recording medium 7001 and the probe electrode 7102 (7103) so that a probe current of an order of $10^{-9}$ A is produced, or to allow a large relative displacement between the probe electrode and the substrate in the X and Y directions (beyond the range of the fine-motion control mechanism).

These components are controlled by centralized control by use of a microcomputer 7116. Reference numeral 7117 denotes a display device.

Mechanical performance in the movement control by use of piezoelectric devices is as follows.

Z-axis fine-motion controllable range: 0.1 nm–1 micron

Z-axis rough-motion controllable range: 10 nm–10 mm

X-Y scan range: 0.1 nm–1 micron

X-Y rough-motion controllable range: 10 nm–10 mm

Tolerance for measurement and control: <0.1 nm (fine-motion control)

Tolerance for measurement and control: <1 nm (rough-motion control)

Details of the manner of recording/reproducing in the present embodiment will be explained below, particularly with reference to some examples thereof.

EXAMPLE 1

As the recording/reproducing apparatus, that shown in FIG. 51 was used and, as the probe electrode 7102 (7103), a probe electrode made of tungsten was used. The probe electrode 7102 (7103) is provided for controlling the distance Z to the surface of the recording medium 7001, and the distance Z of each probe electrode can be controlled by fine motion, independently from the other, by means of a piezoelectric device such that the electric current is maintained constant. Further, the fine-motion controlling mechanism is arranged to effect fine-motion control also in the direction within a plane (X-Y), while retaining the distance Z constant.

Of the two probe electrodes, the position detecting probe electrode 7103 is used for the detection of the atomic arrangement of the base 7105, which functions as a position coordinate. On the other hand, the recording/reproducing probe electrode 7102 is held at a fixed position with respect to the position detecting probe electrode 7103 in the X and Y directions (the interval therebetween being adjustable by use of the probe electrode interval minute adjusting mechanism 71 12), and is used for the recording, reproducing and/or erasing on the recording layer 7101.

While these two probe electrodes are adapted to be controllably moved, as a unit, by fine-motion control in the X and Y directions within the plane, with respect to the Z direction they can be controlled independently from each other by fine-motion. The recording medium 7001 is placed on a high-precision X-Y stage 7118 and can be moved to a desired position (X-Y rough-motion mechanism). The directions X and Y of the rough-motion mechanism and the directions X and Y of the fine-motion mechanism can be in accord with each other, within the range of errors due to the difference in precision between these movement controlling mechanism.

Figure 52A:
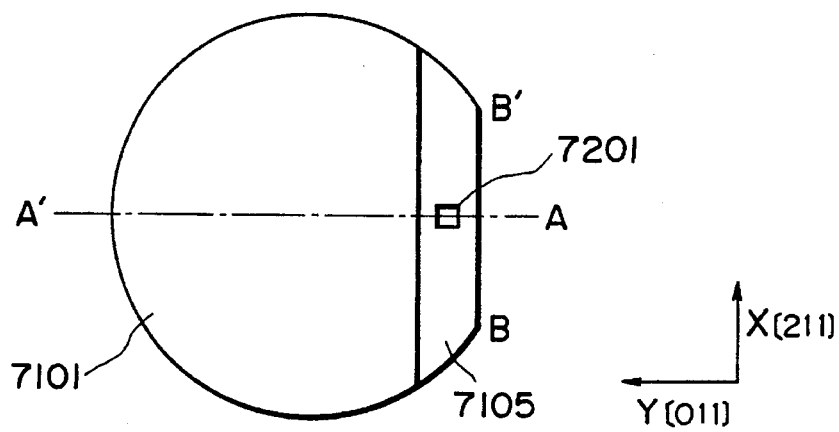
FIG. 52A is a plan view showing an example of a recording medium used in the FIG. 50 embodiment.
Figure 52B:
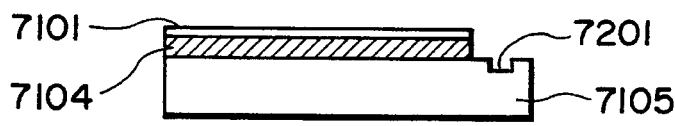
FIG. 52B is a section taken on a line A–A' in FIG. 52A.

Details of the recording medium used in the present example will be described. FIG. 52 shows the structure of the recording medium. P-type Si wafer (B-dope 0.3 mm thickness) having a diameter of ½ inch with a plane (111) being exposed, was used as a substrate 7105. The substrate is cut along a line B–B' for the purpose of attaining substantially constant orientation thereof when it is placed on the X-Y stage 7118 of the recording/reproducing apparatus. The direction B–B' is substantially parallel to the direction [$\overline{2}$11] of the Si crystal. Subsequently, at the position at a distance of 1 mm from the middle point of the side B–B' to the center of the base, a portion of the base was etched by a range of 1-micron square and 0.2-micron depth, to form a reference origin (rough) 7201. The method of forming such a reference origin (rough) will be explained below.

First, the surface of a Si base plate was coated with polymethyl methacrylate (PMMA; trade name "OEBR-1000" manufactured by Tokyo Ohka Kogyo, Inc. Japan) which is an electron-beam resist material. Then, an electron beam of a diameter 0.1 micron was projected with an acceleration voltage 20 keV to draw a pattern of a size of 1 micron square. Subsequently, by using a specific developing liquid, the portion irradiated by the electron beam was dissolved. As for the etching, a mixed gas of $CF_4$ and $H_2$ was used to effect sputter etching with a pressure 3 Pa and a discharging electric power 100 W, for 20 minutes. The etching depth was 0.2 micron. Finally, by using methyl ethyl ketone, the PMMA was dissolved.

Subsequently, after masking the substrate portion in the neighborhood of the reference origin (rough) 7201, Cr was deposited by vacuum evaporation to a thickness 50 angstroms to provide a background layer. Further, Au was deposited by the same method to a thickness of 400 angstroms to provide a base electrode 7104.

Subsequently, on such Au electrode, an LB film (eight layers) of squarilium-bis-6-octylazulene (hereinafter simply "SOAZ") was laminated to provide a recording layer 7101. Details of the method of forming such a recording layer are as follows.

First, benzene solution in which SOAZ was dissolved at concentration 0.2 mg/ml, was spread on the surface of water having a temperature of 20° C. to form on the water surface a monomolecular film. After evaporation of solvent, the surface pressure of the monomolecular film was increased to 20 mN/m and, while maintaining that constant, the base plate was slowly and repeatedly dipped and pulled up in the direction across the water surface and at a speed of 3 mm/min., whereby an eight-layer built-up film of SOAZ monomolecular film was formed on the base electrode 7104.

By using the recording medium 7001 formed in the described manner, recording/reproducing experiments were made.

The details are as follows.

Figure 53:
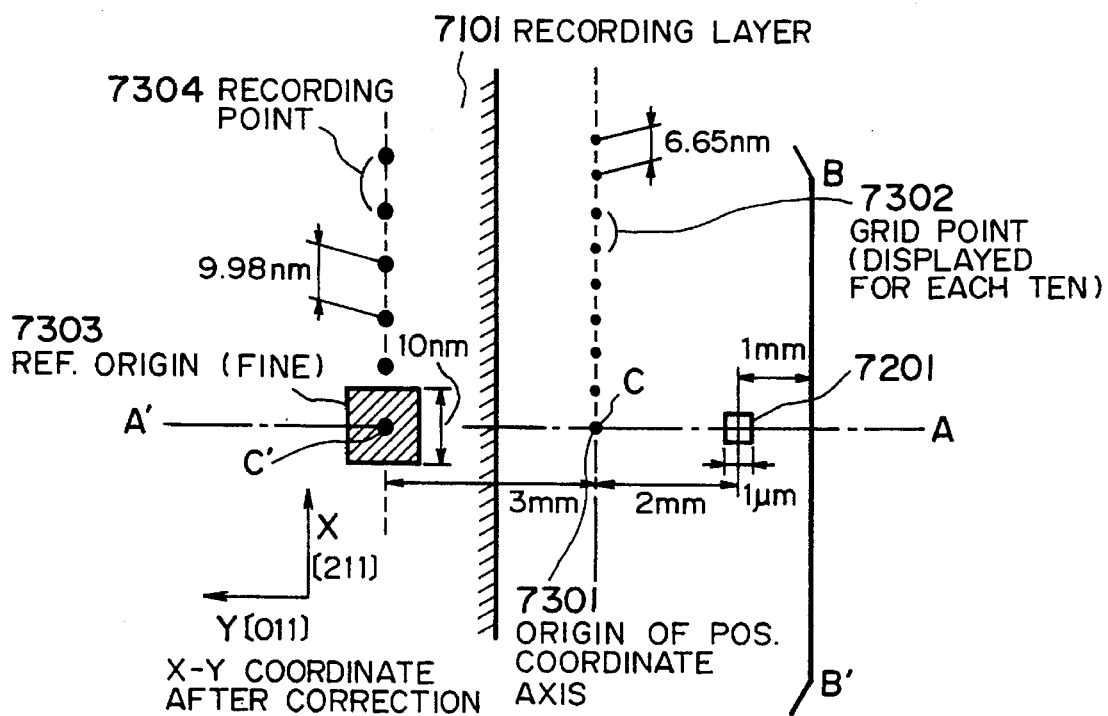
FIG. 53 is a schematic view showing an example of the positional relationship between a coordinate axis and recording positions, on the surface of a recording medium used in the embodiment of FIG. 50.

The recording medium 7001 having a recording layer 7101 provided by accumulated eight SOAZ layers, was placed on the X-Y stage 7118 with the cutout (B-B') of the substrate of the recording medium 1 aligned with respect to a predetermined direction. Subsequently, the position detecting probe electrode 7102 was moved to a position spaced by about 1 mm inwardly of the substrate from the side edge B-B' and, while applying a probe voltage of 0.6 V between the position detecting probe electrode and the Si substrate 7105 and after temporally aligning the X direction of the X-Y fine-motion mechanism (7110, 7111) so as to be substantially parallel to the direction B-B', X-direction scan was made through a length of 1 micron. Thereafter, Y-direction scan (perpendicular to the direction X) was made through a length of 1 micron. At that time, the measurement of the surface state was repeated while variously changing the manner of determination of the X-Y coordinate axis, and an adjustment was made so that the pitches of the obtained Si atomic arrangement became closest to 6.65 angstroms and 3.84 angstroms, respectively. By such an adjustment, the X axis of the X-Y fine-motion mechanism can be made coincident with the direction [$\overline{2}11$] of the Si substrate, while the Y axis thereof can be made coincident with the direction [$01\overline{1}$]. At the same time, adjustment was made so that the X and Y directions of the rough-motion mechanism were brought in accord with the X and Y directions of the adjusted fine-motion mechanism, within the range of control errors of the rough-motion mechanism. Subsequently, with respect to the X and Y directions, the rough-motion mechanism was used to scan the position detecting probe electrode and the position of the reference origin (rough) 7201 was detected. Then, at a position spaced in the Y-axis direction by 2 mm from the center of the reference origin (rough) 7201 to the center of the substrate, and by using the fine-motion mechanism, the Si lattice point was detected. The position of that lattice point (point C in FIG. 53) was taken as a coordinate axis origin 7301, and the position detecting probe electrode 7103 was scanned in the X direction (direction [$\overline{2}11$]). By checking each lattice point with respect to the direction [$\overline{2}11$] of Si at that time, confirmation was made with regard to the direction control correction and the position coordinate (lattice pitch). In FIG. 53, each point denoted at 7302 (i.e. each lattice point) is illustrated as a representative of ten lattice points. It will be understood that, during the operation described above, the recording/reproducing probe electrode 7102 moves over the recording layer 7101 surface, with the movement of the position detecting probe electrode 7103.

In the present example, the distance between the two probe electrodes was 3 mm in the Y-axis direction. While the recording/reproducing probe electrode 7102 was used to effect desired information recording, prior to the actual recording, a reference origin (fine) 7303 was formed at a recording position (point C' in FIG. 53) corresponding to the position coordinate axis origin 7301.

Such a reference origin (fine) can be formed by utilizing the electric memory effect of the recording layer 7101. Namely, a probe voltage of 1.0 V was applied to between the recording/reproducing electrode 7102 and the Au electrode 7104 and, by using the Z-axis direction fine-motion control mechanism 7107, the distance Z between the recording/reproducing probe electrode 7102 and the recording layer 7101 surface was adjusted so that the probe current Ip became equal to $10^{-9}$ A. Subsequently, while placing the recording/reproducing probe electrode 7102 on a positive side and placing the Au electrode 7104 on a negative side, a rectangular pulse voltage (18 V, 0.1 microsecond) greater than a threshold voltage Vth ON, from which the electric memory material (SOAZ, eight-layer LB film) changes into a low resistance state (ON state), was applied to create the "ON" state. While retaining the distance Z between the recording/reproducing probe electrode 7102 and the recording layer 7101, a probe voltage of 1.0 V was applied between the recording/reproducing probe electrode 7102 and the Au electrode 7104. The probe current Ip was measured and it was confirmed that there was an electric current of about 0.5 mA and that the "ON" state was established. By the foregoing operation, the reference origin (fine) 7303 was determined. In that case, the region on the recording layer of a size of 10 nm square was rendered into the "ON" state, and that was done to prevent that the origin positional information concerning the reference origin (fine) 7303 and record information, to be recorded later, were reproduced mixedly (FIG. 53). However, the shape of the reference origin (fine) 7303 is not limited to that of the present example.

Subsequently, the position detecting probe electrode 7103 was scanned in the direction [$\overline{2}11$] while checking the lattice point and, at each 15-pitch point (9.98 nm), the recording was made by using the recording/reproducing probe electrode 7103 which was moving simultaneously therewith. Thus, the pitch of the recording points 7304 was 9.98 nm (FIG. 53). The recording was effected in accordance with a method similar to the formation of the reference origin (fine) 7303 and by defining on the recording layer (SOAZ, eight-layer LB film) 7101 the "ON" state and the "OFF" state (high-resistance state before the recording).

The recording medium having a record formed thereon by the above-described process, was once demounted from the recording/reproducing apparatus and, thereafter, was placed again on the X-Y stage 7118, and reproduction experiments were made. First, like the recording, the X and Y directions of the position control system were aligned, using the Si lattice with the direction [$\overline{2}11$] and the direction [$01\overline{1}$], respectively. Thereafter, with respect to the X and Y directions, the rough-motion mechanism was used to scan the position detecting probe electrode 7103, and the position of the reference origin (rough) 7201 was detected. On the basis of the detected reference origin (rough) 7201, the rough-motion and fine-motion mechanisms were used to scan the recording/reproducing probe electrode 7102, and the position of the reference origin (fine) 7303 was detected.

It was confirmed that, at the same time, the position detecting probe electrode 7103 was on the Si lattice point (position coordinate axis origin 7301). If there was deviation, the fine-motion mechanism could be used to correct the X-Y coordinate system to bring the position detecting probe electrode 7103 and the Si lattice point into agreement with each other. Subsequently, a probe voltage of 0.6 V was applied to between the position detecting prove electrode 7103 and the Au electrode 7104 and, while detecting the positions of the Si lattice points, the position detecting probe was scanned in the direction [$\overline{2}11$] (X-axis direction). At that time, a probe voltage of 1.0 V was applied to between the Au electrode 7104 and the recording/reproducing probe electrode 7102 which was being moved simultaneously therewith, and the reproduction of the recorded information was effected by (i) directly reading the changes in the probe current based on the "ON" state or the "OFF" state at each recording point or, alternatively, by (ii) reading through the servo circuit 7109 the changes in the distance Z between the recording/reproducing probe electrode 7102 and the recording layer 7101 surface, at the time of scan of the recording/reproducing probe electrode 7102 made so as to maintain a constant probe current Ip.

According to the described reproduction experiments, the bit error rate was $2 \times 10^{-6}$.

Additionally, a probe voltage of 10 V, greater than a threshold voltage Vth OFF from which the electric memory material changes from the "ON" state to the "OFF" state was set and the recording positions were traced again. As a result, it was confirmed that all the records were erased and the transition to the "OFF" state had occurred.

EXAMPLE 2

In place of the SOAZ four-layer LB film used in Example 1, CuTCNQF$_4$ was used to provide a recording layer 7101. Recording and reproducing experiments were made in a similar manner as in Example 1.

As for the electrical voltage to be applied for the recording, a rectangular pulse of 2 Vmax. and 10 ns was used, and the electrical voltage to be applied for the reproduction was 0.1 V. Also, as for the electrical voltage to be applied for the erasing, a rectangular pulse of 5 Vmax. and 100 ns was used. The recording pitch was 99.8 nm (150 Si lattice point pitch), and the size of the reference origin (fine) 7303 was changed to 0.1-micron square. According to the results of reproduction experiments, the bit error rate was $1\times10^{-9}$.

The method of forming a CuTCNQF$_4$ recording layer 7101 will be explained. On the Au electrode 7104, Cu and TCNQF$_4$ were co-deposited by vacuum evaporation method, and a Cu+TCNQF$_4$ layer was deposited to a thickness of 2000 angstroms (substrate temperature: room temperature). At that time, an electric current which was preset to provide deposition speeds of about Cu: 5 angstrom/s and TCNQF$_4$:20 angstrom/s, was applied and heating was made. It was confirmed that, as a result, a blue film was deposited due to the production of CuTCNQF$_4$.

EXAMPLE 3

In Example 1, the probe electrodes 7102 and 7103 were scanned not only in the X direction (direction [$\bar{2}11$]) but also in the Y direction (direction [$01\bar{1}$]), and the recording was made two-dimensionally. At that time, the recording pitch in the Y direction was 11.5 nm (for each thirty Si lattice points). Similar reproduction experiments were made, and the bit error rate was $3\times10^{-6}$.

EXAMPLE 4

In Example 1, the substrate 7105 was replaced by a Ga-As wafer and the recording layer 7101 was replaced by an eight-layer LB film of t-butyl substitution product of silicon chloride-phthalocyanine (PcSiCl$_2$). Except for those points, the present example is substantially the same as Example 1 and, recording/reproducing experiments were made. Description will be made to the differences in comparison with Example 1. The structure of the recording medium 1 was such as shown in FIG. 52. As for a substrate, a P type Ga-As wafer (Zn dope, 0.3 mm thickness) of a diameter of ½ inch with its plane (110) exposed, was used. The direction B–B' of the cutout of the substrate is substantially parallel to the direction [001] of the Ga-As crystal.

From the middle point of the side B–B' to the center of the substrate, etching was made to a size of 1-micron square and a depth of 0.2 micron, to form a reference origin (rough). The manner of forming such a reference origin (rough) will be explained below.

First, a ultraviolet ray resist (trade name: "AZ 1350") was applied to the Ga-As substrate surface to a thickness of 1 micron and, after prebaking, a mask corresponding to the shape shown in FIG. 52 was used, and the treatments of ultraviolet-ray exposure, development and post-baking were conducted. As a consequence, a mask pattern was formed on the Ga-As substrate. Subsequently, by using a BCl$_3$ gas, sputter etching was made under the condition of gas pressure of 1 Pa and discharging voltage of 100 W, for three minutes. The resultant etching depth was 0.2 micron. The AZ 1350 material of the mask was removed by acetone cleaning.

Similarly to Example 1, a Cr/Au base electrode 7104 was formed on the thus produced substrate and, thereafter, on that base electrode 7104 an eight-layer LB film of t-butyl substitution product of silicon chloride-phthalocyanine (PcSiCl$_2$) was built to provide a recording layer 7101. The recording layer forming conditions were as follows:

Solvent: CH$_3$CCl$_3$

Conc. of solution: 1 mg/ml

Aqueous phase: pH 8.2 (pure water adjusted by NaOH)

Water surface pressure: 25 mN/m

Vertical moving speed of substrate: 5 mm/min. (Z type accumulation)

Using the recording medium 7001 formed in the described manner, recording/reproducing experiments were made. First, with regard to the setting of the X-Y coordinate system, adjustment was made so that the X-axis and the Y-axis became in accord with the direction [001] and the direction [$\bar{1}10$] of the Ga-As crystal, respectively. Since the pitch on the coordinate axis at that time was based on the Ga—Ga interatomic distance, it was 5.65 angstroms with respect to the direction [001] and 400 angstroms with respect to the direction [$\bar{1}10$]. The recording was made at 10.17 nm pitch (each eighteen Ga lattice points) in the X direction and at 12 nm pitch (each thirty Ga lattice points) in the Y direction. Reproduction experiments were made in the same manner as in Example 1, and the bit error rate was $3\times10^{-6}$.

EXAMPLE 5

In Example 2, the recording layer 7101 was replaced by a film of amorphous semiconductor, represented by an atomic composition ratio of Si$_{16}$Ge$_{14}$As$_5$Te$_{65}$, made by well-known vacuum evaporation method to a thickness of 2000 angstroms. In a similar manner as in Example 2, recording/reproducing experiments were made. However, the recording voltage, the reproducing voltage and the erasing voltage were changed to a rectangular pulse of 20 Vmax., 0.1 microsecond; a voltage of 1.0 V; and a rectangular pulse of 50 Vmax., 10 microseconds, respectively).

The recording pitch was 96.05 nm (each one hundred and sixty Ga lattice points) in the X direction and 120 nm (each three hundreds Ga lattice points) in the Y direction. The size of the reference origin (fine) was changed to 0.1-micron square. As a result of the reproduction experiments, the bit error rate was $1\times10^{-9}$.

Figure 54:
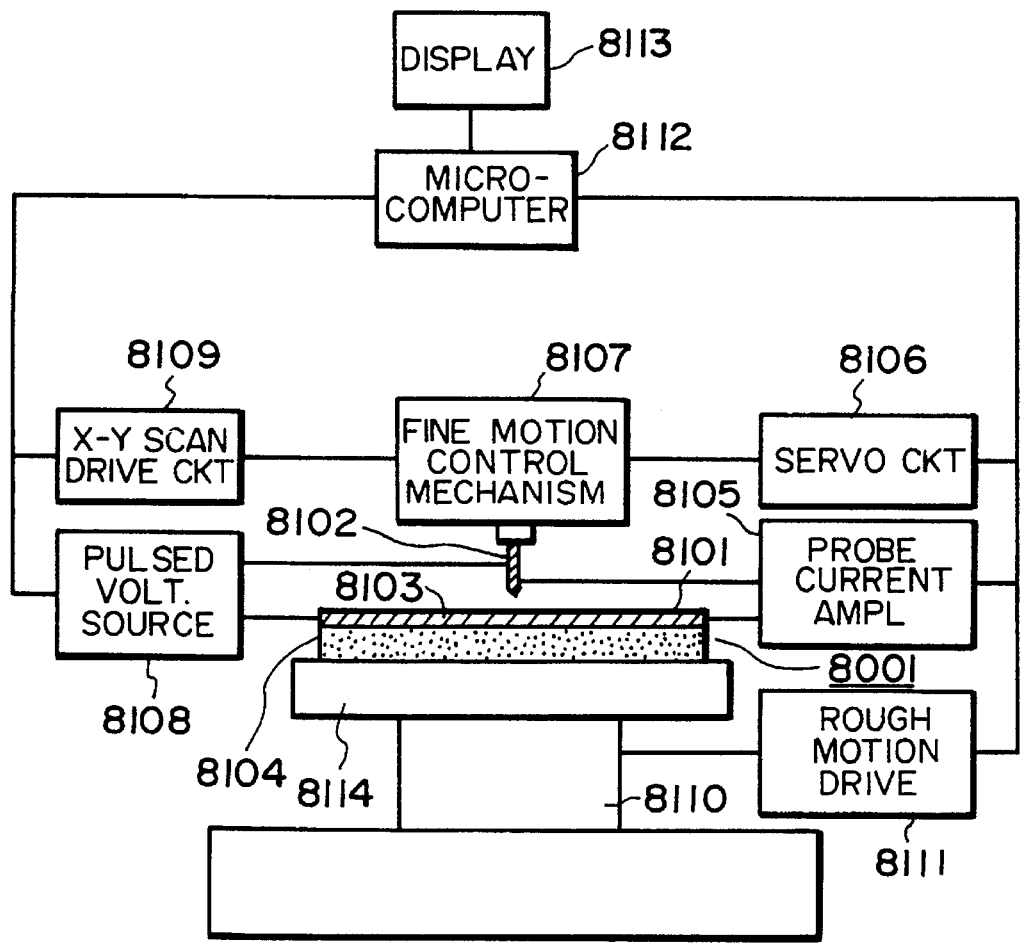
FIG. 54 is a block diagram schematically showing a recording and reproducing apparatus according to another embodiment of the present invention.

FIG. 54 is a schematic and diagrammatic view of a recording apparatus according to a still further embodiment of the present invention. In FIG. 54, denoted at 8105 is a probe current amplifier, and, at 8106, is a servo circuit for controlling a fine-motion mechanism 8107 using a piezoelectric device so as to maintain the probe current constant. Denoted at 8108 is an electric power source for applying a recording/erasing pulse voltage to between a probe electrode 8102 and an electrode 8103.

Since the probe current changes radically when the pulse voltage is applied, the servo circuit 8109 controls to turn a hold circuit on so that the output voltage is maintained constant during that period.

Denoted at 8109 is an X-Y scan drive circuit for controllably moving the prove electrode 8102 in the X and Y directions. Rough-motion drive mechanisms 8110 and 8111 are used to preparatorily and roughly control the distance between the recording medium 8001 and the probe electrode 8102 so that a probe current of an order of $10^{-9}$ A is produced, or to allow a large relative displacement between the probe electrode and the substrate in the X and Y directions (beyond the range of the fine-motion control mechanism).

These components are controlled by centralized control by use of a microcomputer 8112. Reference numeral 8113 denotes a display device.

The mechanical performance in the movement control by use of piezoelectric devices is as follows.

Z-axis fine-motion controllable range: 0.1 nm–1 micron

Z-axis rough-motion controllable range: 10 nm–10 mm

X-Y scan range: 0.1 nm–1 micron

X-Y rough-motion controllable range: 10 nm–10 mm

Tolerance for measurement and control: <0.1 nm (fine-motion control)

Tolerance for measurement and control: <1 nm (rough-motion control)

Details of the manner of recording/reproducing in the present embodiment will be explained below, particularly with reference to some examples thereof.

EXAMPLE 6

As the recording/reproducing apparatus, that shown in FIG. 54 was used and, as the probe electrode 8102, a probe electrode made of tungsten was used. The probe electrode 8102 is provided for controlling the distance Z to the surface of the recording medium 8001, and the distance Z of the probe electrode can be controlled by fine motion, such that the electric current is maintained constant. Further, the fine-motion controlling mechanism is arranged to effect fine-motion control also in the direction within a plane (X-Y), while retaining the distance Z constant.

The probe electrode 8102 is usable for detecting the position in the relative direction within the surface of the recording medium as well as for the recording, reproducing and erasing. Also, the recording medium 8001 is placed on a high-precision X-Y stage 8114 and can be moved to a desired position (X-Y rough-motion mechanism). The X and Y directions of the rough-motion mechanism and the X-Y directions of the fine-motion mechanism are in accord with each other within the range of error resulting from the difference in precision between these movement control mechanisms.

Figure 55A:
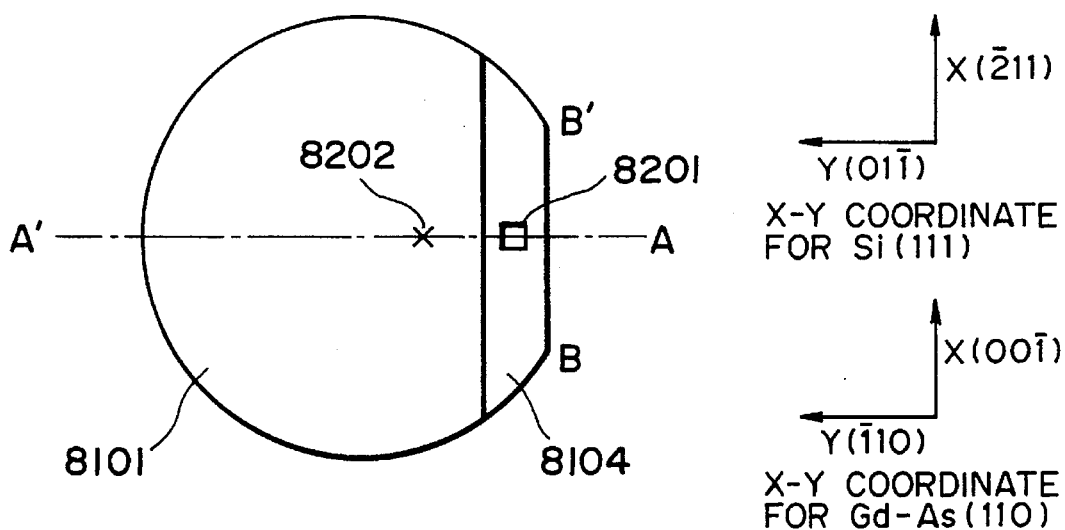
FIG. 55A is a plan view of a recording medium used in the FIG. 54 apparatus.
Figure 55B:
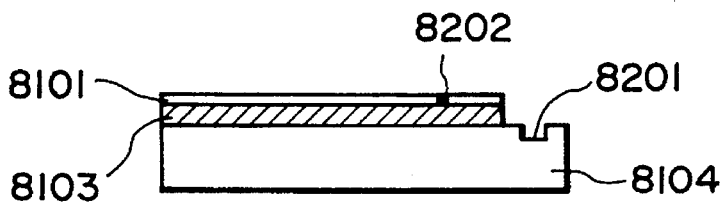
FIG. 55B is a sectional view taken along a line A–A' in FIG. 55B.

Details of the recording medium usable in the present embodiment will be described. The structure of such a recording medium is shown in FIGS. 55A and 55B. FIG. 55A is a plan view of a recording medium used in the present embodiment, and FIG. 55B is a section taken on a line A–A'.

P-type Si wafer (B-dope 0.3 mm thickness) having a diameter of ½ inch with a plane (111) being exposed, was used as a substrate 8104. The substrate is cut along a line B–B' for the purpose of attaining substantially constant orientation thereof when it is placed on the X-Y stage 8114 of the recording/reproducing apparatus. The direction B–B' is substantially parallel to the direction [$\bar{2}$11] of the Si crystal. Subsequently, at the position at a distance of 1 mm from the middle point of the side B–B' to the center of the base, a portion of the base was etched by a range of 1-micron square and 0.2-micron depth, to form a reference origin (rough). The method of forming such a reference origin (rough) is substantially the same as has been described with reference to Example 1.

The manner of forming the base electrode 8103 and the recording layer 8101 is essentially the same as having been described with reference to FIG. 52.

By using the recording medium 8001 formed in the described manner, recording/reproducing experiments were made.

The details are as follows.

The recording medium 8001 having a recording layer 8101 provided by accumulated eight SOAZ layers, was placed on the X-Y stage 8114 with the cutout (B–B') of the substrate of the recording medium 1 aligned with respect to a predetermined direction. Subsequently, the probe electrode 8102 was moved to a position spaced by about 1 mm inwardly of the substrate from the side edge B–B' and, while applying a probe voltage of 0.6 V to between the probe electrode and the Si substrate 8104 and after temporally aligning the X direction of the X-Y fine-motion mechanism (8107, 8109) so as to be substantially parallel to the direction B–B', X-direction scan was made through a length of 1 micron. Thereafter, Y-direction scan (perpendicular to the direction X) was made through a length of 1 micron. At that time, the measurement of the surface state was repeated while variously changing the manner of determination of the X-Y coordinate axis, and adjustment was made so that the pitches of the obtained Si atomic arrangement became closest to 6.65 angstroms and 3.84 angstroms, respectively. By such adjustment, the X axis of the X-Y fine-motion mechanism can be made coincident with the direction [$\bar{2}$11] of the Si substrate, while the Y axis thereof can be made coincident with the direction [01$\bar{1}$]. At the same time, adjustment was made so that the X and Y directions of the rough-motion mechanism were brought in accord with the X and Y directions of the adjusted fine-motion mechanism, within the range of control errors of the rough-motion mechanism. Subsequently, with respect to the X and Y directions, the rough-motion mechanism was used to scan the probe electrode and the position of the reference origin (rough) 8201 was detected.

A reference origin (fine) 8202 was formed at a position spaced by 2 mm in the Y-axis direction from the center of the reference origin (rough) to the center of the substrate.

Figure 56:
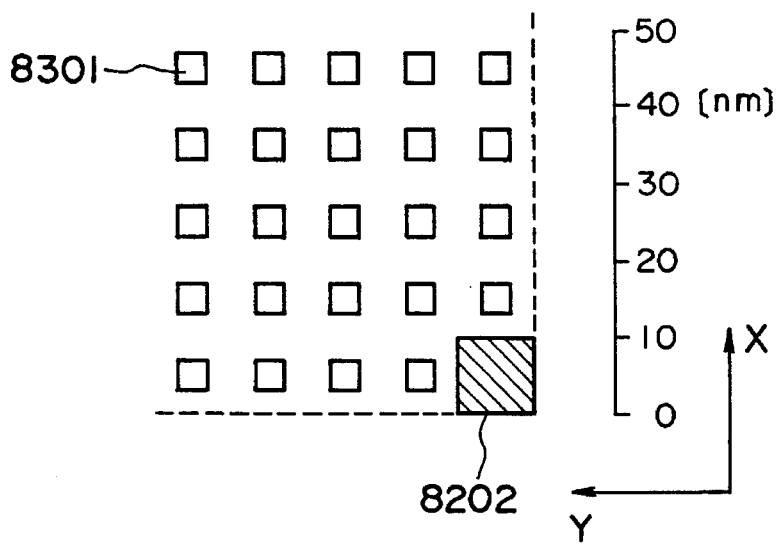
FIG. 56 is a schematic view showing recording positions on the recording medium of the FIG. 55 example.

Such a reference origin (fine) can be formed by utilizing the electric memory effect of the recording layer 8101. Namely, a probe voltage of 1.0 V was applied to between the electrode 8102 and the Au electrode 8103 and, by using the Z-axis direction fine-motion control mechanism 8107, the distance Z between the probe electrode 8102 and the recording layer 8101 surface was adjusted so that the probe current Ip became equal to $10^{-9}$ A. Subsequently, while placing the probe electrode 8102 on a positive side and placing the Au electrode on a negative side, a rectangular pulse voltage (18 V, 0.1 microsecond) greater than a threshold voltage Vth ON, from which the electric memory material (SOAZ, eight-layer LB film) changes into a low resistance state (ON state), was applied to create the "ON" state. While retaining the distance Z between the probe electrode 8102 and the recording layer 8101, a probe voltage of 1.0 V was applied between the probe electrode 8102 and the Au electrode 8103. The probe current Ip was measured and it was confirmed that there was an electric current of about 0.5 mA and that the "ON" state was established. By the foregoing operation, the reference origin (fine) 8202 was determined. In that case, the region on the recording layer of a size of 10 nm square was rendered into the "ON" state, and that was done to prevent that the origin positional information concerning the reference origin (fine) 8202 and record information, to be recorded later, were reproduced mixedly (FIG. 56). However, the shape of the reference origin (fine) 8202 is not limited to that of the present example.

Subsequently, while using such reference origin (fine) as an origin on the X-Y coordinate of the probe electrode position control system, the probe electrode 8102 was scanned by fine motion and the information recording was conducted at a pitch of 0.01 micron. The recording position per one bit on the recording surface 8101 is schematically shown in FIG. 56. The recording was made in a similar manner as the formation of the reference origin (fine) and by defining on the electric memory material (SOAZ four-layer LB film) an "ON" state and an "OFF" state (high resistance state before recording).

The recording medium having a record formed thereon by the above-described process, was once demounted from the recording/reproducing apparatus and, thereafter, was placed again on the X-Y stage 8114, and reproduction experiments were made. First, like the recording, the X and Y directions of the position control system were aligned, using the Si atom scale with the direction [$\bar{2}11$] and the direction [$01\bar{1}$], respectively. Thereafter, with respect to the X and Y directions, the rough-motion mechanism was used to scan the probe electrode and the position of the reference origin (rough) 8201 was detected. On the basis of the detected reference origin (rough), the rough-motion and fine-motion mechanisms were used to detect the reference origin (fine).

By using such reference origin (fine) as an origin of the X-Y coordinate system, the reproduction of the recorded information was conducted. More specifically, a reproducing probe voltage of 1.0 V was applied to between the probe electrode 8102 and the Au electrode 8103, and the detection of the position of the reference origin (fine) 8202 as well as the reproduction of the recorded information were effected by (i) directly reading the change in the probe current flowing in the "ON" state region and the "OFF" state region or, alternatively, by (ii) reading through the servo circuit 8106 the changes in the distance Z between the probe electrode 8102 and the recording layer 8101 surface, at the time of scan of the probe electrode 8102 made to maintain a constant probe current Ip. In the reproduction experiments described above, the bit error rate was $5 \times 10^{-6}$.

Additionally, a probe voltage of 10 V, greater than a threshold voltage Vth OFF from which the electric memory material changes from the "ON" state to the "OFF" state was set and the recording positions were traced again. As a result, it was confirmed that all the records were erased and the transition to the "OFF" state had occurred.

Comparing Example 1

In the reproduction experiments in Example 6, the setting of the X-Y coordinate system of the probe electrode scan mechanism using the atom scale as well as the setting of the position coordinate origin based on the detection of reference origins (rough and fine) were omitted. In that case, it was very difficult to find out the record writing region and, further, the reproduction was substantially impossible.

EXAMPLE 7

A description will be provided of an Example wherein the X-Y coordinate system of a probe electrode scan system is set by use of a reference scale, using a plurality of reference origins, to execute the recording/reproducing.

Figure 57A:
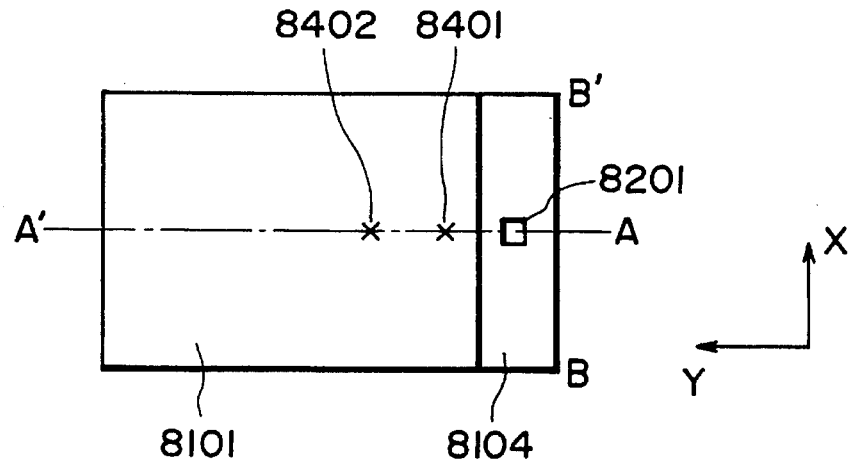
FIG. 57A is a plan view of another recording medium which is usable in the FIG. 54 apparatus.
Figure 57B:
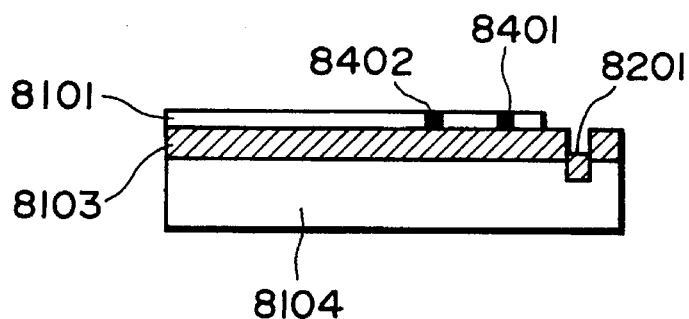
FIG. 57B is a sectional view taken along a line A–A' in FIG. 57A.

The structure of a recording medium 8001 usable in this example is schematically shown in FIGS. 57A and 57B. In this example, as a substrate 8104, an optically ground glass plate (1 mm thickness) of a size 0.7×1.5 cm was used. Then, at a position spaced by 1 mm from the middle point on the side B–B' toward the center of substrate, a reference origin (rough) 8202 having a size of 1-micron square and a depth of 0.1 micron was formed.

The method of forming such a reference origin (rough) will be explained below.

By using a known photoresist process, a resist material (trade name: "AZ 1350") was applied to the substrate to a thickness of 1 micron. After the prebaking, and by using a mask having a shape shown in FIG. 56, ultraviolet ray exposure, development and post-baking were conducted and a mask pattern was formed on the glass plate. Subsequently, based on a known $CF_4$ gas plasma etching process, dry etching was made to the glass surface to a depth of 0.1 micron under the condition of etching power of 50 W, thus pressure of 1 Pa and gas flow rate of 15 SCCM. The AZ 1350 material of the mask was removed by acetone cleaning.

Then, the substrate was left in a saturated vapor of hexamethyldisilazane and hydrophobic treatment was made to the surface thereof. Then, onto the substrate, Cr was deposited to a thickness of 50 angstroms by vacuum evaporation method to provide a background layer. Further, by the same method, Au was deposited to a thickness of 400 angstroms to provide a base electrode 8103. Then, on that Au electrode, a ten-layer LB film of t-butyl substitution product of luthetium diphthalocyanine ($LuH(Pc)_2$) is laminated, such that a recording layer 8101 was formed. That was done in the manner that the recording layer 8101 was not deposited in the neighborhood of the reference origin (rough) 8201.

The conditions for the formation of the t-butyl substitution LB film of $LuH(Pc)_2$ were as follows:

Solvent: chloroform/trimethylbenzene/acetone=1/1/2 (V/V)

Concentration: 0.5 mg/ml

Aqueous phase: pure water of temperature 20° C.

Water surface pressure: 20 mN/m

Vertical moving speed of substrate: 3 mm/min.

By using the recording medium 8001 formed in the described manner and by using the recording/reproducing apparatus described with reference to Example 6, recording/reproducing experiments were made. Details are as follows:

The recording medium 8001, having a recording layer 8101 formed by the accumulation of ten-layer LB film of t-butyl substitution of $LuH(Pc)_2$, was placed on the X-Y stage 8114 with the direction B–B' of the recording medium aligned with respect to the X-axis direction of the X-Y stage 8114. Subsequently, as in Example 6, with respect to the X and Y directions, the rough-motion mechanism 8110 was used to scan the probe electrode 8102 to thereby detect the position of the reference origin (rough) 8201. The probe voltage was 0.1 V. At the position (on the recording layer 8101) spaced by 2 mm in the Y-axis direction from the center of the reference origin (rough) 8201 to the center of the substrate, a first reference origin (fine) 8401 was formed by a similar manner as the formation of the reference origin (fine) in Example 6. At that time, the X and Y directions of the rough-motion mechanism and the X and Y directions of the fine-motion mechanism had been in accord with each other within the range of control error of the rough-motion mechanism. Then, by using the fine-motion mechanism, a second reference origin (fine) 8402 was formed at a position spaced by 1 micron in the Y-axis direction from the first reference origin (fine) 8401. Such a second reference origin (fine) 8402 can be formed in a similar manner as of the first reference origin (fine). For distinguishability, each origin may have a different shape. However, this is not always necessary. What is required is only that these origins are not confused with the other, ordinary record information. By using one of the first and second reference origins (fine) 8401 and 8402 as an origin of the X-Y coordinate system and by using the fine-motion mechanism, the recording of information was made at a pitch of 0.01 micron. The recording was made in the same manner as in Example 6.

The recording medium 8001 on which records had been formed in the described process was temporally demounted from the recording/reproducing apparatus, and thereafter, it was placed again on the X-Y stage 8114, and reproduction experiments were made. First, like the recording, the probe electrode was scanned in the X and Y directions by the rough-motion mechanism to detect the reference origin (rough) 8201 and, on the basis of the detected reference origin (rough) and by use of the rough-motion and fine-motion mechanisms, the first reference origin (fine) 8401 was found. Then, by using the fine-motion mechanism, the second reference origin (fine) 8402 was detected and, thereafter, the X-Y coordinate system was adjusted (re-set) so that the direction of a line segment connecting the first and second reference origins (fine) and the Y-axis direction of the probe electrode scan system came into accord with each other. The setting at that time was done so that the first reference origin (fine) 8401 provided an origin of such X-Y coordinate system. The reproduction of recorded information was made by using such position coordinate system as a reference, and the bit error rate was $3\times10^{-6}$.

Reproduction was tried without the resetting of the X-Y coordinate system using the described reference origins, but the reproduction was not possible.

EXAMPLE 8

Another example wherein plural reference points are provided outside the range of fine-motion scan, in order to increase the recording capacity, and wherein the recording/reproducing is effected by using each point as a reference, will now be described. As a recording/reproducing apparatus, that the same as used in Example 6 (FIG. 54) was used.

Figure 58:
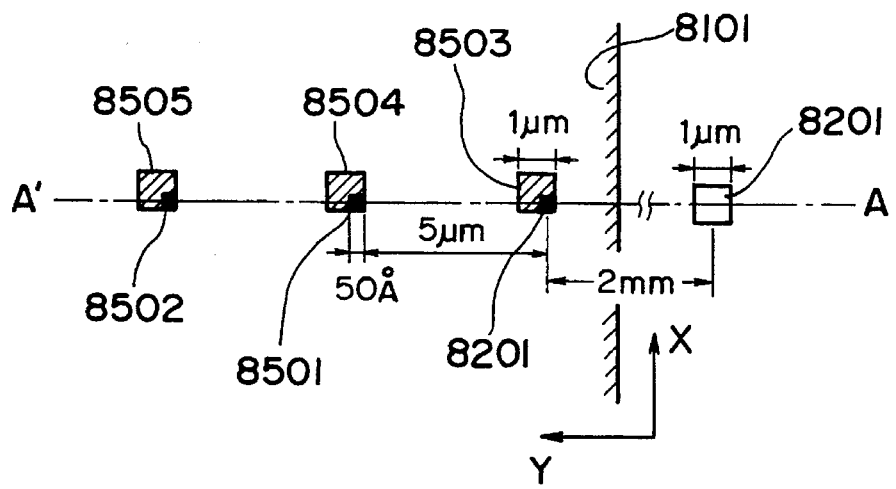
FIG. 58 is a schematic view showing the positional relationship among recording areas on the surface of the recording medium of the FIG. 57 example.

Recording medium 8001 was manufactured in the same manner as in Example 6, and a reference origin (fine) 8202 was formed in a similar manner. Subsequently, by using the fine-motion mechanism, the probe electrode was moved to a position spaced by 5 microns along the Y axis from the reference origin (fine) 8202 to the center of the substrate, and a reference point (fine) A 8501 was formed in a similar manner as the case of the reference origin (fine) 8202. Further, in a similar manner, another reference origin (fine) B 8502 was formed at a position spaced by 5 microns along the Y axis from the reference point (fine) A to the center of the substrate. By using each of these points as a reference and by use of the fine-motion control mechanism, the recording was made in each of a recording region 8503 (O), a recording region 8504 (A) and a recording region 8505 (B) (see FIG. 58).

Subsequently, the recording medium 8001 was temporally demounted from the recording/reproducing apparatus, and after placing it again, the reproduction of the recorded information was effected in a similar manner as in Example 6. In each of the recording regions 8503 (O), 8504 (A) and 8505 (B), the bit error rate was $5\times10^{-6}$.

Comparing Example 2

Like Example 8, a recording medium 8001 was manufactured and the recording was made. In this example, the reference point (fine) A 8501 and the reference point (fine) B 8502 were not formed, and the recording was made at positions corresponding to the recording region A 8504 and the recording region B 8505. To such recording medium 8001, having records thereon, reproduction experiments were made in the same manner as in Example 8. According to the results, the bit error rate in the recording region O 8503 was $5\times10^{-6}$, and no change occurred as compared with Example 8. However, with regard to the recording region A 8504 and the recording region B 8505, it was very difficult to detect their positions. Also, the bit error rate was in the range of $2\times10^{-3}$ to $5\times10^{-4}$, and there was reduction in precision by not less than two figures, as compared with Example 8.

EXAMPLE 9

In Example 6, the substrate 8104 was replaced by a Ga-As wafer and the recording layer 8101 was replaced by an eight-layer LB film of t-butyl substitution product of silicon chloride-phthalocyanine ($PcSniCl_2$). Except for those points, the present example is substantially the same as Example 6 and, recording/reproducing experiments were made. A description will be provided of to the differences in comparison with Example 6. The structure of the recording medium 1 was such as shown in FIG. 55. As for a substrate, a P type Ga-As wafer (Zn dope, 0.3 mm thickness) of a diameter of ½ inch with its plane (110) exposed, was used. The direction B–B' of the cutout of the substrate is substantially-parallel to the direction [001] of the Ga-As crystal.

From the middle point of the side B–B' to the center of the substrate, etching was made to a size of 1-micron square and a depth of 0.2 micron, to form a reference origin (rough). The manner of forming such a reference origin (rough) will be explained below.

First, a ultraviolet ray resist (trade name: "AZ 1350") was applied to the Ga-As substrate surface to a thickness of 1 micron and, after prebaking, a mask corresponding to the shape shown in FIG. 55 was used, and the treatments of ultraviolet-ray exposure, development and post-baking were conducted. As a consequence, a mask pattern was formed on the Ga-As substrate. Subsequently, by using a $BCl_3$ gas, sputter etching was made under the condition of gas pressure of 1 Pa and discharging voltage of 100 W, for three minutes. The resultant etching depth was 0.2 micron. The AZ 1350 material of the mask was removed by acetone cleaning.

Similarly to Example 6, a Cr/Au base electrode 8103 was formed on the thus produced substrate and, thereafter, on that base electrode 8103 an eight-layer LB film of t-butyl substitution silicon chloride-phthalocyanine ($PcSiCl_2$) was built to provide a recording layer 8101. The recording layer forming conditions were as follows:

Solvent: $CH_3CCl_3$

Conc. of solution: 1 mg/ml

Aqueous phase: pH 8.2 (pure water adjusted by NaOH)

Water surface pressure: 25 mN/m

Vertical moving speed of substrate: 5 mm/min. (Z type accumulation)

By using the recording medium 8001 manufactured in the described manner, the recording and reproducing experiments were made. The bit error rate at the time of reproduction was $5\times10^{-6}$.

It is added that, with regard to the setting of the X-Y coordinate axis using atom scale, the adjustment was made so that the X axis and the Y axis were brought into accord with the direction [001] and the direction [110] of the Ga-As crystal, respectively. The Ga—Ga interatomic pitch at that time was 5.65 angstroms with respect to the direction [001] and 4.00 angstroms with respect to the direction [$\bar{1}$10].

EXAMPLE 10

In Example 7, the recording layer 8101 was replaced by a film of amorphous semiconductor, represented by an atomic composition ratio of $Si_{16}Ge_{14}As_5Te_{65}$, made by well-known vacuum evaporation method to a thickness of 2000 angstroms. In a similar manner as in Example 7, recording/reproducing experiments were made. However, the recording voltage, the reproducing voltage and the erasing voltage were changed to a rectangular pulse of 20 Vmax., 0.1 microsecond; a voltage of 1.0 V; and a rectangular pulse of 50 Vmax., 10 microseconds, respectively).

The recording pitch was 0.1 micron, and the size of each of the first and second reference origins (fine) was changed to 0.1 micron square. According to the results of reproduction experiments, the bit error rate was $1\times10^{-9}$.

EXAMPLE 11

In place of the SOAZ four-layer LB film used in Example 6, $CuTCNQF_4$ was used to provide a recording layer 8101. Recording and reproducing experiments were made in a similar manner as in Example 6.

As for the electrical voltage to be applied for the recording, a rectangular pulse of 2 Vmax. and 10 ns was used, and the electrical voltage to be applied for the reproduction was 0.1 V. Also, as for the electrical voltage to be applied for the erasing, a rectangular pulse of 5 Vmax. and 100 ns was used. The recording pitch was 0.1 micron, and the size of the reference origin (fine) 8201 was changed to 0.1-micron square. According to the results of reproduction experiments, the bit error rate was $1\times10^{-9}$.

The method of forming a $CuTCNQF_4$ recording layer 8101 will be explained. On the Au electrode 8103, Cu and $TCNQF_4$ were co-deposited by vacuum evaporation method, and a $Cu+TCNQF_4$ layer was deposited to a thickness of 2000 angstroms (substrate temperature: room temperature). At that time, an electric current which was preset to provide deposition speeds of about Cu: 5 angstrom/s and $TCNQF_4$: 20 angstrom/s, was applied and heating was made. It was confirmed that, as a result, a blue film was deposited due to the production of $CuTCNQF_4$.

EXAMPLE 12

In this example, the base electrode (Cr-undercoated Au electrode) 8103 used in Example 10 (wherein plural reference origins and an amorphous semiconductor recording layer 8101 are used) is replaced by a Cr material of a thickness 500 angstroms and the recording layer 8101 is replaced by an amorphous silicon layer of the structure $P^+$-layer/n-layer/i-layer. Except for these points, the present example is the same as Example 10. Thus, in the same manner, the recording and reproducing experiments were made. According to the results of reproduction experiments, the bit error rate was $1\times10^{-9}$.

During the experiments, the following voltages were applied for the recording, reproducing and erasing.

Recording: 20 V

Reproducing: 0.5 V

Erasing: −5 V

The method of forming the recording layer 8101 will now be explained. First, Cr was vacuum-deposited to a film thickness of 500 angstroms to form an electrode. Then, by using a glow discharge method, a $P^+$-type amorphous silicon film of a thickness 1000 angstroms was formed. The forming conditions at that time were as follows:

Introduced gas: $B_2H_6/SiH_4$ ($N_{BH}/N_{SiH}=10^{-1}$) (diluted to 0.025 mol % by $H_2$ gas)

rf Power: 0.01 W/cm$^2$

Pressure: 0.5 Torr

Substrate temp.: 300° C.

Deposition speed: 30 angstroms/min.

Subsequently, excessive source material gas was exhausted, and, thereafter, a new source material gas was supplied and n type amorphous silicon was deposited to a thickness of 5000 angstroms. The formation conditions were as follows:

Introduced gas: $PH_3/SiH_4$ ($N_{PH}/N_{SiH}=5\times10^{-3}$) (diluted to 0.05 mol % by $H_2$ gas)

rf Power: 0.01 W/cm$^2$

Pressure: 0.5 Torr

Substrate temp.: 300° C.

Deposition speed: 40 angstroms/min.

After exhausting the source material gas, $SiH_4$ gas diluted to 0.05 mol % by $H_2$ gas was introduced into a chamber and, while retaining the other conditions, i-phase amorphous silicon was deposited to a thickness of 1000 angstroms.

Although various recording medium forming methods have been described with reference to the foregoing embodiments and examples, the formation of a recording medium is not limited to the methods of the disclosed embodiments and examples. Any film forming method may be used provided that a very uniform film can be formed. Further, it is to be understood that the present invention does not limit the material, shape and surface structure of a substrate.

Figure 59:
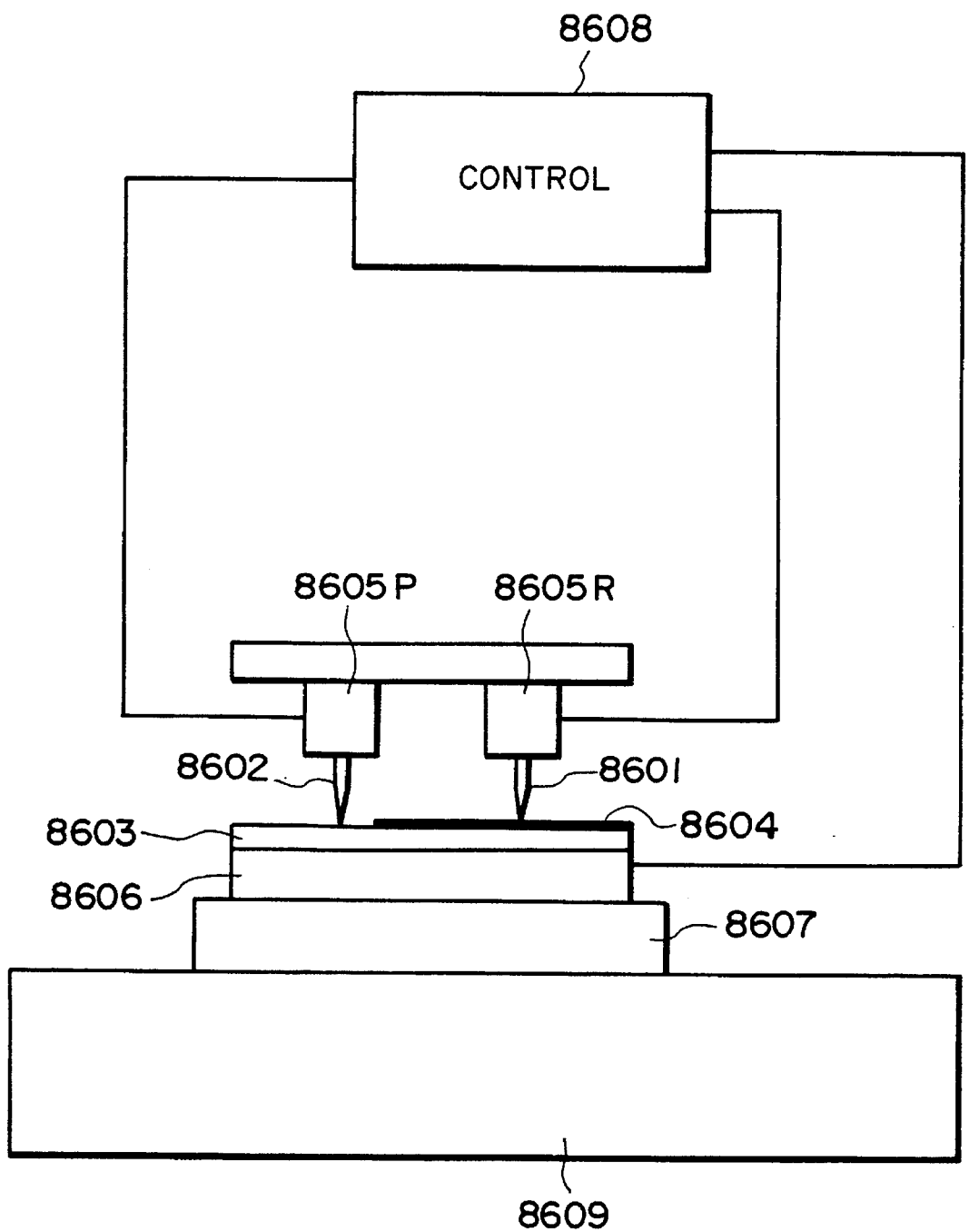
FIG. 59 is a schematic and diagrammatic view of a recording and reproducing apparatus according to a further embodiment of the present invention.

FIG. 59 is a schematic view of a recording/reproducing apparatus according to a further embodiment of the present invention, in which two probe electrodes are separately provided for the position detection and for the recording/reproducing.

Denoted in FIG. 59 at 8601 and 8602 are the recording/reproducing probe electrode and the position detecting probe electrode, each being made by electropolishing a tungsten wire of a diameter 1 mm. The position detecting probe electrode 8602 is used for detecting the atomic arrangement of a substrate 8603 which functions as a position coordinate. On the other hand, the recording/reproducing probe electrode 8601 is held at a fixed position with respect to the position detecting probe electrode 8602 and is made movable as a unit therewith. The recording/reproducing probe electrode is used for the recording, reproducing and erasing on a recording medium 8604. Denoted at 8605 P and 8605 R are X-Y-Z axis fine-motion mechanisms, each having a tube type fine-motion element (tube scanner), for controlling the distance Z between the recording medium 8604 and the probe electrode 8601 or 8602. These fine-motion mechanisms are adapted to independently control the positions of the probe electrodes 8601 and 8602 so that an average interval therebetween can be maintained constant. Further, these fine-motion mechanisms are arranged to effect fine position control in a plane (X and Y) while maintaining the distance Z constant.

The recording medium 8604 is placed on an X-Y rough-motion mechanism 9606 which includes a high-precision resilient hinge mechanism and which uses parallel springs, so that the recording medium can be moved to a desired position. Denoted at 8607 is a super rough-motion mechanism mainly comprising a multilayered-structure type piezoelectric device, for posing relative displacement in the Z-axis direction beyond the range of fine motion. These components and mechanisms are controlled under the influence of a control system 8608. Also, these components and mechanisms are placed on an anti-vibration table 8609.

Figure 60:
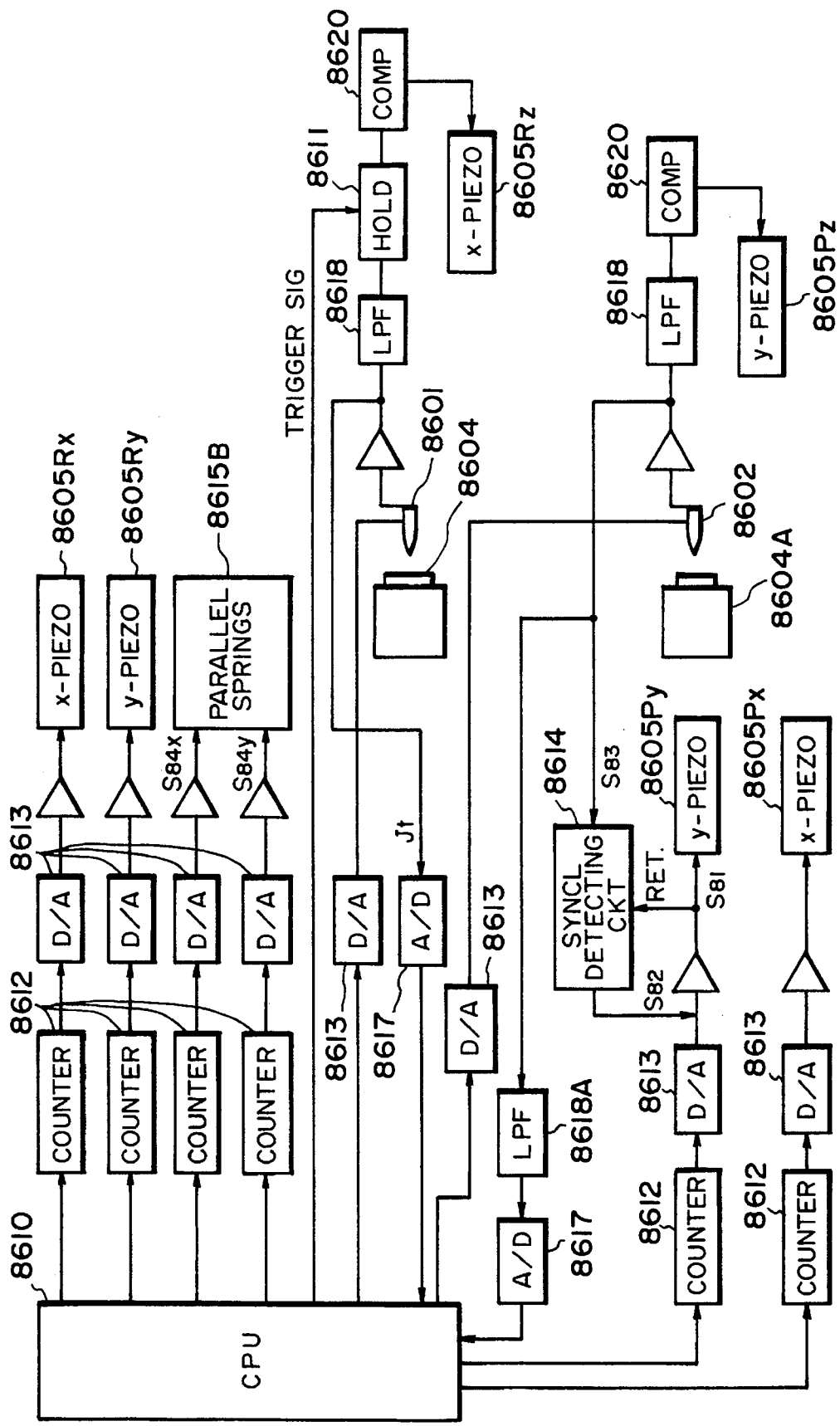
FIG. 60 is a block diagram of a control system used in the FIG. 59 embodiment.

The mechanical performance of the present embodiment in the movement control is such as follows:

Z-axis fine-motion control range: 0.1 nm–1 micron
Z-axis rough-motion control range: 10 nm–10 mm
X-Y fine-motion scan range: not less than 0.01 nm
X-Y rough-motion control range: 10 nm–10 mm FIG. 60 is a block diagram of the control system 8608 used in the present embodiment.

The position of the probe electrode 8601 (8602) is controlled and maintained constant by detecting through a comparator 8620 an electric current (probe current) flowing between the probe electrode and the recording medium (or the atoms of the substrate for the position detection); by comparing the detected current with a set level ($10^{-9}$ A); and by controlling the Z-axis position of the probe electrode through probe Z-axis fine-motion mechanisms 8605 Pz and 8605 Rz so that the probe current becomes approximately equal to the level $10^{-9}$ A. Upon recording and erasing, the probe current radically changes simultaneously with the application of a writing or erasing pulse voltage. Therefore, during such period, a hold circuit 8611 is turned on, which circuit is operable to maintain constant the output voltage to the Z-axis fine-motion mechanism 865 PZ for the probe 8602. The position of the position detecting probe electrode 8602 is adjusted in the X direction by means of an X-axis fine-motion mechanism 8605 PX, while it is oscillated minutely at a frequency of a few kHz in the Y direction by means of a Y-axis fine-motion mechanism 8605 Py. Probe current signal S83 which is obtainable at that time is subjected to phase-lock detection with a scan signal S81 of the Y-axis fine-motion mechanism 9605 Py which is obtained from a central processing unit (hereinafter "CPU") 8616 and through a counter 8612 and a digital-to-analog converter (hereinafter "D/A converter") 8613. By this, a signal S82 corresponding to the deviation of the probe electrode in the Y direction is produced as an output of a phase-lock detection circuit 8614. While adding the thus produced output to a Y-axis fine-motion mechanism scan signal S81, the rough-motion mechanism 8615 and the X-axis fine-motion mechanism 8605 Px cooperate to effect the scan in the X-axis direction, too. By this, the movement of the position detecting probe 8602 in the X direction can be made along the atomic arrangement.

While such Y-axis oscillation and the scan of the probe electrode relative to the atomic arrangement cause an oscillation component of high frequency in the probe current, such component can be intercepted by a low pass filter 8618. Therefore, the Z-axis fine-motion mechanisms 8605 Pz and 8605 Rz do not move the probe, while following the oscillation component of high frequency. As a consequence, the movement of the recording/reproducing probe electrode 8601, which is fixed in a predetermined relation with the position detecting probe electrode 8602 by means of the X-Y fine-motion mechanisms 8605 Rx and 8605 Ry and being movable together with the position detecting probe electrode, can be made accordingly.

The signal from the position detecting probe electrode 8602 is transmitted to the CPU 8610 by way of a low-pass filter 8618A (which is adapted to transmit such frequency component of the probe current that causes as a result of the X-direction scan of the probe electrode relative to the atomic arrangement but which is adapted to intercept such component of the probe current as having higher frequency) and the A/D converter 8617. From this signal and by counting the number of atoms scanned, the position of the probe electrode can be detected.

The bias voltage and the recording/reproducing pulse voltage which are to be applied to between the probe electrodes and the recording medium 8604 or the position detecting medium (atoms of the substrate) 8604A, are supplied from two mutually independent D/A converters 8613.

For the rough-motion drive in the X and Y directions, parallel springs 8615B, functioning as a rough-motion mechanism 8615, are used. Each X-Y-Z fine-motion mechanism 8605P (8605R) includes a cylindrical type piezoelectric device. Such a piezoelectric device has a high mechanical resonance frequency (not greater than 8 KHz in the X and Y directions; not greater than 40 KHz in the Z direction) and, therefore, a not so large scan range is attainable (not greater than 500 nm). However, it is suitable for high-speed scan.

Figure 61:
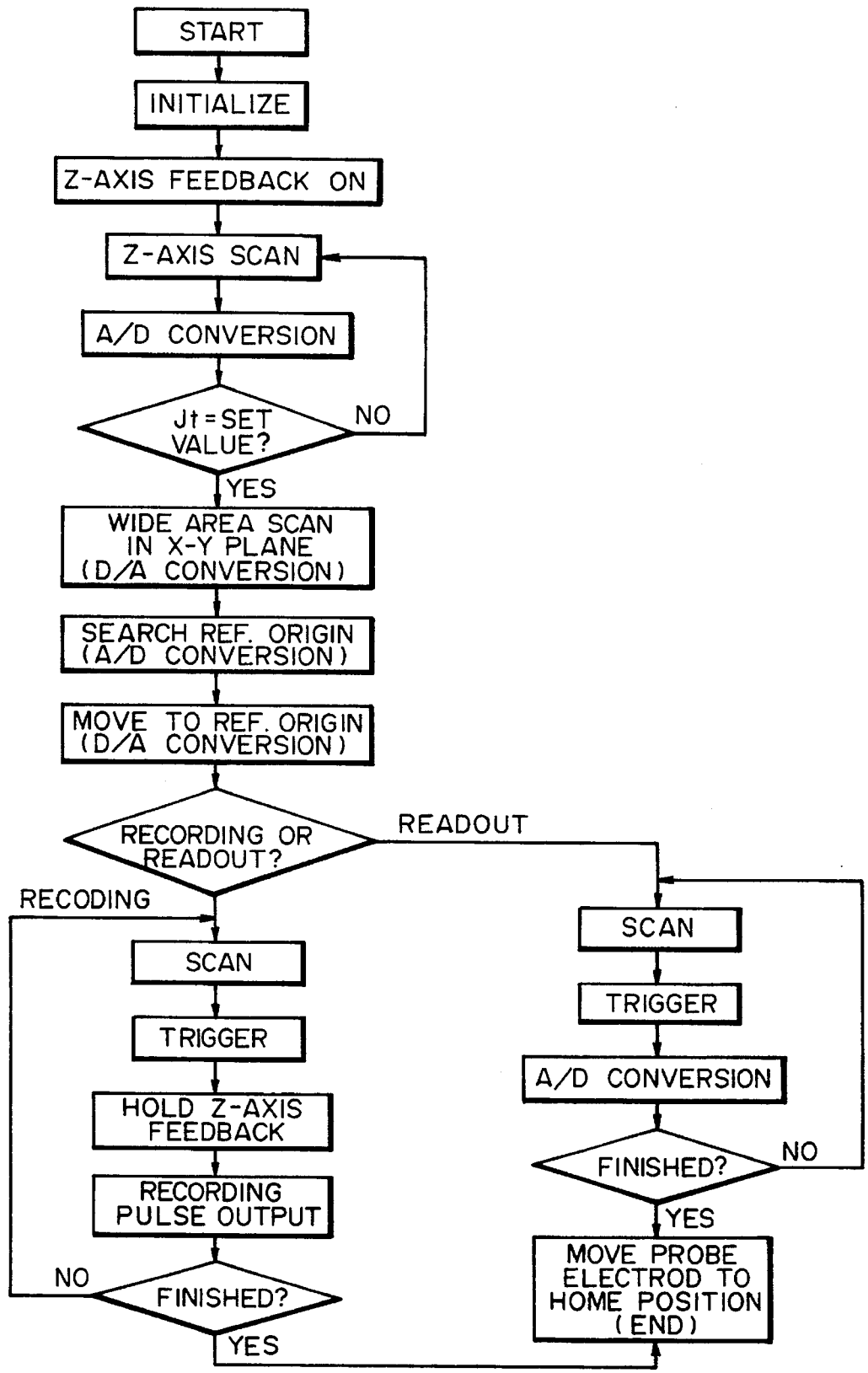
FIG. 61 is a diagram showing the algorithm in the central processing unit included in the FIG. 59 embodiment.

FIG. 61 shows the control algorithm in the CPU used in the present embodiment. The CPU 8610 operates in response to a start signal to reset the elements such as, for example, the A/D converter 8612 and the counter 8613, and to set respective initial conditions. Subsequently, the position detecting probe electrode 8602 and the recording/reproducing probe electrode 8601 are stepwise and separately moved toward the substrate and, at each stepwise movement, the level of electric current (Jt) that flows to the probe electrode is analog-to-digital converted. Until a set level is reached, the probe electrode 8601 (8602) is brought close to the recording medium 8604 or the substrate 8603. After this, by applying scan signals S84x and S84y to the parallel spring means 8615, the probe electrode 8601 is scanned along the plane (X and Y directions) over the whole region of the recording medium. Also, together with such scan, the probe electrode 8602 is scanned over the substrate. The probe current Jt during the scan is converted at suitable timing by the A/D converter 8617, and the position of a reference origin on the recording medium is calculated on the basis of the X-Y scan signal, the level of the current Jt from the probe electrode 8601 and the positional information as obtained from the position detecting medium 8604A. The probe electrode is moved to the thus determined reference origin.

For the recording, a small region is scanned from the position of the reference origin and along the plane and, in response to a trigger signal corresponding to the frequency at the time of signal sampling, first a control signal with respect to the Z-axis direction is held by a hold circuit 8611 and, thereafter, a recording pulse is outputted to effect the recording. For reproduction, a similar trigger signal is used, and an electric current flowing through the probe electrode is analog-digital converted and the information is reproduced. After completion of the recording or reproducing, the probe electrode is moved away from the recording medium and to its home position and is held thereat.

In the present embodiment, the scanning mechanism is separated into a rough-motion scanning portion and a fine-motion scanning portion, and for the higher frequency scan, the fine-motion scanning portion is used, whereas for lower-frequency scanning, the rough-motion scanning portion is used. This makes it possible to reduce the stroke of the fine-motion scanning portion and to increase the rigidity thereof. Therefore, it is possible to increase the scan speed. As a result, it is possible to increase the information transfer speed. For the fine-motion mechanism, use of an actuator having a piezoelectric device is preferable in respect to the precision. Any one of prevalently used fine-motion mechanisms or devices may be used. Examples are "piezoelectric tripod" (IBM J.Res. & Dev. 30 (1986) 355 or Helv. Phys. Acta. 55 (1982) 726, by G. Binnig and H. Rohrer); "3-d continuous fine-positioning system" (Rev. Sci. Instrum. 56 (1985) 1573, by G. F. A. Van De Walle, J. W. Gerritsen, H. Van Ken-pen & P. Wyder; and "tube scanner" (Rev. Sci. Instrum. 57 (1986) 168, by G. Binnig & D. P. E. Smith).

Figure 62:
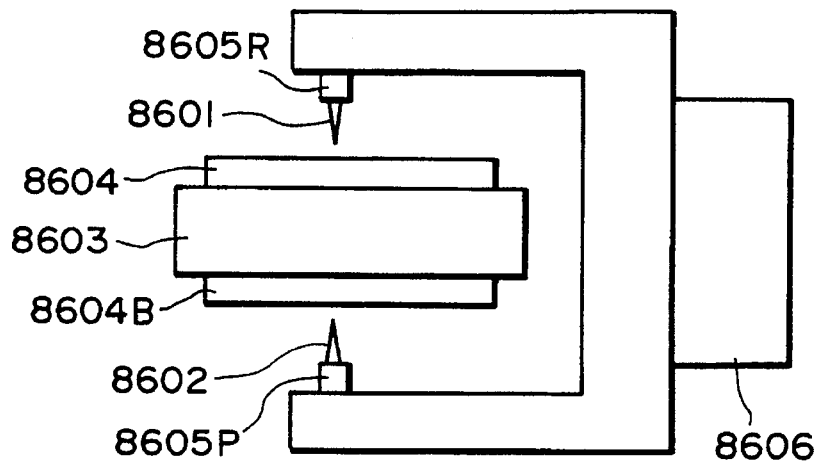
FIG. 62 is a principle view schematically showing a recording and reproducing apparatus according to still a further embodiment of the present invention.

The recording medium used in the present embodiment is similar to that in the FIG. 51 embodiment. As an alternative embodiment, such as shown in FIG. 62, a medium 8604B for the positioning may be provided on the opposite side of the recording medium 8604.

Figure 63:
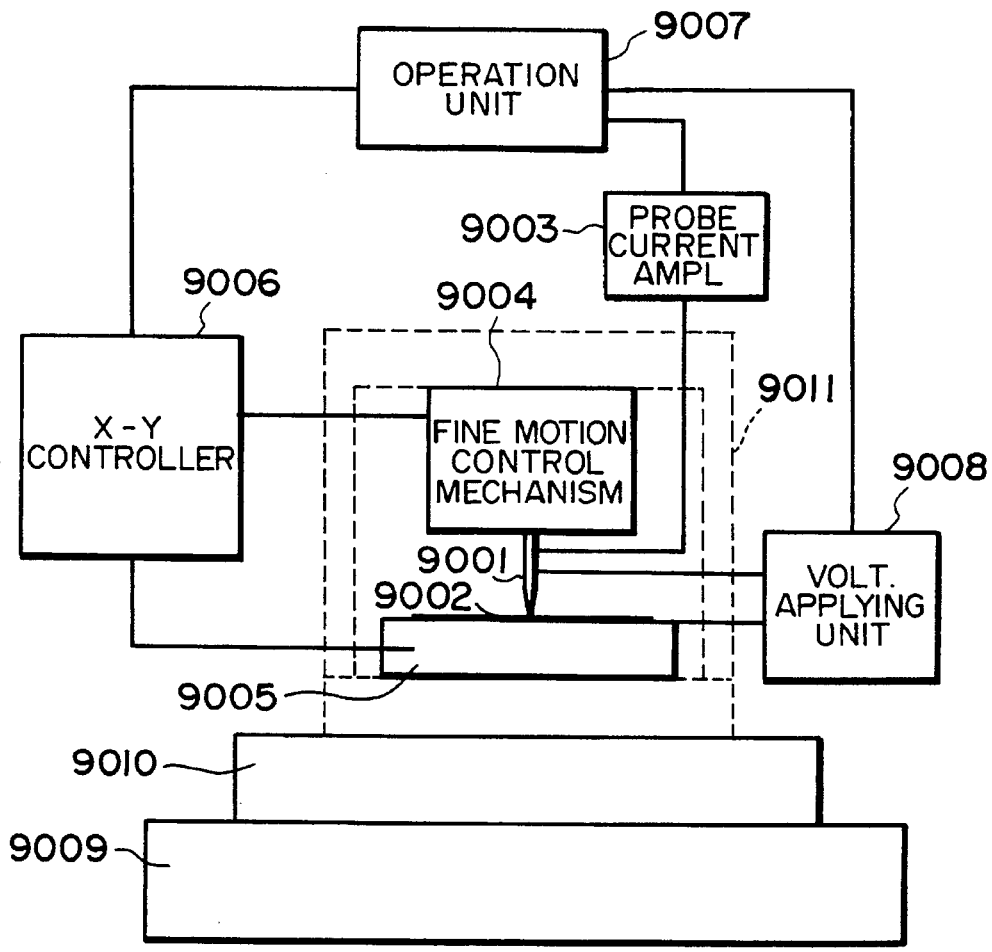
FIG. 63 is a schematic and diagrammatic view of a recording and reproducing apparatus according to a further another embodiment of the present invention.

FIG. 63 is a schematic and diagrammatic view of a recording/reproducing apparatus according to a still further embodiment of the present invention. Denoted in FIG. 63 at 9001 is a probe electrode which is used for the recording and reproducing. For enhanced resolution in the recording and reproducing, the probe electrode is made by mechanical-polishing and electro-polishing the tip of a tungsten needle. However, any other material such as Pt—Ir, Pt or otherwise may be used. Also, any other machining process may be used.

Denoted at 9002 is a recording medium which, in this embodiment, is provided by an accumulation of eight layers of squarilium-bis-6-octylazulene, having a memory effect with respect to the switching characteristics of voltage and current, the layered structure being formed on a graphite substrate by use of the LB method.

Denoted at 9003 is a current amplifier for converting, into an electrical voltage, and for amplifying an electric current flowing through the probe electrode. Denoted at 9004 is a fine-motion mechanism which comprises a cylindrical piezoelectric device and which operates to adjust the position of the probe electrode with respect to the direction in the plane of the recording medium (i.e. X and Y directions) and in a direction from the probe electrode to the recording medium (i.e. in the Z direction). Denoted at 9005 is a rough-motion mechanism for moving the recording medium in the X and Y directions. This mechanism comprises parallel springs mainly using resilient hinge.

Denoted at 9006 is an X-Y controller for applying an operation voltage to the control mechanisms 9004 and 9005. Denoted at 9007 is a processing unit which includes an A/D converting circuit for digitizing the output of the probe current amplifier, a microprocessor for controlling various device systems and a processor for pattern-recognition and code transformation to be made to the position reference scale on the recording medium and to the recording signals.

Denoted at 9008 is a voltage applying circuit for applying recording, reproducing and erasing voltages. The voltage applying circuit is arranged to apply a desired bias voltage in the range of −10 V−+10 V. Denoted at 9009 is an anti-vibration table which is effective to reduce the noise due to the vibration of the apparatus during the recording and reproduction.

Denoted at 9010 is a super rough-motion mechanism for controlling such a region as having a size larger than the control range of the fine-motion and rough-motion mechanisms. The portion denoted by a broken line 9011 is a structure made of invar, for supporting various structural components.

Figure 64:
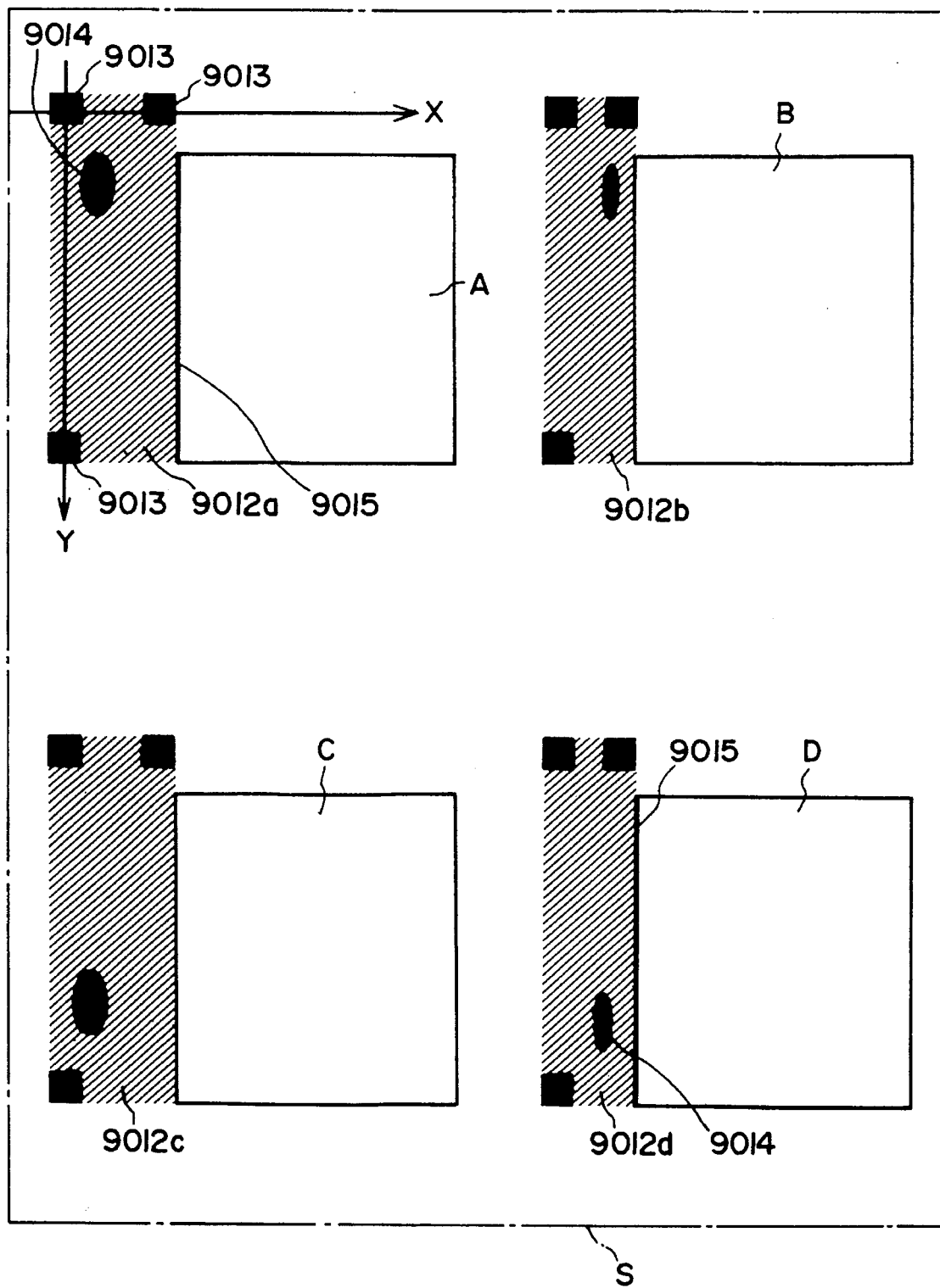
FIG. 64 is a schematic view showing positional reference patterns and recording/reproducing areas, defined on a recording medium used in the FIG. 63 embodiment.

FIG. 64 is a schematic view showing positional reference patterns and signal recording regions on the recording medium used in the present embodiment. In this embodiment, position reference patterns are preparatorily recorded on the recording medium, prior to the recording of signal information. Also, before starting the recording or reproduction of signal information, the probe electrode is scanned to discriminate the positional reference pattern and, the recording/reproducing is effected on the basis of the position of at least one recording/reproducing region on the recording medium obtained as a result of that and the information concerning the scan direction of the probe electrode during the recording/reproducing.

Before the recording/reproducing, four patterns 9012a–9012d shown in FIG. 64 are preparatorily recorded on the recording medium. Owing to the mechanical precision of the above-described structure, the position of the probe electrode upon the recording medium is assured, with a precision of ±10 microns, at such position as spaced by about 200 microns in the Z-axis direction from the home position on the recording medium.

As a sequence, an electrical voltage of 300 mV is applied by a voltage applying device 9008 to between the poles and, in this state, the output of the current amplifier is processed by a processing unit 9007. Based on this, the super-rough motion mechanism is controlled to reduce the interval between the electrodes to such distance so close as to allow the flow of an electric current of 1 pA.

Subsequently, in a similar manner, the fine-motion mechanism is controlled so that an electric current of 1 nA flows between the electrodes. Thereafter, the entire region as encircled by a broken line in FIG. 64 is scanned to write the patterns 9012a–9012d shown in FIG. 64.

In the initial state of the recording medium, the whole region is in an "OFF" state. In order that the portion onto which a pattern should be recorded is rendered into an "ON" state, an electric voltage of +10 V which is higher than a threshold level concerning the "ON-OFF transition" of the recording medium is applied to between the electrodes when the probe electrode comes to the pattern recording position. By this, the illustrated pattern can be produced. In the drawing, the painted area shows such portion which is in the "ON" state. Since, at the time of recording, the electric current flowing between the electrodes increases by about three figures. Accordingly, to avoid the effect thereof to the interval control for the electrodes, the fine-motion mechanism is controlled so that an average current flowing between the electrodes is maintained at 0.9 nA and, by doing so, an average distance between the electrodes can be maintained constant.

For the recording/reproducing upon the ordinary recording region, first, the probe electrode is positioned with respect to the positional reference pattern. For this purpose, a voltage of +5 V lower than the threshold concerning the "ON-OFF transition" of the recording medium is applied to between the electrodes and, in this state, the fine-motion and rough-motion mechanisms are controlled to cause the probe electrode to scan over the whole recording medium. During the scan, the "ON/OFF" state is detected on the basis of the changes in the tunnel current between the electrodes to thereby detect the positional reference pattern. Since the positional reference pattern occupies a wider area, than the record unit of the ordinary recording information, when the "ON/OFF" state thereof is detected by the scan of the probe electrode, the detected ON/OFF frequency is remarkably lower than that of the ordinary recording information. Therefore, by using a simple band filter group, the scanning detection signals of the positional reference pattern and the ordinary recording information can be easily separated as a low frequency component and a high frequency component. On the basis of two-dimensional information concerning the plural positional reference patterns, the probe electrode is moved to a position in the neighborhood of one of the four patterns. Subsequently, such a range which is slightly wider than the pattern region is scanned and the signals obtained therefrom are stored into a memory as two-dimensional information. As shown in FIG. 64, each reference pattern can be discriminated on the basis of the direction of the array of directional patterns 9013 which are arrayed in the X and Y directions specifically. Also, the position of the pattern being detected can be discriminated, on the basis of the relative position of a positional pattern 9014 with respect to the positional reference pattern. Namely, the positional reference pattern contains directional information and positional information. Therefore, by using prevalently adopted image processing method, the information concerning the scan direction at the time of actual recording/reproducing as well as the information concerning the position of the pattern being detected, can be obtained. Further, from the stored positional relation between the patterns, the information concerning the approximate position of the positional reference pattern related to the next ordinary recording region.

Figure 65:
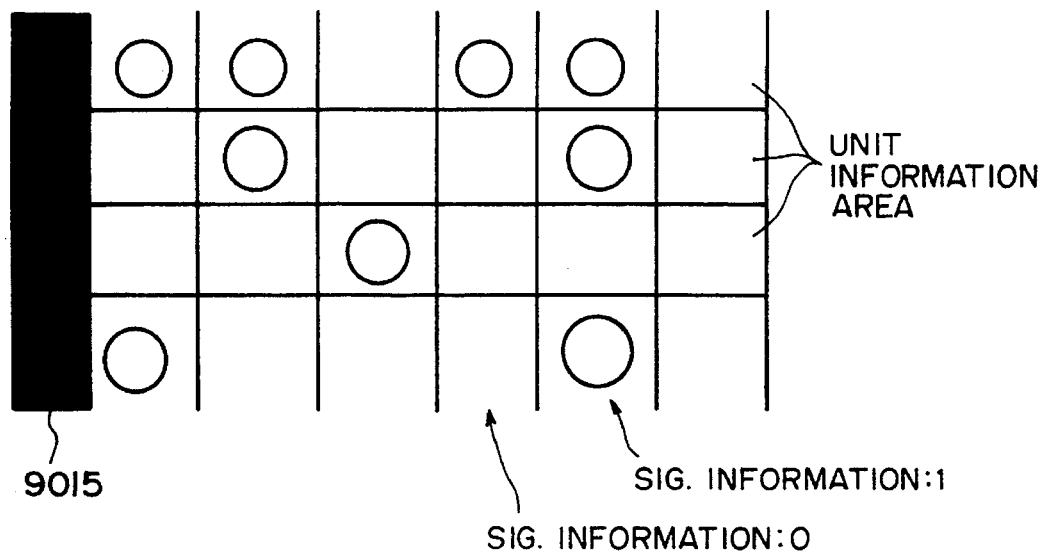
FIG. 65 is a schematic view showing recorded signals, in the form of two-dimensional images, in the embodiment of FIG. 63.

For the recording of the ordinary recording information, the probe electrode is moved to a position in the neighborhood of the ordinary recording region on the basis of the positional information. Then, such a range as being slightly wider than the recording region is scanned. After a synchronization signal in the positional reference pattern is detected, the information is written at a predetermined position on the basis of the positional information and with the precision of the piezoelectric device. For the reproduction of the ordinary recording information, two-dimensional information as obtained by the scan of the whole region after the synchronization signal is divided into a record unit (unit information region) as shown in FIG. 65, while taking into account the hysteresis of the piezoelectric device, thermal expansion/contraction of the recording medium and other information, having been inputted separately. Each unit region is image-processed to reproduce the recorded information (1 or 0). After the recording/reproducing is completed, the probe electrode is moved to a position in the neighborhood of the next pattern, on the basis of the obtained positional information.

In the present embodiment, the scanning mechanism is separated into a rough-motion scanning portion for low-frequency scanning and a fine-motion scanning portion for high-frequency scanning. This is effective to make it possible to reduce the stroke of the fine-motion scanning portion and to increase the rigidity thereof. Therefore, the scan speed can be increased and as a result of which, the information transfer speed can be increased. As for the fine-motion mechanism, known type fine-motion mechanisms or devices are usable, examples of which have been described hereinbefore. In the present embodiment, a tube scanner having high natural frequency is used. On the other hand, as for the rough-motion mechanism, parallel spring means having high-performance resilient hinge mechanism, in which the freedom of motion is restricted to the movable direction, is used.

By using parallel spring means comprising a resilient hinge mechanism, as the rough-motion mechanism for the recording medium, it is possible to suppress any distortion of the recording medium at the rough-motion in the direction perpendicular to the recording medium surface (i.e. in the Z-axis direction). Therefore, it is possible to improve the signal-to-noise ratio at the time of recording/reproducing. Also, it is possible to enlarge the rough-motion range while retaining high rigidity of the piezoelectric device.

Further, of various three-dimensional scanners using ordinary piezoelectric devices, a cylindrical type piezoelectric device having high resonance frequency is used as the fine-motion mechanism for the probe electrode. By this, the response frequency of the fine-motion mechanism can be improved and, therefore, the scan speed can be increased. As a result, it is possible to improve the record information transfer speed.

By using a positional reference pattern and by providing unit for the recording/reproducing of signals, the signal processing at the time of recording/reproducing of signals, the signal processing at the time of recording/reproducing can be made simple.

Since the positional reference pattern contains two-dimensional information, it is possible to cancel or compensate for during the scan, any positional deviation of the record information due to any rotation or distortion of the recording medium caused when it is mounted to the apparatus.

In the present embodiment, the information is not treated one-dimensionally but it is treated two-dimensionally. This results in improved degree of freedom of position change at the time of reproduction. As a result, without positioning by use of feedback control or otherwise, high-density recorded information can be read out without error.

Since the recorded information is processed as a unit of area, it is not necessary to reproduce, for every scan, the position of the signal at the time of recording. Namely, as shown in FIG. 6, even if during the reproduction the scanning actuator is not correctly on the recorded signal for a short time period due to any external disturbance, it is possible to reproduce a two-dimensional image representing the record unit and the positional relation between the record units, provided that the two-dimensional image obtained by the whole-region scan is within the tolerance of image processing. Therefore, substantially no problem occurs for the reproduction of information. Also, even if there occurs expansion/contraction of the medium due to the difference in temperature or humidity between the time of reproduction and the time of recording, the change in the obtained two-dimensional image of the information is merely an analogous deformation of the original image and, therefore, there occurs substantially no readout error. For a similar reason, recording mediums can be interchangeably used between different apparatuses.

Further, the mounting of the recording medium to the apparatus does not require high-precision mechanisms. Therefore, the recording/reproducing apparatus can be produced with a low cost and by mass-production.

While the invention has been described with reference to the structures disclosed herein, it is not confined to the details set forth and this application is intended to cover such modifications or changes as may come within the purposes of the improvements or the scope of the following claims.

What is claimed is:

1. A position detecting apparatus comprising:

a reference element having a surface to be detected having regular scales;

a probe disposed to face the surface to be detected and movable relative to said reference element along the surface to be detected;

means for applying a voltage between said probe and said reference element;

means for detecting a tunnel current flowing between said probe and said reference element;

means for detecting the relative position of said probe relative to said reference element along the surface to be detected on the basis of changes in the output of said current detecting means caused by relative movement across the scales of said probe upon the occurrence of relative movement between said the probe and said reference element; and means for detecting, upon the occurrence of the relative movement, the direction of the relative movement.

2. An apparatus according to claim 1, wherein said scales are arrangements of atoms or molecules.

3. An apparatus according to claim 1, wherein said position detecting means includes a counter for counting scales crossed by said probe on the basis of changes of the tunnel current detected by said current detecting means.

4. An apparatus according to claim 1, wherein said scales have a configuration asymmetrical along the surface to be detected, and said direction detecting means detects the movement direction on the basis of the changes in the tunnel current with time when said probe moves across the scales.

5. An apparatus according to claim 1, further comprising means for vibrating said probe along the surface to be detected, wherein said direction detecting means detects the movement direction on the basis of a change of the phase of the tunnel current caused by the vibration.

6. A position detecting apparatus comprising:

a reference element having a surface to be detected having regular scales;

a probe disposed to face the surface to be detected with a gap therebetween and movable relative to said reference element along the surface to be detected;

means for applying a voltage between said probe and said reference element;

means for detecting a tunnel current flowing between said probe and said reference element;

an actuator for changing the gap between said probe and the surface to be detected;

means for generating a control signal for controlling said actuator so as to provide a constant tunnel current detected by said current detecting means;

means for detecting the relative position of said probe relative to said reference element along the surface to be detected on the basis of changes in the control signal caused by relative movement across the scales of said probe upon the occurrence of relative movement between said probe and the reference element; and means for detecting, upon the occurrence of the relative movement, the direction of the relative movement.

7. An apparatus according to claim 6, wherein said scales are arrangements of atoms or molecules.

8. An apparatus according to claim 6, wherein said position detecting means includes a counter for counting scales crossed by said probe on the basis of changes in the tunnel current detected by said current detecting means.

9. An apparatus according to claim 6, wherein said scales have a configuration asymmetrical along the surface to be detected, and said direction detecting means detects the movement direction on the basis of the changes in the tunnel current with time when said probe moves across the scales.

10. An apparatus according to claim 6, further comprising means for vibrating said probe along the surface to be detected, wherein said direction detecting means detects the movement direction on the basis of a change in the phase of the tunnel current caused by the vibration.

11. A position detecting apparatus comprising:

a reference element having a surface to be detected having regular scales;

a first probe disposed to face the surface to be detected and movable relative to said reference element along the surface to be detected;

a second probe disposed to face the surface to be detected and movable, together with said first probe, relative to said reference element along the surface to be detected;

means for applying voltage between said first and second probes and said reference element;

means for detecting first and second tunnel currents flowing between said first and second probes and said reference element, respectively;

means for detecting the relative position of said first and second probes relative to said reference element along the surface to be detected on the basis of changes in the first and second tunnel currents of said current detecting means caused by relative movement across the scales of said first and second probes upon the occurrence of relative movement between said first and second probes and said reference element; and means for detecting, upon the occurrence of the relative movement, the direction of the relative movement on the basis of a difference in phase between the first and second tunnel currents.

12. An apparatus according to claim 11, wherein said scales are arrangements of atoms or molecules.

13. An apparatus according to claim 11, wherein said position detecting means includes a counter for counting scales crossed by said first and second probes on the basis of changes in the tunnel current detected by said current detecting means.

14. An apparatus according to claim 11, wherein said scales of said first and second probes are different in phase.

15. A position detecting apparatus comprising:

a reference element having a surface to be detected having regular scales;

a first probe disposed to face the surface to be detected with a gap therebetween and movable relative to said reference element along the surface to be detected;

a second probe disposed to face the surface to be detected with a gap therebetween and movable, together with said first probe, relative to said reference element along the surface to be detected;

means for applying voltage between said first and second probes and said reference element;

means for detecting first and second tunnel currents flowing between said first and second probes and said reference element, respectively;

a first actuator for changing the gap between said first probe and the surface to be detected;

a second actuator for changing the gap between said second probe and the surface to be detected;

means for generating first and second control signals for controlling said first and second actuators so as to provide first and second constant tunnel currents detected by said current detecting means, respectively;

means for detecting the relative position of said first and second probes relative to said reference element along the surface to be detected on the basis of changes in the first and second tunnel currents detected by said current detecting means caused by relative movement across the scales of said first and second probes upon the occurrence of relative movement between said first and second probes and said reference element; and means for detecting, upon the occurrence of the relative movement, the direction of the relative movement on the basis of a difference in phase between the first and second tunnel currents.

16. An apparatus according to claim 15, wherein said scales are arrangements of atoms or molecules.

17. An apparatus according to claim 15, wherein said position detecting means includes a counter for counting scales crossed by said first and second probes on the basis of changes in the first and second control signals.

18. An apparatus according to claim 15, wherein said scales of said first and second probes are different in phase.

19. A position detecting apparatus comprising:

a first reference element having a surface to be detected having scales at first regular intervals;

a first probe disposed to face the surface to be detected of said first reference element and movable relative to said first reference element along the surface to be detected;

a second reference element having a surface to be detected having scales at second regular intervals;

a second probe disposed to face the surface to be detected of said second reference element and movable, together with said first probe, relative to said second reference element along the surface to be detected of said second reference element;

means for applying voltage between said first and second probes and said first and second reference elements;

means for detecting first and second tunnel currents flowing between said first and second probes and said first and second reference elements, respectively;

means for detecting the relative position of said first and second probes relative to said first and second reference elements, respectively, along the surface to be detected of said first and second reference elements on the basis of changes in the first and second tunnel currents detected by said current detecting means caused by relative movement across the scales of said first and second reference elements of said first and second probes upon the occurrence of relative movement between said first and second probes and said first and second reference elements, respectively.

20. An apparatus according to claim 19, wherein said first and second scales are arrangements of atoms or molecules.

21. An apparatus according to claim 19, further comprising:

a first actuator for changing a gap between said first probe and the surface to be detected of said first reference element;

a second actuator for changing a gap between said second probe and the surface to be detected of said second reference element; and means for generating first and second control signals for controlling said first and second actuators so as to provide first and second constant tunnel currents detected by said current detecting means, respectively, wherein said relative position detecting means detects the relative positions between said first and second probes and said first and second reference elements along the surfaces thereof, respectively, to be detected on the basis of changes in the first and second control signals caused by the relative movement across the scales of said first and second reference elements upon the occurrence of relative movement between said first and second probes and said first and second reference elements.

22. An apparatus according to claim 19, wherein said position detecting means includes a first counter for counting scales crossed by said first probe on the basis of changes in the control signal, and a second counter for counting scales crossed by said second probe on the basis of changes in the second control signal.

23. A position detecting apparatus comprising:

a first reference element having a surface to be detected having regular scales;

first position detecting means, disposed to face the surface to be detected of said first reference element, for detecting first positional information on the basis of said first reference element;

a measuring head movable along the surface to be detected of said first reference element and movably supporting said first position detecting means;

a second reference element having a surface to be detected having regular scales and mounted on one of said first position detecting means and said measuring head;

a probe disposed to face the surface to be detected of said second reference element and mounted in the other of said first position detecting means and said measuring head;

means for applying voltage between said probe and said second reference element;

means for detecting a tunnel current flowing between said probe and said second reference element; and means for detecting second positional information indicative of the relative position of said first position detecting means relative to said measuring head on the basis of changes in the output of said current detecting means caused by relative movement by said probe across the scales of said second reference element upon the occurrence of relative movement between said probe and the second reference element.

24. An apparatus according to claim 23, wherein said first scale is an arrangement of atoms or molecules.

25. An apparatus according to claim 23, further comprising:

an actuator for changing a gap between said probe and the surface to be detected of the second reference element; and means for generating a control signal for controlling said actuator so as to provide a constant tunnel current detected by said current detecting means, wherein said second positional information detecting means detects the second positional information on the basis of changes in the control signal caused by the relative movement of said probe across the scales of said second reference element upon the occurrence of relative movement between said probe and the second reference element.

26. An apparatus according to claim 23, wherein said first position detecting means includes a light emitting element for projecting light to the surface to be detected of said first reference element and a photoreceptor element for receiving the light modulated by the surface to be detected of said first reference element.

27. Recording and/or reproducing apparatus comprising:

a recording medium having a recording portion and a reference portion having a surface to be detected having regular scales;

a probe disposed to face the surface to be detected and movable relative to said reference portion along the surface to be detected;

means for applying a voltage between said probe and said reference portion;

means for detecting a tunnel current flowing between said probe and said reference portion;

means for detecting the relative position of said probe relative to said reference portion along the surface to be detected on the basis of changes in the output of said current detecting means caused by relative movement by said probe across the scales upon the occurrence of relative movement between said probe and the reference portion; and means for recording and/or reproducing information via a rotatable member from the relative movement using the position detected by said relative position detecting means.

28. An apparatus according to claim 27, said regular scales include in first scale, wherein said first scale is an arrangement of atoms or molecules.

29. An apparatus according to claim 27, further comprising:

an actuator for changing a gap between said probe and the surface to be detected of said reference portion; and means for generating a control signal for controlling said actuator so as to provide a constant tunnel current detected by said current detecting means, wherein said relative position detecting means detects the relative position between said probe and said reference portion on the basis of changes in the control signal caused by the relative movement across the scales by said probe upon the occurrence of relative movement between said probe and the reference portion.

30. An apparatus according to claim 27, wherein said scales are arranged in different directions.

31. Recording and/or reproducing apparatus comprising:

a recording medium having a recording portion and a reference portion having a surface to be detected having regular scales;

a first probe disposed to face said recording portion of said recording medium;

a second probe disposed to face the surface to be detected of said reference portion and movable relative to said reference portion along the surface to be detected in interrelation with said first probe;

means for applying a voltage between said second probe and said reference portion;

means for detecting a tunnel current flowing between said second probe and said reference portion;

means for detecting the relative position between said second probe and said reference portion along the surface to be detected on the basis of changes in the output of said current detecting means caused by relative movement across the scales by said second probe upon the occurrence of relative movement between said second probe and said reference portion; and means for recording and/or reproducing information via a rotatable member from said relative movement by said first probe using the position detected by said relative position detecting means.

32. An apparatus according to claim 31, wherein said regular scales include a first scale, wherein said first scale is an arrangement of atoms or molecules.

33. An apparatus according to claim 31, further comprising:

an actuator for changing a gap between said second probe and the surface to be detected of said reference portion; and means for generating a control signal for controlling said actuator so as to provide a constant tunnel current detected by said current detecting means, wherein said relative position detecting means detects the relative position between said second probe and said reference portion on the basis of changes in the control signal caused by the relative movement across the scales by said second probe upon the occurrence of relative movement between said second probe and the reference portion.

34. A position detecting apparatus comprising:

a reference element having a surface to be detected having irregular scales;

a memory for storing interval information of the scales;

a probe disposed to face the surface to be detected and movable relative to said reference element along the surface to be detected;

means for applying a voltage between said probe and said reference element;

means for detecting a tunnel current flowing between said probe and said reference element;

means for detecting the relative position of said probe relative to the reference element along the surface to be detected on the basis of changes in the output of said current detecting means caused by relative movement by said probe across the scales upon the occurrence of relative movement between said probe and the reference element and on the basis of the interval information stored in said memory; and means for detecting, upon the occurrence of the relative movement, the direction of the relative movement.

* * * * *

UNITED STATES PATENT AND TRADEMARK OFFICE
CERTIFICATE OF CORRECTION

PATENT NO. : 5,519,686
DATED : May 21, 1996
INVENTOR(S) : YOSHIHIRO YANAGISAWA, et al.

It is certified that error appears in the above-indentified patent and that said Letters Patent is hereby corrected as shown below:

On the Title page:

item [75] Inventors

"Toshimitsu Kawasa," should read
--Toshimitsu Kawase--.

IN THE DRAWINGS

Sheet 45

Figure 61, "ELECTROD" should read --ELECTRODE--.

COLUMN 4

Line 57, "another" should be deleted.

COLUMN 5

Line 55, "n" should read --h--.

COLUMN 7

Line 49, "such" should read --such as--.

COLUMN 8

Line 50, "view," should read --views,--.

COLUMN 11

Line 56, "relative" should read --relatively--.

UNITED STATES PATENT AND TRADEMARK OFFICE
CERTIFICATE OF CORRECTION

PATENT NO. : 5,519,686
DATED : May 21, 1996
INVENTOR(S) : YOSHIHIRO YANAGISAWA, et al.

It is certified that error appears in the above-indentified patent and that said Letters Patent is hereby corrected as shown below:

COLUMN 12

Line 59, "relative" should read --relatively--.

COLUMN 17

Line 1, "relative" should read --relatively--.

COLUMN 19

Line 66, "moves relative" should read
--move relatively--.

COLUMN 20

Line 57, "denote" should read --denoted--.
Line 58, "at" should read --denoted at--.
Line 60, "denote" should read --denoted--.

COLUMN 21

Line 46, "closed to," should read --closed, to--.

COLUMN 23

Line 57, "functions" should read --functioning--.
Line 58, "one" should read --to one--.

COLUMN 24

Line 28, "the" should be deleted.

UNITED STATES PATENT AND TRADEMARK OFFICE
CERTIFICATE OF CORRECTION

PATENT NO. : 5,519,686  Page 3 of 4
DATED : May 21, 1996
INVENTOR(S) : YOSHIHIRO YANAGISAWA, et al.

It is certified that error appears in the above-indentified patent and that said Letters Patent is hereby corrected as shown below:

COLUMN 28

Line 1, "example" should read --example.--.

COLUMN 30

Line 17, "relative" should read --relatively--.

COLUMN 33

Line 48, "5 < n < 30." should read --$5 \leq n \leq 30.$--.

COLUMN 38

Line 47, "obtain" should read --to obtain--.

COLUMN 39

Line 17, "prove" should read --probe--.
Line 66, "71 12)," should read --7112),--.

COLUMN 40

Line 12, "mechanism." should read --mechanisms.--.

COLUMN 43

Line 61, "a" should read --an--.

COLUMN 47

Line 27, "0n" should read --On--.

UNITED STATES PATENT AND TRADEMARK OFFICE
CERTIFICATE OF CORRECTION

PATENT NO. : 5,519,686

DATED : May 21, 1996

INVENTOR(S) : YOSHIHIRO YANAGISAWA, et al.

It is certified that error appears in the above-indentified patent and that said Letters Patent is hereby corrected as shown below:

COLUMN 50

Line 40, "a" should read --an--.

COLUMN 58

Figure 66:
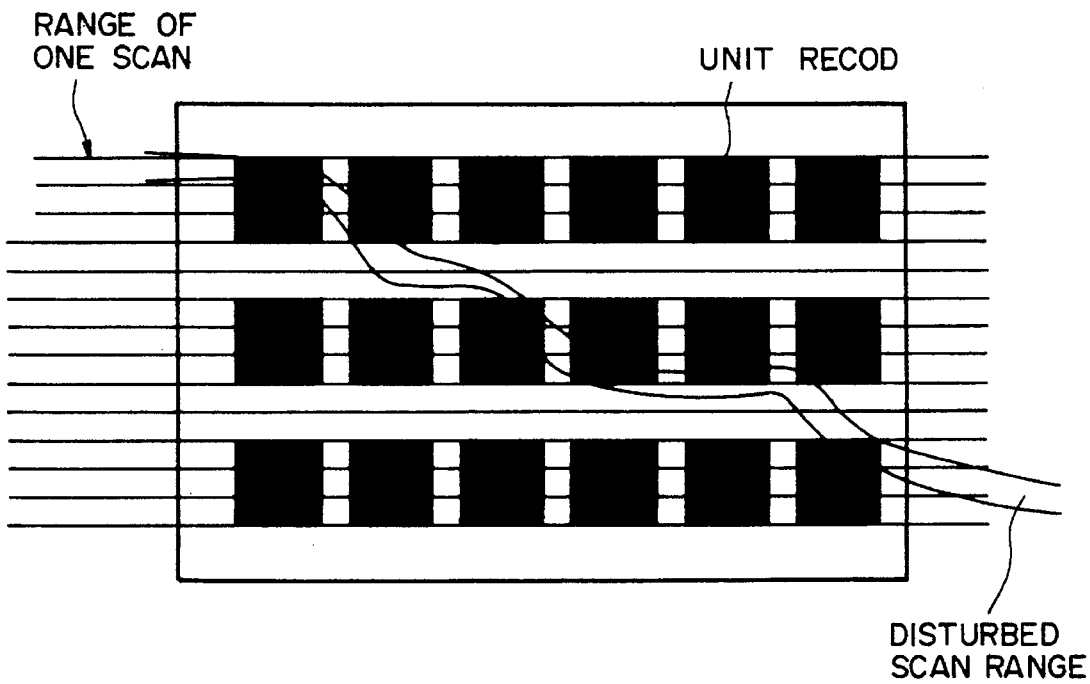
FIG. 66 is a schematic view showing the manner of scan of recorded signals by a readout system, in accordance with the embodiment of FIG. 63.

Line 30, "FIG. 6," should read --FIG. 66,--.

COLUMN 59

Line 6, "the" should be deleted.

COLUMN 61

Line 29, "respectively;" should read --respectively; and--.
Line 66, "claim 19," should read --claim 15,--.

COLUMN 63

Line 14, "said" should read --wherein said--.
Line 15, "in" should read --a--.

Signed and Sealed this

First Day of October, 1996

Attest:

BRUCE LEHMAN

Attesting Officer      Commissioner of Patents and Trademarks